(12) United States Patent
Kato et al.

(10) Patent No.: US 10,056,599 B2
(45) Date of Patent: Aug. 21, 2018

(54) BATTERY TERMINAL

(71) Applicant: YAZAKI CORPORATION, Tokyo (JP)

(72) Inventors: Takayuki Kato, Shizuoka (JP); Takahiro Shiohama, Shizuoka (JP); Katsumi Sato, Shizuoka (JP); Takashi Yoshida, Shizuoka (JP); Hideto Yoshinaga, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 81 days.

(21) Appl. No.: 15/147,953

(22) Filed: May 6, 2016

(65) Prior Publication Data
US 2016/0254518 A1   Sep. 1, 2016

Related U.S. Application Data

(63) Continuation of application No. PCT/JP2014/078767, filed on Oct. 29, 2014.

(30) Foreign Application Priority Data

Dec. 12, 2013  (JP) .................................. 2013-257360
Jun. 6, 2014    (JP) .................................. 2014-117957

(51) Int. Cl.
*H01M 2/30*   (2006.01)
*H01R 11/28*  (2006.01)

(52) U.S. Cl.
CPC .......... *H01M 2/307* (2013.01); *H01R 11/283* (2013.01); *H01M 2220/20* (2013.01)

(58) Field of Classification Search
CPC .. H01M 2/307; H01M 2220/20; H01R 11/283
See application file for complete search history.

(56) References Cited

U.S. PATENT DOCUMENTS 5,290,646 A   3/1994  Asao et al.
5,302,143 A   4/1994  Inoue et al.
(Continued)

FOREIGN PATENT DOCUMENTS

CN   202333167 U   7/2012
CN   103140987 A   6/2013
(Continued)

OTHER PUBLICATIONS

International Search Report of PCT/JP2014/078767, dated Dec. 9, 2014. [PCT/ISA/210].
(Continued)

*Primary Examiner* — Cynthia K Walls
(74) *Attorney, Agent, or Firm* — Sughrue Mion, PLLC

(57) ABSTRACT

A battery terminal includes a penetrating plate disposed to penetrate annular portions from one end portions of the annular portions to the other end portions of the annular portions with slits interposed therebetween; a fastening bolt supported by a threaded hole of the penetrating plate to be rotatable about an axial direction; and a spacer as a pressing force converting member disposed to come into contact with edge portions of the annular portions from an end portion side of the penetrating plate where the threaded hole is provided, and converts an axial-direction fastening force, which is generated between the fastening bolt and the threaded hole with the rotation of the fastening bolt about the axial direction, into a long-side-direction pressing force that presses the annular portions in a direction, in which intervals of the slits of the annular portions are reduced, of a long-side direction.

22 Claims, 28 Drawing Sheets

(56) References Cited

U.S. PATENT DOCUMENTS

| | | | |
|---|---|---|---|
| 5,454,741 A | | 10/1995 | Okada |
| 5,492,780 A | * | 2/1996 | Okada .................. H01R 11/283 |
| | | | 429/121 |
| 2013/0196558 A1 | | 8/2013 | Adachi et al. |

FOREIGN PATENT DOCUMENTS

| | | |
|---|---|---|
| JP | 3-10467 U | 1/1991 |
| JP | 5-97056 U | 12/1993 |
| JP | 6-5106 U | 1/1994 |
| JP | 6-54205 U | 7/1994 |
| JP | 9-245767 A | 9/1997 |
| JP | 10-223203 A | 8/1998 |
| JP | 2002-184387 A | 6/2002 |
| JP | 2003-151651 A | 5/2003 |
| JP | 2003-187783 A | 7/2003 |
| JP | 2006-49164 A | 2/2006 |
| JP | 2006-190547 A | 7/2006 |
| JP | 2010-3583 A | 1/2010 |

OTHER PUBLICATIONS

Written Opinion of PCT/JP2014/078767, dated Dec. 9, 2014. [PCT/ISA/237].

Communication dated Mar. 28, 2017 from the Japanese Patent Office in counterpart Application No. 2015-552364.

Communication dated Oct. 24, 2017, from State Intellectual Property Office of the P.R.C. in counterpart application No. 201480062063.8.

* cited by examiner

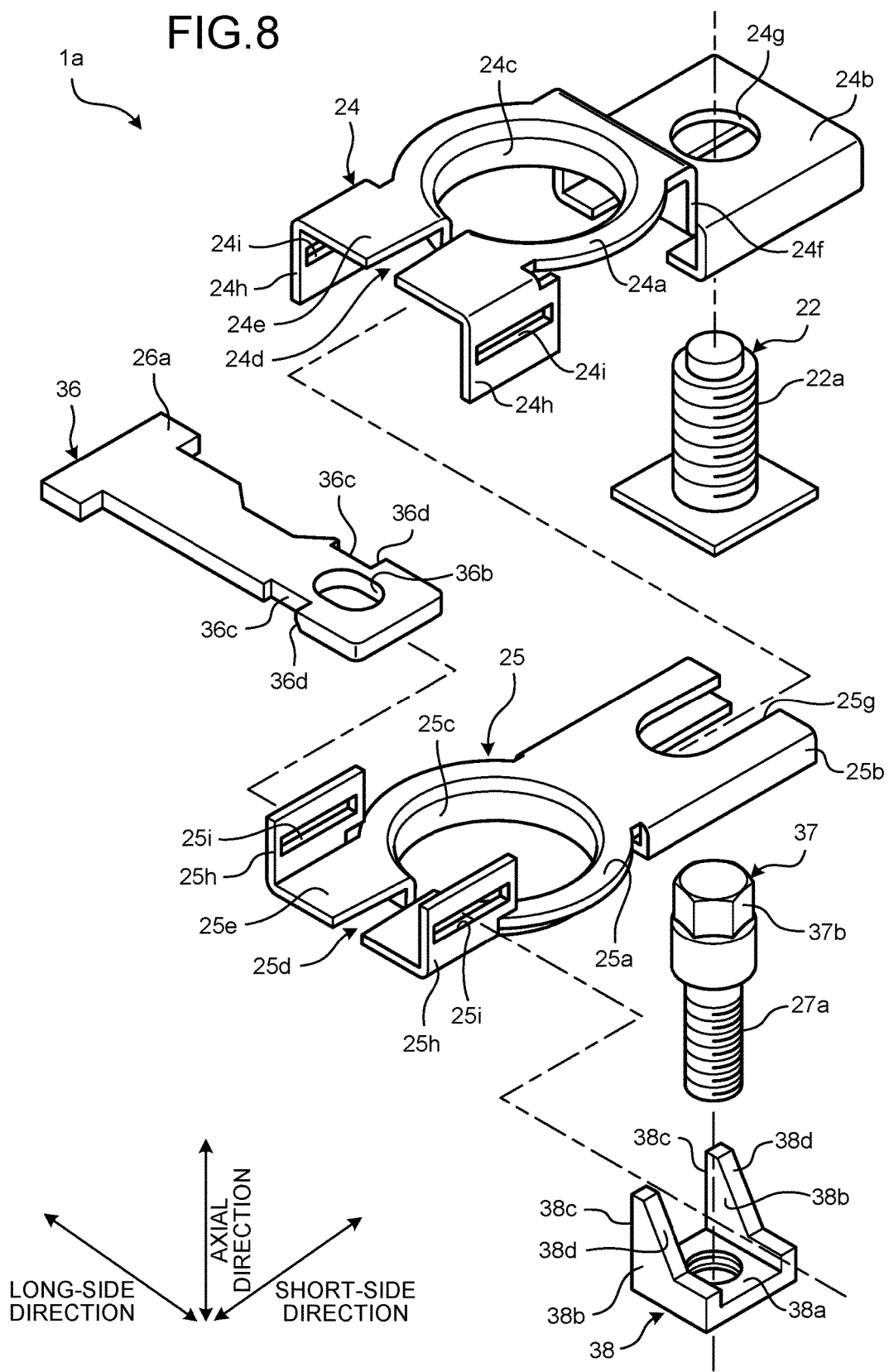

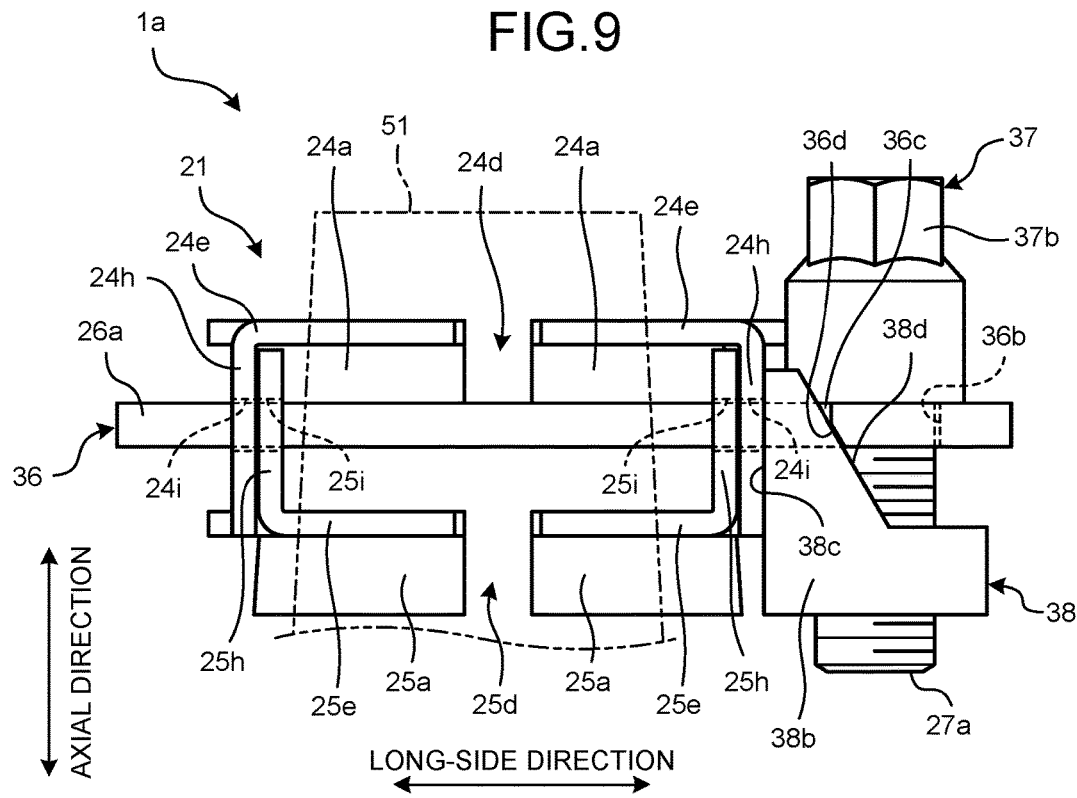
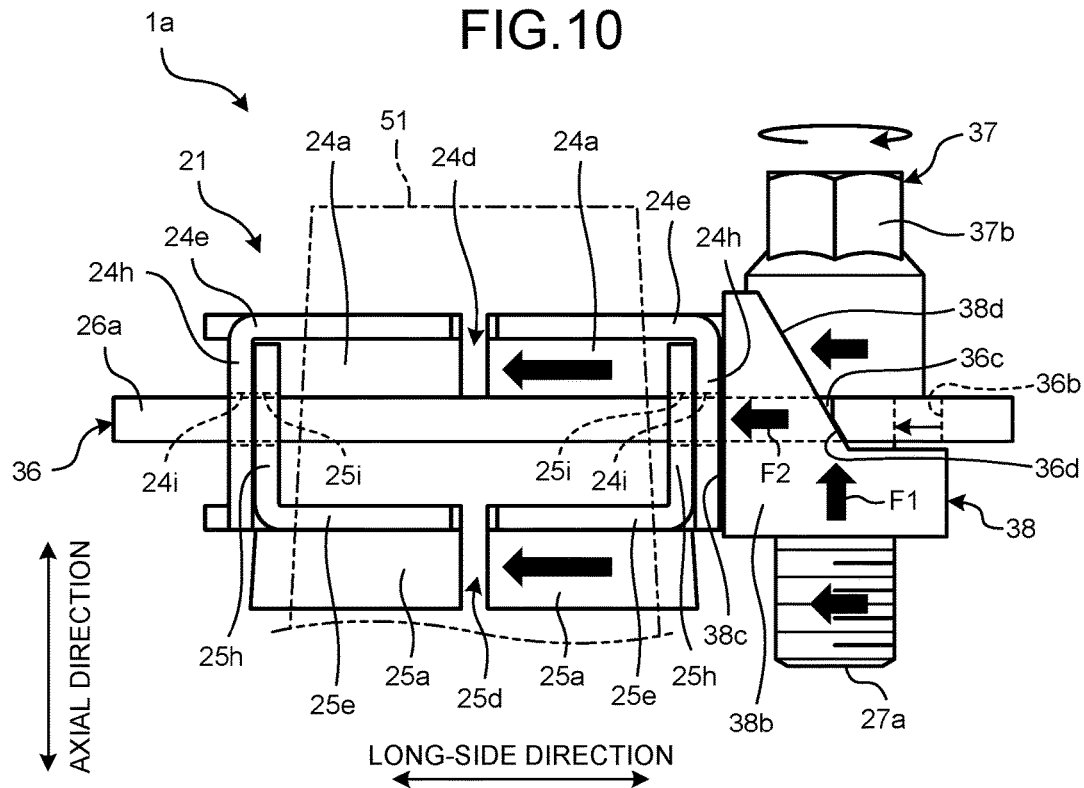

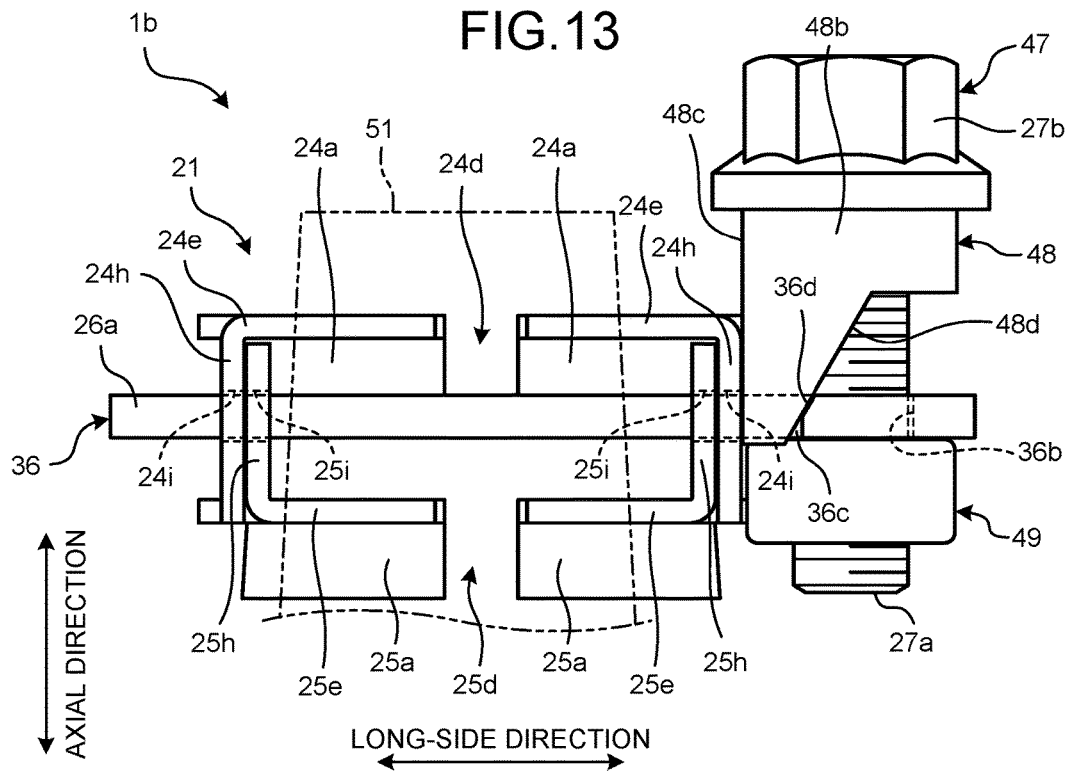
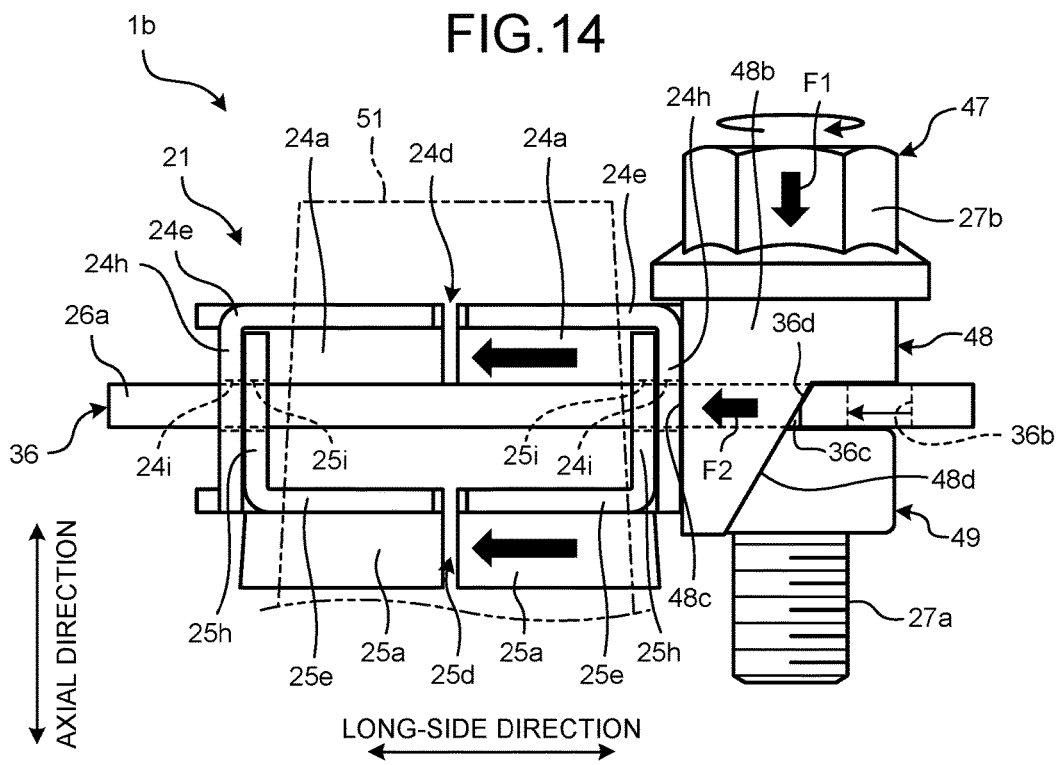

BATTERY TERMINAL

CROSS-REFERENCE TO RELATED APPLICATION

This application is a continuation application of International Application PCT/JP2014/078767, filed on Oct. 29, 2014, and designating the U.S., the entire contents of which are incorporated herein by reference.

BACKGROUND OF THE INVENTION

1. Field of the Invention

The present invention relates to a battery terminal.

2. Description of the Related Art

A battery terminal, which is mounted on a battery post standing on a battery mounted on a vehicle or the like, has been known in the related art. For example, Japanese Patent Application Laid-open No. 9-245767 discloses the structure of a battery terminal that can be mounted on a battery post by being fastened in a state in which the battery post is inserted into a hole, as a battery terminal in the related art. As disclosed in Japanese Patent Application Laid-open No. 9-245767, generally, in the battery terminal in the related art, the diameter of a hole into which the battery post is inserted is reduced by the tightening of a bolt and a nut, which are disposed so that an axial direction of the nut and bolt is parallel to the horizontal direction, to secure a fastening force for fastening the battery terminal to the battery post and to mount the battery terminal on the battery post.

The bolt or the nut needs to be rotated about an axis in a horizontal direction to fasten this battery terminal. For this reason, in order to mount the battery terminal on the battery post, a tool for rotating the bolt or the nut needs to be set on the lateral side of the battery post, that is, on the lateral side of the battery and needs to be rotated. For this reason, a large space, in which a tool is inserted, or which is required to operate a tool, needs to be provided on the lateral side of the battery.

SUMMARY OF THE INVENTION

The present invention has been made in view of the above circumstances, and an object thereof is to provide a battery terminal capable of reducing a work space, which is present around a battery and is required to fasten a battery terminal to a battery post.

In order to achieve the above mentioned object, a battery terminal according to one aspect of the present invention includes an annular portion in which a post insertion hole into which a battery post is inserted and a slit connected to the post insertion hole are formed; a holding member that is disposed so as to extend from one end portion of the annular portion to the other end portion of the annular portion with the slit interposed therebetween in a width direction that is a direction crossing an axial direction of the battery post and crossing the slit; an annular portion holding portion that is provided at one end portion of the holding member and holds the annular portion; a fastening member supporting portion that is provided at the other end portion of the holding member; a fastening member that is supported by the fastening member supporting portion so as to be rotatable about the axial direction; a member to be fastened that is threadably engaged with the fastening member; and a pressing force converting member that is disposed so as to come into contact with the annular portion from the other end portion side of the holding member and converts an axial-direction fastening force, which is generated between the fastening member and the member to be fastened with the rotation of the fastening member about the axial direction, into a width-direction pressing force that presses the annular portion in a direction, in which an interval of the slit of the annular portion is reduced, of the width direction.

In the battery terminal according to another aspect of the present invention, it is preferable that the holding member is a penetrating plate that is disposed so as to penetrate the annular portion from one end portion of the annular portion to the other end portion of the annular portion with the slit interposed therebetween in the width direction that is the direction crossing the axial direction of the battery post and crossing the slit, and the annular portion holding portion is a retaining portion that is provided at one end portion of the penetrating plate and prevents the penetrating plate from being detached from the annular portion.

In the battery terminal according to still another aspect of the present invention, it is preferable that the member to be fastened includes a threaded hole that is provided at the other end portion of the penetrating plate so as to pass through the penetrating plate in the axial direction, the fastening member is a bolt that is threadably engaged with the threaded hole so as to be rotatable about the axial direction, the fastening member supporting portion includes the threaded hole, the pressing force converting member is a spacer which is disposed so as to be movable relative to the penetrating plate in the width direction and of which one end in the width direction comes into contact with a head portion of the bolt and the other end in the width direction comes into contact with the annular portion, a tapered surface is formed on at least one of the head portion of the bolt that comes into contact with the spacer, and the other end of the spacer that comes into contact with the bolt, and the tapered surface is inclined in a direction in which an axial-direction pressing force of the bolt pressing the spacer by a fastening force, which is generated between the bolt and the penetrating plate when the bolt approaches the threaded hole with the rotation of the bolt about the axial direction, is converted into a width-direction pressing force of the spacer pressing the annular portion in a direction in which an interval of the slit of the annular portion is reduced.

In the battery terminal according to still another aspect of the present invention, it is preferable that the fastening member supporting portion includes an elongated hole that is provided at the other end portion of the penetrating plate so as to pass through the penetrating plate in the axial direction and is formed along the width direction, the fastening member is a bolt that is supported by the hole of the penetrating plate so as to be rotatable about the axial direction, the member to be fastened is a nut that faces the bolt with the penetrating plate interposed therebetween in the axial direction, is threadably engaged with the bolt, and includes a tapered surface formed on one end of the nut in the width direction and coming into contact with the penetrating plate, the rotation of the nut about the axial direction being regulated and the other end of the nut in the width direction coming into contact with the annular portion, the pressing force converting member is the nut, and the tapered surface formed on the nut is inclined in a direction in which an axial-direction fastening force, which is generated between the bolt and the nut when the nut approaches the bolt in the axial direction with the rotation of the bolt about the axial direction, is converted into a width-direction pressing force of the nut pressing the annular portion in a direction in which an interval of the slit of the annular portion is reduced.

In the battery terminal according to still another aspect of the present invention, it is preferable that the fastening member supporting portion includes an elongated hole that is provided at the other end portion of the penetrating plate so as to pass through the penetrating plate in the axial direction and is formed along the width direction, the fastening member is a bolt that is supported by the hole of the penetrating plate so as to be rotatable about the axial direction, the member to be fastened is a nut that faces the bolt with the penetrating plate interposed therebetween in the axial direction and is threadably engaged with the bolt, the pressing force converting member is a spacer that is disposed between the bolt and the penetrating plate so as to allow the bolt to penetrate the spacer and includes a tapered surface formed on one end of the spacer in the width direction and coming into contact with the penetrating plate, the rotation of the spacer about the axial direction being regulated and the other end of the spacer in the width direction coming into contact with the annular portion, and the tapered surface formed on the spacer is inclined in a direction in which an axial-direction fastening force, which is generated between the bolt and the nut when the bolt approaches the nut in the axial direction with the rotation of the bolt about the axial direction, is converted into a width-direction pressing force of the spacer pressing the annular portion in a direction in which an interval of the slit of the annular portion is reduced.

In the battery terminal according to still another aspect of the present invention, it is preferable that the fastening member supporting portion includes a hole that is provided at the other end portion of the penetrating plate so as to pass through the penetrating plate in the axial direction, the fastening member is a bolt that is supported by the hole of the penetrating plate so as to be rotatable about the axial direction, the member to be fastened is a nut that faces the bolt with the penetrating plate interposed therebetween in the axial direction and is threadably engaged with the bolt, the pressing force converting member includes a first spacer which is disposed between the bolt and the penetrating plate so as to allow the bolt to penetrate the first spacer and of which the rotation about axial direction is regulated, and a second spacer which is disposed so as to be movable relative to the penetrating plate in the width direction and of which one end in the width direction comes into contact with the annular portion and the other end in the width direction comes into contact with the first spacer, a first tapered surface, which comes into contact with the second spacer, is formed on one end of the first spacer in the width direction, a second tapered surface, which comes into contact with the first tapered surface, is formed on the other end of the second spacer in the width direction, and the first tapered surface formed on the first spacer and the second tapered surface formed on the second spacer are inclined in a direction in which an axial-direction fastening force, which is generated between the bolt and the nut when the bolt approaches the nut in the axial direction with the rotation of the bolt about the axial direction, is converted into a width-direction pressing force of the second spacer pressing the annular portion in a direction in which an interval of the slit of the annular portion is reduced.

In the battery terminal according to still another aspect of the present invention, it is preferable that the hole has the shape of an elongated hole along the width direction, a third tapered surface, which is provided on a back side of the first tapered surface in the width direction and comes into contact with the penetrating plate, is formed on the first spacer, and the third tapered surface formed on the first spacer is inclined in a direction in which an axial-direction fastening force, which is generated between the bolt and the nut when the bolt approaches the nut in the axial direction with the rotation of the bolt about the axial direction, is converted into a pulling force for pulling the retaining portion toward the hole in the width direction through the penetrating plate coming into contact with the third tapered surface.

In the battery terminal according to still another aspect of the present invention, it is preferable that the member to be fastened includes a threaded hole that is provided at the other end portion of the penetrating plate so as to pass through the penetrating plate in the axial direction, the fastening member is a bolt that is supported by the threaded hole so as to be rotatable about the axial direction, the fastening member supporting portion includes the threaded hole, the pressing force converting member includes a first spacer which is disposed between the bolt and the penetrating plate so as to allow the bolt to penetrate the first spacer and of which the rotation about axial direction is regulated, and a second spacer which is disposed so as to be movable relative to the penetrating plate in the width direction and of which one end in the width direction comes into contact with the annular portion and the other end in the width direction comes into contact with the first spacer, a first tapered surface, which comes into contact with the second spacer, is formed on one end of the first spacer in the width direction, a second tapered surface, which comes into contact with the first tapered surface, is formed on the other end of the second spacer in the width direction, and the first tapered surface formed on the first spacer and the second tapered surface formed on the second spacer are inclined in a direction in which an axial-direction fastening force, which is generated between the bolt and the threaded hole when the bolt approaches the threaded hole in the axial direction with the rotation of the bolt about the axial direction, is converted into a width-direction pressing force of the second spacer pressing the annular portion in a direction in which an interval of the slit of the annular portion is reduced.

In the battery terminal according to still another aspect of the present invention, it is preferable that the retaining portion is a plate-like member that is disposed at the one end portion of the penetrating plate so as to be orthogonal to the penetrating plate and is formed integrally with the penetrating plate.

In the battery terminal according to still another aspect of the present invention, it is preferable that the retaining portion includes a notch portion that is provided at the one end portion of the penetrating plate, and a plate-like member that is fitted to the notch portion and is disposed so as to be orthogonal to the penetrating plate.

In the battery terminal according to still another aspect of the present invention, it is preferable that the fastening member supporting portion includes a hole that is provided at the other end portion of the penetrating plate so as to pass through the penetrating plate in the axial direction, the fastening member is a bolt that is supported by the hole of the penetrating plate so as to be rotatable about the axial direction, the penetrating plate includes two flat plate portions that are disposed so as to face each other with a predetermined gap interposed therebetween in the axial direction, and a connecting portion that connects the two flat plate portions at an edge portion of the other end portion, the member to be fastened is a nut that is disposed between the two flat plate portions of the penetrating plate and is threadably engaged with the bolt through the hole, the pressing force converting member is a spacer which is disposed between the bolt and the penetrating plate so as to allow the bolt to penetrate the spacer and of which the rotation about axial direction is regulated, the spacer is provided with a first tapered surface coming into contact with an end portion of the annular portion in the width direction, which is opposite to the end portion of the annular portion held by the retaining portion, and the first tapered surface formed on the spacer is inclined in a direction in which an axial-direction fastening force, which is generated between the bolt and the nut when the bolt approaches the nut in the axial direction with the rotation of the bolt about the axial direction, is converted into a width-direction pressing force of the spacer pressing the annular portion in a direction in which an interval of the slit of the annular portion is reduced.

In the battery terminal according to still another aspect of the present invention, it is preferable that the hole has the shape of an elongated hole along the width direction, a second tapered surface, which is provided on a back side of the first tapered surface in the width direction and comes into contact with the penetrating plate, is formed on the spacer, the second tapered surface formed on the spacer is inclined in a direction in which an axial-direction fastening force, which is generated between the bolt and the nut when the bolt approaches the nut in the axial direction with the rotation of the bolt about the axial direction, is converted into a pulling force for pulling the retaining portion toward the hole in the width direction through the penetrating plate coming into contact with the second tapered surface.

In the battery terminal according to still another aspect of the present invention, it is preferable that a third tapered surface, which comes into contact with the first tapered surface of the spacer, is formed on an end portion of the annular portion in the width direction that comes into contact with the spacer.

In the battery terminal according to still another aspect of the present invention, it is preferable that the fastening member supporting portion includes a hole that is provided at the other end portion of the holding member so as to pass through the holding member in the axial direction, the fastening member is a bolt that is supported by the hole of the holding member so as to be rotatable about the axial direction, the member to be fastened is a nut that faces the bolt with the holding member interposed therebetween in the axial direction and is threadably engaged with the bolt, the pressing force converting member is a spacer which is disposed between the bolt and the holding member so as to allow the bolt to penetrate the spacer and of which the rotation about axial direction is regulated, the spacer is provided with a first tapered surface coming into contact with an end portion of the annular portion in the width direction, which is opposite to the end portion of the annular portion held by the annular portion holding portion, and the first tapered surface formed on the spacer is inclined in a direction in which an axial-direction fastening force, which is generated between the bolt and the nut when the bolt approaches the nut in the axial direction with the rotation of the bolt about the axial direction, is converted into a width-direction pressing force of the spacer pressing the annular portion in a direction in which an interval of the slit of the annular portion is reduced.

In the battery terminal according to still another aspect of the present invention, it is preferable to further include an edge protruding portion that is provided at an edge portion of the other end portion of the holding member and protrudes toward a side where the bolt is disposed in the axial direction, wherein the hole has the shape of an elongated hole along the width direction, a second tapered surface, which is provided on a back side of the first tapered surface in the width direction and comes into contact with the edge protruding portion of the holding member, is formed on the spacer, and the second tapered surface formed on the spacer is inclined in a direction in which an axial-direction fastening force, which is generated between the bolt and the nut when the bolt approaches the nut in the axial direction with the rotation of the bolt about the axial direction, is converted into a pulling force for pulling the annular portion holding portion of the holding member toward the fastening member supporting portion in the width direction through the edge protruding portion coming into contact with the second tapered surface.

In the battery terminal according to still another aspect of the present invention, it is preferable that the battery post stands on a bottom of a recess formed on an upper surface of a battery housing, and the fastening member is supported at a position where at least a part of the fastening member protrudes from the upper surface in the axial direction in a state in which the battery post is inserted into the post insertion hole and the fastening member is supported by the fastening member supporting portion.

In the battery terminal according to still another aspect of the present invention, it is preferable that the member to be fastened includes a threaded hole that is provided at the other end portion of the penetrating plate so as to pass through the penetrating plate in the axial direction, the fastening member is a bolt that is supported by the threaded hole so as to be rotatable about the axial direction, the fastening member supporting portion includes the threaded hole, the pressing force converting member includes a spacer which is disposed between the bolt and the penetrating plate so as to allow the bolt to penetrate the spacer and of which the rotation about axial direction is regulated, and a tapered portion that is formed at an end portion of the annular portion in the width direction so as to be integrated with the annular portion, is provided so as to be movable relative to the penetrating plate in the width direction, and comes into contact with the spacer, a first tapered surface, which comes into contact with the tapered portion, is formed on the spacer, a second tapered surface, which comes into contact with the first tapered surface, is formed on the tapered portion, and the first tapered surface formed on the spacer and the second tapered surface formed on the tapered portion are inclined in a direction in which an axial-direction fastening force, which is generated between the bolt and the threaded hole when the bolt approaches the threaded hole in the axial direction with the rotation of the bolt about the axial direction, is converted into a width-direction pressing force of the spacer pressing the tapered portion in a direction in which an interval of the slit of the annular portion is reduced.

In the battery terminal according to still another aspect of the present invention, it is preferable that the retaining portion includes a notch portion that is provided at the one end portion of the penetrating plate, and a plate-like member that is fitted to the notch portion and is disposed so as to be orthogonal to the penetrating plate.

The above and other objects, features, advantages and technical and industrial significance of this invention will be better understood by reading the following detailed description of presently preferred embodiments of the present invention, when considered in connection with the accompanying drawings.

BRIEF DESCRIPTION OF THE DRAWINGS

FIG. 8 is an exploded perspective view of the battery terminal illustrated in FIG. 7;

FIG. 9 is a schematic view illustrating a state in which the battery terminal according to the second embodiment of the present invention is not yet fastened to a battery post;

FIG. 10 is a schematic view illustrating a state in which the battery terminal according to the second embodiment of the present invention has been fastened to the battery post;

FIG. 13 is a schematic view illustrating a state in which the battery terminal according to the third embodiment of the present invention is not yet fastened to a battery post;

FIG. 14 is a schematic view illustrating a state in which the battery terminal according to the third embodiment of the present invention has been fastened to the battery post;

DETAILED DESCRIPTION OF THE PREFERRED EMBODIMENTS

Figure 1:
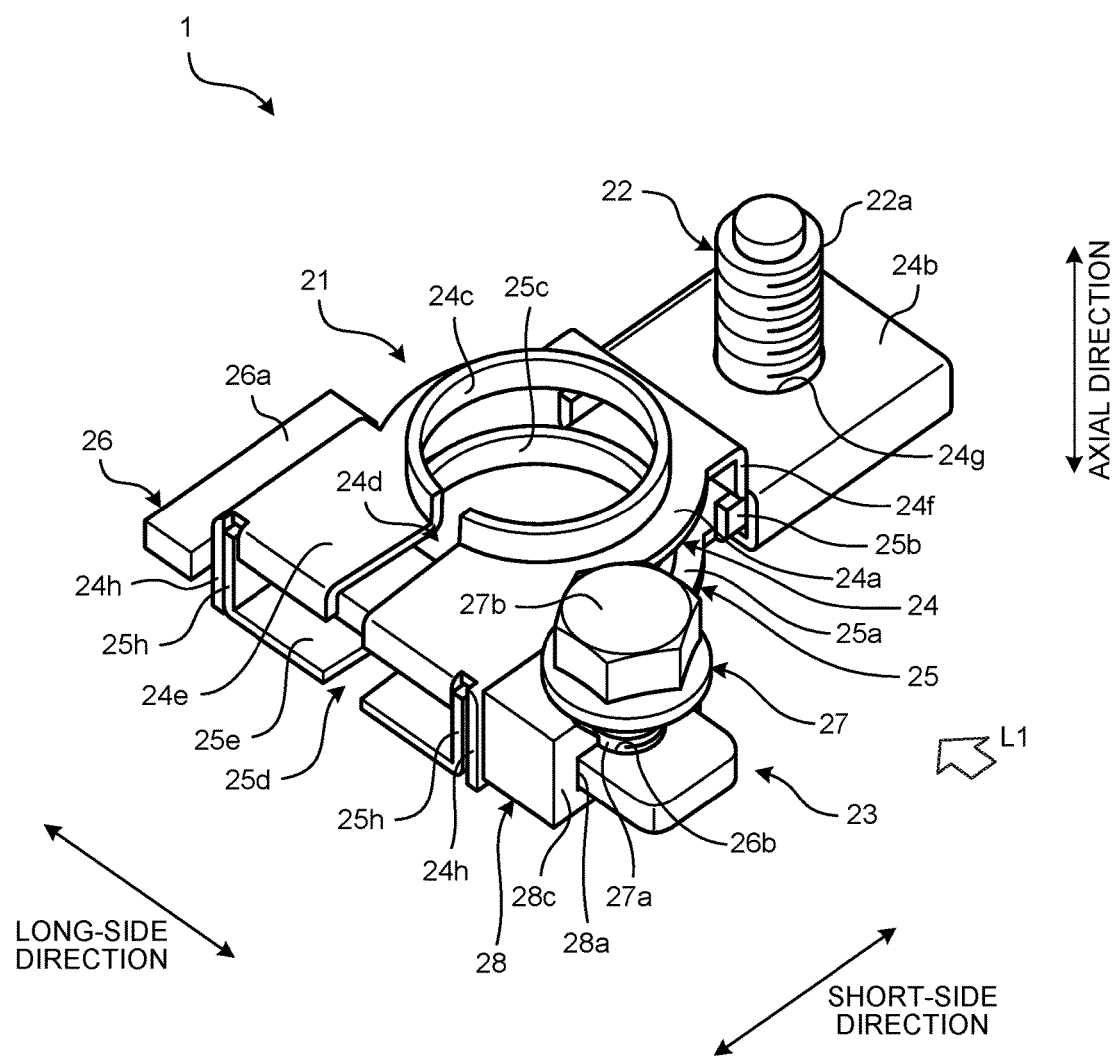
FIG. 1 is a perspective view illustrating the schematic structure of a battery terminal according to a first embodiment of the present invention.

Battery terminals according to embodiments of the present invention will be described below with reference to the drawings. Meanwhile, the same portions or corresponding portions in the following drawings are denoted by the same reference numerals, and the description thereof will not be repeated.

First Embodiment

Figure 2:
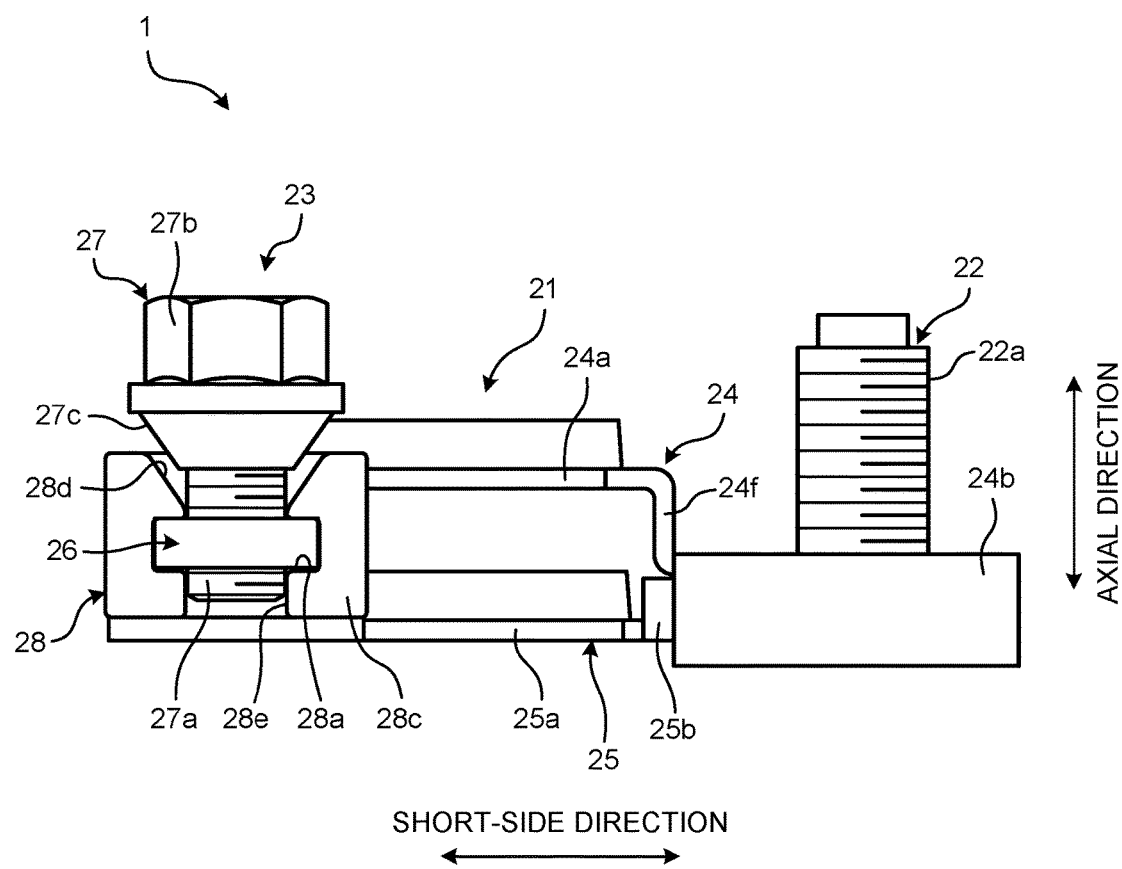
FIG. 2 is a view taken in the direction of an arrow L1 of FIG. 1.
Figure 3:
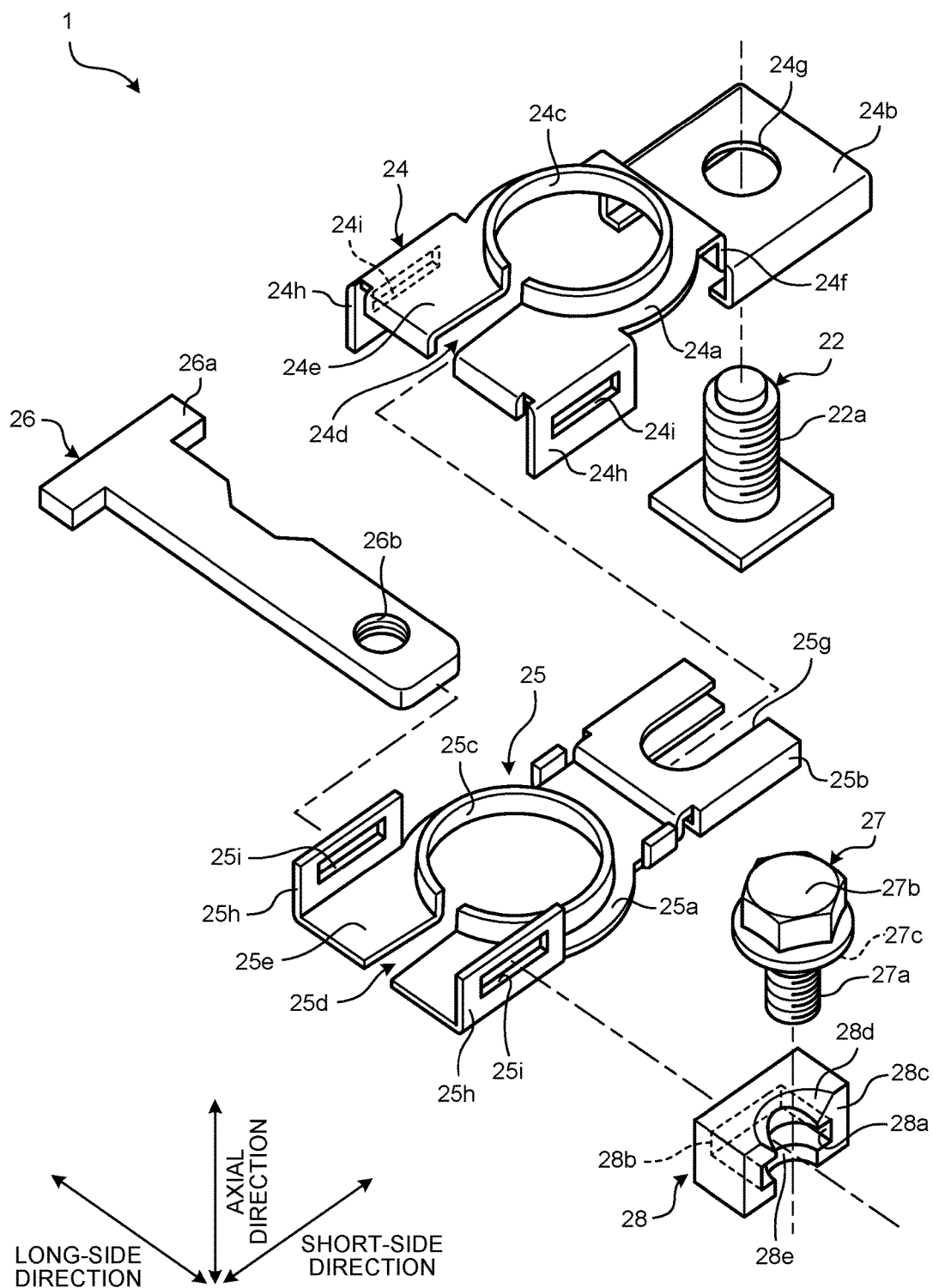
FIG. 3 is an exploded perspective view of the battery terminal illustrated in FIG. 1.

A first embodiment will be described with reference to FIGS. 1 to 6. First, the structure of a battery terminal 1 according to the first embodiment will be described with reference to FIGS. 1 to 4. FIG. 1 is a perspective view illustrating the schematic structure of the battery terminal according to the first embodiment of the present invention, FIG. 2 is a view taken in the direction of an arrow L1 of FIG. 1, FIG. 3 is an exploded perspective view of the battery terminal illustrated in FIG. 1, and FIG. 4 is a perspective view illustrating a state in which the battery terminal illustrated in FIG. 1 is mounted on a battery.

Figure 4:
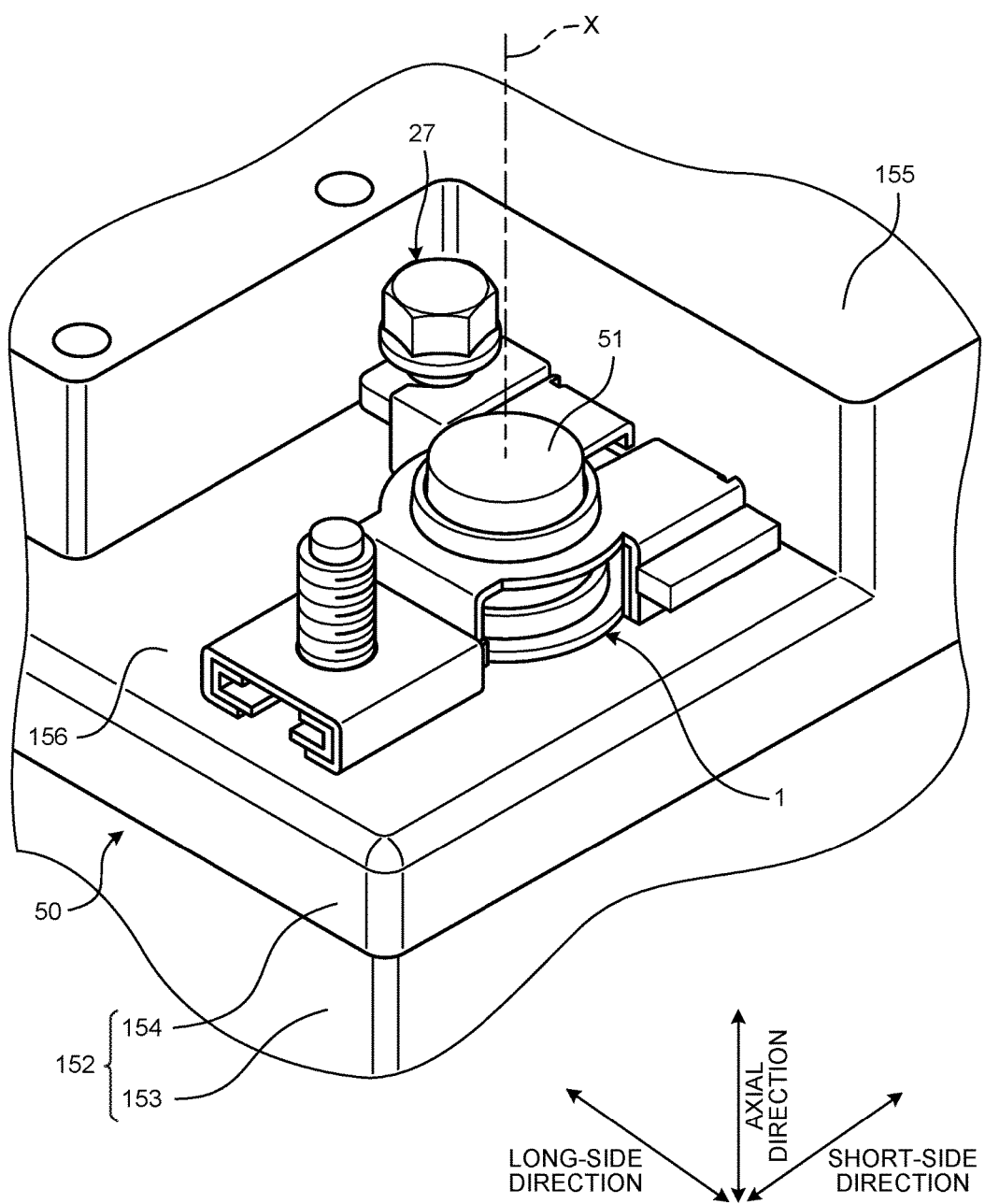
FIG. 4 is a perspective view illustrating a state in which the battery terminal illustrated in FIG. 1 is mounted on a battery.

As illustrated in FIG. 4, the battery terminal 1 according to this embodiment is combined with a battery post 51 of a battery 50. The battery terminal 1 is a component that electrically connects the battery 50 to metal fittings or the like provided at an end of an electrical wire of a body of a vehicle or the like on which the battery 50 is mounted, by being mounted on the battery post 51.

Meanwhile, in the following description, a direction parallel to a central axis X of the battery post 51 is referred to as "an axial direction". Further, here, to facilitate the understanding of the following description, for convenience, one of two directions orthogonal to the axial direction is referred to as a long-side direction (a width direction) and the other thereof is referred to as a short-side direction. The axial direction, the long-side direction, and the short-side direction are orthogonal to one another.

Here, the battery 50 to which the battery terminal 1 is applied is mounted on a vehicle or the like as a power storage device. As illustrated in FIG. 4, the battery 50 includes a battery housing 152 that receives battery fluid and various components of the battery 50, the above-mentioned battery post 51 that provided in the battery housing 152, and the like. The battery housing 152 includes a substantially rectangular box-shaped housing body 153 of which any one side is opened and a lid member 154 that closes the opened side, and is formed in a substantially rectangular parallelepiped shape as a whole. Here, the battery housing 152 has long sides parallel to the long-side direction and short sides parallel to the short-side direction, but is not limited thereto. The battery post 51 is made of lead or the like, and stands on a post-standing surface 155 of the lid member 154. The post-standing surface 155 is a surface of the battery housing 152 on which the battery post 51 stands. Here, the post-standing surface 155 is, for example, an upper surface of the lid member 154 in a vertical direction in a state in which the battery 50 is mounted on a vehicle or the like. The battery post 51 is formed in a substantially columnar shape, and stands on the post-standing surface 155 so as to protrude in a positional relationship in which the central axis X is orthogonal to the post-standing surface 155. In more detail, the battery post 51 of this embodiment stands in a recess 156 that is formed near a position of a corner of the post-standing surface 155. The recess 156 is a portion that is depressed in a substantially rectangular shape near a position of a corner of the post-standing surface 155. That is, the battery post 51 stands on the bottom of the recess 156 formed on the post-standing surface 155 that is the upper surface of the battery housing 152. Typically, the battery post 51 is tapered so that the diameter of the battery post is reduced toward the tip of the battery post in the axial direction. That is, the battery post 51 is formed in a tapered shape so that the outer diameter of the tip of the battery post is smaller than the outer diameter of the base end of the battery post. Meanwhile, a case in which the axial direction of the battery post 51 is a direction parallel to the vertical direction and the above-mentioned long-side direction and the above-mentioned short-side direction are directions parallel to a horizontal direction in a state in which the battery 50 is mounted on a vehicle or the like will be described below. The battery terminal 1 is fastened to the battery post 51 having the above-mentioned structure.

The battery terminal 1 of this embodiment is a terminal of a type in which a fastening member (a fastening bolt 27 to be described below) is tightened from above in the vertical direction when being fastened to the battery post 51. Further, a fastening force, which is generated in a direction parallel to the axial direction by the fastening member, is converted into a pressing force applied in a tightening direction (the width direction) crossing the axial direction and a portion of the battery terminal 1 into which the battery post 51 is inserted is pressed by the pressing force, so that the battery terminal 1 of this embodiment is fastened to the battery post 51. In this case, since the battery terminal 1 of this embodiment has a structure in which the fastening member is tightened from above in the vertical direction, the battery terminal 1 of this embodiment is adapted so that a work space for a tool used to tighten the fastening member is formed above the battery 50 and a work space formed on the lateral side of the battery 50 is reduced.

Specifically, as illustrated in FIGS. 1 and 2, the battery terminal 1 of this embodiment includes a main body 21, a stud bolt 22, and a fastening section 23. Meanwhile, in the following description, there are cases in which directions, which become the axial direction, the long-side direction, and the short-side direction in a state in which the battery terminal 1 is mounted on the battery post 51, are simply referred to as "an axial direction", "a long-side direction", and "a short-side direction".

As illustrated in FIGS. 1 to 3, the main body 21 of this embodiment has a two-layer split structure that includes an upper split body 24 and a lower split body 25. Here, the main body 21 is in a state in which the upper split body 24 is positioned on the upper side in the vertical direction and the lower split body 25 is positioned on the lower side in the vertical direction so as to be stacked and face each other in the axial direction (the vertical direction) when the battery terminal 1 is mounted on the battery post 51. A stacking direction in which the upper split body 24 and the lower split body 25 are stacked is a direction parallel to the axial direction of the battery post 51 in a state in which the battery terminal 1 is mounted on the battery post 51. Here, a side toward which a shaft portion 22a of the stud bolt 22 to be described below protrudes is an upper side in the stacking direction and a side opposite to the upper side is a lower side in the stacking direction. Further, the upper side in the stacking direction corresponds to the tip side of the battery post 51, and the lower side in the stacking direction corresponds to the base end side of the battery post 51. That is, the upper split body 24 of the main body 21 is positioned on the upper side in the stacking direction, and the lower split body 25 thereof is positioned on the lower side in the stacking direction.

Annular portions 24a and 25a, bolt holding portions 24b and 25b, and the like of the upper and lower split bodies 24 and 25 are integrally formed by the pressing and bending of, for example, conductive metal plates. Since the main body 21 of this embodiment has the two-layer split structure that includes the upper and lower split bodies 24 and 25, the main body 21 can be easily manufactured by, for example, a smaller press.

A pair of annular portions 24a and 25a is formed in a substantially annular shape, and substantially circular post insertion holes 24c and 25c into which the battery post 51 is inserted and slits (gaps) 24d and 25d connected to the post insertion holes 24c and 25c are formed in the annular portions 24a and 25a.

The post insertion holes 24c and 25c are formed at the annular portions 24a and 25a, respectively, so as to have a positional relationship in which the post insertion holes 24c and 25c face each other in the stacking direction in a state in which the upper and lower split bodies 24 and 25 are stacked in the vertical direction and are mounted on the battery post 51. Metal plates are folded in the same direction, that is, folded upward here, so that inner peripheral wall surfaces of the post insertion holes 24c and 25c are formed. The inner peripheral wall surface of each of the post insertion holes 24c and 25c has taper that corresponds to the taper of the above-mentioned battery post 51. Here, the inner diameters of the post insertion holes 24c and 25c become the minimum on the side toward which the shaft portion 22a of the stud bolt 22 to be described below protrudes, that is, on the post insertion hole 24c side, and the inner diameters of the post insertion holes 24c and 25c become the maximum on the post insertion hole 25c side opposite to the post insertion hole 24c side. The inner peripheral surfaces of the post insertion holes 24c and 25c come into contact with the battery post 51 in a state in which the battery post 51 inserted into the post insertion holes 24c and 25c.

The slits 24d and 25d are formed at the annular portions 24a and 25a, respectively, so as to have a positional relationship in which the slits 24d and 25d face each other in the stacking direction in a state in which the upper and lower split bodies 24 and 25 are stacked in the vertical direction and are mounted on the battery post 51. Here, the slits 24d and 25d are formed so as to divide a part of the annular portions 24a and 25a from the post insertion holes 24c and 25c. Further, the annular portions 24a and 25a include plate-like protruding portions 24e and 25e that are held and tightened by the fastening section 23 to be described below and are formed at end portions thereof where the slits 24d and 25d are formed. The plate-like protruding portion 24e is integrally formed so as to be connected to a portion of the annular portion 24a, at which the post insertion hole 24c is formed, without a stepped portion or the like. Likewise, the plate-like protruding portion 25e is also integrally formed so as to be connected to a portion of the annular portion 25a, at which the post insertion hole 25c is formed, without a stepped portion or the like. The slit 24d passes through the plate-like protruding portion 24e from the post insertion hole 24c. The slit 25d passes through the plate-like protruding portion 25e from the post insertion hole 25c.

As illustrated in FIG. 3, both ends of the plate-like protruding portion 24e in the long-side direction are bent downward, and holes 24i where a penetrating plate 26 (a holding member) to be described below penetrates are formed at edge portions 24h, which have been bent downward, of the plate-like protruding portion 24e, respectively. Meanwhile, both ends of the plate-like protruding portion 25e in the long-side direction are bent upward, and holes 25i where the penetrating plate 26 to be described below penetrates are also formed at edge portions 25h, which are bent upward, of the plate-like protruding portion 25e, respectively. The edge portions 24h of the upper split body 24 and the edge portions 25h of the lower split body 25 overlap each other in a state in which the upper and lower split bodies 24 and 25 are combined with each other, and the holes 24i and 25i formed at the edge portions 24h and 25h are formed so as to pass through the edge portions in the long-side direction.

That is, the plate-like protruding portion 24e that is divided by the slit 24d and the edge portions 24h that are connected to the divided plate-like protruding portions can also be expressed as one end portion and the other portion of the annular portion 24a. Likewise, the plate-like protruding portion 25e that is divided by the slit 25d and the edge portions 25h that are connected to the divided plate-like protruding portions can also be expressed as one end portion and the other portion of the annular portion 25ac.

As illustrated in FIG. 3, the pair of bolt holding portions 24b and 25b are formed in a substantially rectangular shape. The bolt holding portion 24b is integrally formed so as to be connected to a portion of the annular portion 24a opposite to a portion of the annular portion 24a where the slit 24d is formed, that is, a portion of the annular portion 24a where the plate-like protruding portion 24e is formed, through a stepped portion 24f or the like. The bolt holding portion 25b is integrally formed so as to be connected to a portion of the annular portion 25a opposite to a portion of the annular portion 25a where the slit 25d is formed, that is, a portion of the annular portion 25a where the plate-like protruding portion 25e is formed, without a stepped portion or the like. The bolt holding portion 24b is provided with a substantially circular bolt insertion hole 24g into which the stud bolt 22 is inserted. The bolt holding portion 25b is provided with a slide opening 25g where the stud bolt 22 slides when the upper and lower split bodies 24 and 25 are combined with each other.

Here, the shaft portion 22a of the stud bolt 22, which are held by the bolt holding portions 24b and 25b, protrudes and is exposed from the slide opening 25g and the bolt insertion hole 24g in a state in which the stud bolt 22 is held between the bolt holding portions 24b and 25b. Metal fittings or the like provided at the end of an electrical wire are electrically connected to the shaft portion 22a of the stud bolt 22 that is exposed from the bolt insertion hole 24g. The bolt holding portions 24b and 25b are provided with predetermined folded portions so as to be capable of holding a rectangular plate-like pedestal portion on which the shaft portion 22a of the stud bolt 22 stands.

When the main body 21 is assembled, the stud bolt 22 of which the shaft portion 22a stands on the rectangular plate-like pedestal portion is combined with the upper split body 24 first. At this time, the stud bolt 22 is in a state in which the shaft portion 22a is inserted into the bolt insertion hole 24g and is exposed from the bolt insertion hole 24g and is in a state in which the rectangular plate-like pedestal portion is held in the folded portion of the bolt holding portion 24b. Further, the lower split body 25 is combined with the upper split body 24 from the stepped portion 24f side of the bolt holding portion 24b in a state in which the stud bolt 22 is held by the bolt holding portion 24b of the upper split body 24. In more detail, an upper plate portion of the bolt holding portion 25b at which the slide opening 25g is formed is combined with the upper split body 24 so as to be inserted between an upper plate portion of the bolt holding portion 24b and the pedestal portion of the stud bolt 22. At this time, the slide opening 25g formed at the bolt holding portion 25b slides on the periphery of the shaft portion 22a of the stud bolt 22.

Further, the main body 21 is a state in which the annular portion 24a and the bolt holding portion 24b of the upper split body 24 and the annular portion 25a and the bolt holding portion 25b of the lower split body 25 are stacked in a positional relationship in which the annular portion 24a and the bolt holding portion 24b of the upper split body 24 and the annular portion 25a and the bolt holding portion 25b of the lower split body 25 face each other in the vertical direction. The stud bolt 22 is held by the bolt holding portions 24b and 25b in a state in which the upper and lower split bodies 24 and 25 of the main body 21 are stacked as described above. Then, while the stud bolt 22 is held by the bolt holding portions 24b and 25b, the main body 21 is held by a fastening section 23 to be described below and is integrated.

Furthermore, the main body 21 of this embodiment has had the two-layer split structure that includes the upper and lower split bodies 24 and 25, but is not limited thereto. For example, the upper and lower split bodies 24 and 25 of the main body 21 may be integrally formed through a bent connecting portion or the like and may then be subjected to bending. In this case, the pair of bolt holding portions 24b and 25b holds the stud bolt 22 while being stacked in the vertical direction through the bent connecting portion by being bent in a state in which the stud bolt 22 is inserted into the bolt insertion hole 24g in advance before bending.

The fastening section 23 fastens the pair of annular portions 24a and 25a to the battery post 51 in a state in which the battery post 51 is inserted into the post insertion holes 24c and 25c. The fastening section 23 of this embodiment includes a penetrating plate 26, a fastening bolt 27 (a fastening member), and a spacer 28 (a pressing force converting member).

The penetrating plate 26 is a plate-like member that is disposed so as to penetrate the slits 24d and 25d and the plate-like protruding portions 24e and 25e in the long-side direction. In other words, the penetrating plate 26 penetrates the upper and lower split bodies from one end portions of the annular portions 24a and 25a to the other end portions of the annular portions 24a and 25a with the slits 24d and 25d interposed therebetween. The penetrating plate 26 is mounted on the main body 21 along the long-side direction so as to cross the slits 24d and 25d by penetrating the holes 24i that are formed at the edge portions 24h of the upper split body 24 and the holes 25i that are formed at the edge portions 25h of the lower split body 25.

The penetrating plate 26 includes a retaining portion 26a (an annular portion holding portion) at one end portion thereof. The retaining portion 26a prevents the penetrating plate 26 from being detached from the main body 21 toward the other end portion, which is opposite to one end portion of the penetrating plate 26 at which the retaining portion 26a is provided, in a state in which the penetrating plate 26 penetrates both ends of the annular portions 24a and 25a, that is, a state in which the penetrating plate 26 penetrates the holes 24i and 25i and is mounted on the main body 21. Specifically, the retaining portion 26a is formed so as to be longer than the inner diameters of the holes 24i and 25i in the short-side direction, and the penetrating plate 26 is adapted to bump against the edge portions 24h and 25h when being inserted into the holes 24i and 25i toward the other end portion side by a predetermined length.

Further, a threaded hole 26b (a fastening member supporting portion, a member to be fastened) is provided at the other end portion of the penetrating plate 26, which is opposite to one end portion of the penetrating plate 26 at which the retaining portion 26a is provided, so as to pass through the penetrating plate 26 in the axial direction. The threaded hole 26b also has a function to support the fastening bolt 27 at a predetermined position in the axial direction.

Meanwhile, the penetrating plate 26 also functions as a holding member that is disposed so as to extend from one end portions of the annular portions 24a and 25a to the other end portions of the annular portions 24a and 25a with the slits 24d and 25d interposed therebetween in the long-side direction. Furthermore, the retaining portion 26a also functions as an annular portion holding portion that is provided at one end portion of the penetrating plate 26 serving as the holding member and holds the annular portions 24a and 25a.

The fastening bolt 27 (hereinafter, also simply referred to as "a bolt") includes a shaft portion 27a on which a threaded groove is formed, and a head portion 27b that is integrally formed at one end portion of the shaft portion 27a. The shaft portion 27a is a portion that is threadably engaged with the threaded hole 26b of the penetrating plate 26. The head portion 27b is a portion that is gripped by a tool or the like so that the tool or the like rotates the fastening bolt 27 about the shaft portion 27a. The fastening bolt 27 is supported by the threaded hole 26b of the penetrating plate 26 at a predetermined position in the axial direction so as to be rotatable about the axial direction, and the shaft portion 27a is threadably engaged with the threaded hole 26b in the axial direction. Moreover, a bolt-side tapered surface 27c (a tapered surface) is formed on the seat surface of the head portion 27b of the fastening bolt 27 over the entire circumference around the axial direction. The bolt-side tapered surface 27c is formed so as to maintain a state in which the bolt-side tapered surface 27c and a spacer-side tapered surface 28d of the spacer 28 to be described below come into contact with each other while the fastening bolt 27 is threadably engaged with the threaded hole 26b.

As illustrated in FIG. 4 and the like, the fastening bolt 27 of this embodiment is supported at a position where at least a part of the fastening bolt 27 protrudes from an upper surface (the post-standing surface 155) of the battery housing 152 in the axial direction in a state in which the battery post 51 is inserted into the post insertion holes 24c and 25c and the fastening bolt 27 is supported by the threaded hole 26b of the penetrating plate 26.

The spacer 28 is disposed between the fastening bolt 27, which is threadably engaged with the threaded hole 26b, and the edge portion 25h of the main body 21, and adjusts the relative positions of both the fastening bolt 27 and the edge portion 25h. The spacer 28 is a member having a substantially rectangular parallelepiped shape. The spacer 28 is provided with a through hole 28a that passes through one end face 28b and the other end face 28c disposed so as to face each other in the long-side direction. The size of the through hole 28a is substantially equal to the sizes of the holes 24i and 25i, and the penetrating plate 26 penetrates the through hole 28a. Accordingly, the spacer 28 is adapted to be movable relative to the penetrating plate 26 in the long-side direction. One end face 28b of the spacer 28 in the long-side direction comes into contact with the edge portion 24h of the annular portion 24a from the end portion (the other end portion) side of the penetrating plate 26 at which the threaded hole 26b is provided. A fitting groove 28e to which at least a part of the shaft portion 27a of the fastening bolt 27 is fitted is provided in the axial direction on the other end face 28c of the spacer 28 in the long-side direction, and the spacer-side tapered surface 28d (a tapered surface) is formed at an upper end of the fitting groove 28e in the axial direction. The spacer-side tapered surface 28d is formed so as to maintain a state in which the spacer-side tapered surface 28d and the bolt-side tapered surface 27c of the fastening bolt 27 come into contact with each other while the fastening bolt 27 is threadably engaged with the threaded hole 26b.

Here, the bolt-side tapered surface 27c of the fastening bolt 27 and the spacer-side tapered surface 28d of the spacer 28 are formed so as to be inclined in a direction in which an axial-direction pressing force F1 (see FIG. 6) of the fastening bolt 27 pressing the spacer 28 by a fastening force, which is generated between the fastening bolt 27 and the penetrating plate 26 when the fastening bolt 27 approaches the threaded hole 26b with the rotation of the fastening bolt 27 about the axial direction, is converted into a long-side-direction pressing force F2 (see FIG. 6) of the spacer 28 pressing the edge portions 24h and 25h of the annular portions 24a and 25a in the direction in which intervals of the slits 24d and 25d of the annular portions 24a and 25a are reduced. In this embodiment, the bolt-side tapered surface 27c of the fastening bolt 27 is a side surface of a truncated cone of which the horizontal cross-sectional area of an axially lower portion is smaller than that of an axially upper portion, and is inclined so that the radius of the bolt-side tapered surface 27c from the axis of the fastening bolt 27 is increased toward the axially upper side. Meanwhile, the spacer-side tapered surface 28d of the spacer 28 is a side surface of an inverted truncated cone of which the horizontal cross-sectional area of an axially lower portion is smaller than that of an axially upper portion, and is inclined so that the radius of the spacer-side tapered surface 28d from the axis of the fastening bolt 27 is increased toward the axially upper side.

That is, the spacer 28 functions as a pressing force converting member that is disposed between the fastening bolt 27 and the edge portions 24h and 25h of the annular portions 24a and 25a so as to come into contact with both the fastening bolt 27 and the edge portions 24h and 25h and converts an axial-direction fastening force, which is generated with the rotation of the fastening bolt 27 about the axial direction, into a long-side-direction pressing force, which presses the edge portions 24h and 25h of the annular portions 24a and 25a in a direction in which the intervals of the slits 24d and 25d of the annular portions 24a and 25a are reduced, by the bolt-side tapered surface 27c and the spacer-side tapered surface 28d.

Figure 5:
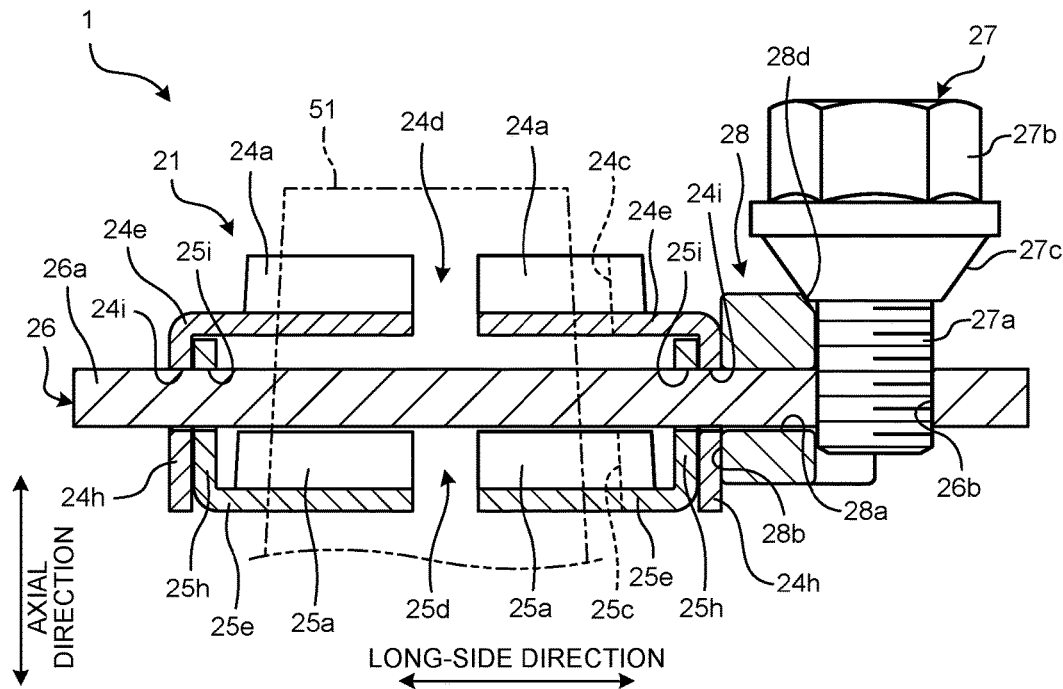
FIG. 5 is a schematic view illustrating a state in which the battery terminal according to the first embodiment of the present invention is not yet fastened to a battery post.

Next, the operation of the battery terminal 1 according to this embodiment will be described with reference to FIGS. 5 and 6. FIG. 5 is a schematic view illustrating a state in which the battery terminal according to the first embodiment of the present invention is not yet fastened to the battery post, and FIG. 6 is a schematic view illustrating a state in which the battery terminal according to the first embodiment of the present invention has been fastened to the battery post.

As illustrated in FIG. 5, the penetrating plate 26 of the battery terminal 1 is inserted into the holes 24i of the edge portions 24h of the plate-like protruding portion 24e and the holes 25i of the edge portions 25h of the plate-like protruding portion 25e so as to penetrate. Accordingly, the plate-like protruding portion 24e and the plate-like protruding portion 25e of the main body 21 are integrated with each other. In this state, the through hole 28a of the spacer 28 is fitted to the end portion of the penetrating plate 26 opposite to the retaining portion 26a and the spacer 28 is mounted outside the main body 21 in the long-side direction so as to be movable along the penetrating plate 26. When the spacer 28 is fitted to the penetrating plate 26 until one end face 28b of the spacer 28 facing the main body 21 comes into contact with the edge portion 24h of the plate-like protruding portion 24e, the entire threaded hole 26b of the penetrating plate 26 is exposed to the outside. Further, when the fastening bolt 27 is threadably engaged with the threaded hole 26b from above in the vertical direction, the battery terminal 1 is integrally assembled. The state illustrated in FIG. 5 is a state in which the lower end portion of the bolt-side tapered surface 27c of the fastening bolt 27 comes into contact with the upper end portion of the spacer-side tapered surface 28d of the spacer 28, and is a state in which the fastening bolt 27 can be further moved down. Since the slits 24d and 25d of the annular portions 24a and 25a are spread to the maximum width at this time, the inner diameters of the post insertion holes 24c and 25c are larger than the outer diameter of the battery post 51. This state is a state in which the battery terminal 1 is not yet fastened to the battery post 51.

When the battery post 51 is inserted into the post insertion holes 24c and 25c in the state illustrated in FIG. 5, the battery terminal 1 is combined with the battery post 51. Then, when the fastening bolt 27 is tightened from above in the vertical direction (the axial direction) in a state in which the inner peripheral surfaces of the post insertion holes 24c and 25c come into contact with the outer peripheral surface of the battery post 51, both the annular portions 24a and 25a are tightened in a direction in which the annular portions 24a and 25a approach each other with the slits 24d and 25d interposed therebetween. Accordingly, the battery terminal 1 is fastened to the battery post 51.

Figure 6:
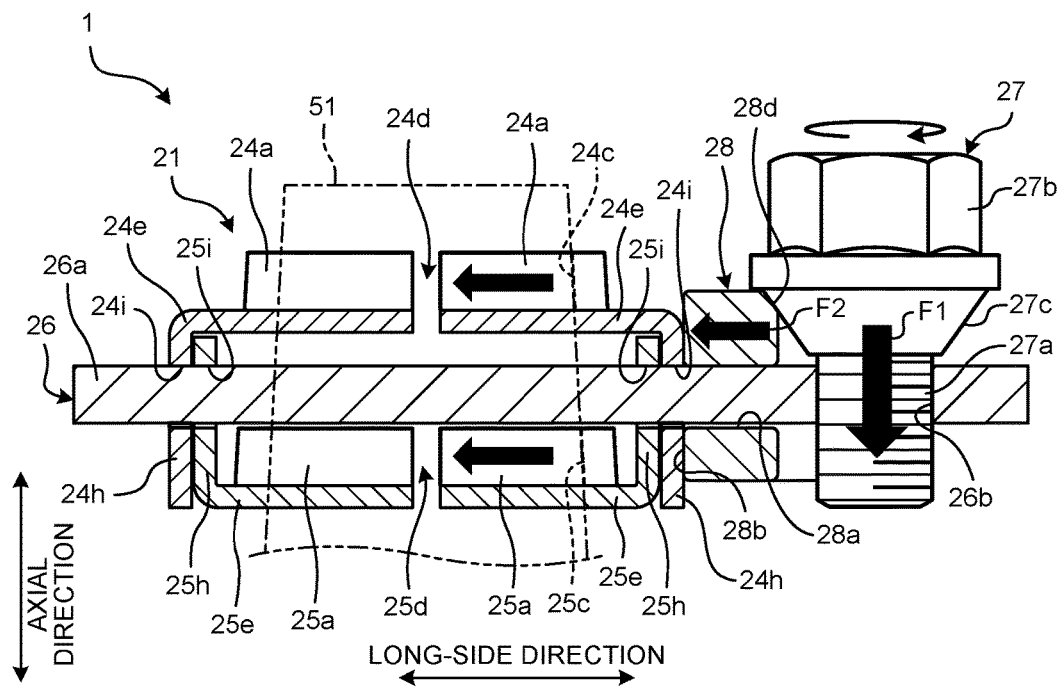
FIG. 6 is a schematic view illustrating a state in which the battery terminal according to the first embodiment of the present invention has been fastened to the battery post.

In more detail, as illustrated in FIG. 6, when the head portion 27b of the fastening bolt 27 is rotated about the axial direction (the shaft portion 27a) by a tool or the like and the fastening bolt 27 approaches the threaded hole 26b (the penetrating plate 26) in the axial direction, an axial-direction fastening force F1 (also referred to as "a pressing force F1") is generated between the fastening bolt 27 and the penetrating plate 26. The fastening bolt 27 presses the spacer-side tapered surface 28d of the spacer 28 in the axial direction through the bolt-side tapered surface 27c by the axial-direction fastening force F1. The axial-direction pressing force F1 (the fastening force F1) is converted into the long-side-direction pressing force F2 by the bolt-side tapered surface 27c and the spacer-side tapered surface 28d, and is transmitted to the spacer 28. The spacer 28 presses the edge portions 24h and 25h of the annular portions 24a and 25a in a direction in which the intervals of the slits 24d and 25d of the annular portions 24a and 25a are reduced, by the transmitted long-side-direction pressing force F2. The spacer 28 can be moved toward the retaining portion 26a, which is formed at the opposite end portion, on the penetrating plate 26 according to the reduction of the intervals of the slits 24d and 25d. Accordingly, while the spacer 28 receives the pressing force F1 from the fastening bolt 27, the spacer 28 can maintain the contact between itself and the edge portions 24h and 25h of the annular portions 24a and 25a and can continue to apply the pressing force F2. At this time, the separation of the annular portions 24a and 25a in the long-side direction, which is caused by the pressing force F2, is regulated by the retaining portion 26a of the penetrating plate 26 on a side opposite to a side on which the annular portions 24a and 25a receive the pressing force F2. As a result, since the plate-like protruding portion 24e of the annular portion 24a and the plate-like protruding portion 25e of the annular portion 25a are pressed toward the retaining portion 26a of the penetrating plate 26 by the pressing force F2 that is generated by the spacer 28, the intervals of the slits 24d and 25d are reduced in the battery terminal 1.

Accordingly, since the intervals of the slits 24d and 25d are reduced with the rotation of the fastening bolt 27 by the long-side-direction pressing force F2 that is generated by the bolt-side tapered surface 27c and the spacer-side tapered surface 28d, the diameters of the post insertion holes 24c and 25c are reduced in a state in which the inner peripheral surfaces of the post insertion holes 24c and 25c come into contact with the outer peripheral surface of the battery post 51. As a result, the battery terminal 1 is fastened to the battery post 51. Then, metal fittings or the like provided at the end of an electrical wire are electrically connected to the shaft portion 22a of the stud bolt 22 of the battery terminal 1.

Here, as described in FIG. 4, the fastening bolt 27 is supported at a position where at least a part of the fastening bolt 27 including the head portion 27b protrudes from the upper surface (the post-standing surface 155) of the battery housing 152 in the axial direction in a state in which work for tightening the fastening bolt 27 is performed. Even though the fastening bolt 27 is tightened, the position is maintained. As a result, in the battery terminal 1, work for tightening the fastening bolt 27 can be completed in a state in which at least a part of the fastening bolt 27 including the head portion 27b protrudes from the upper surface of the battery housing 152 in the axial direction.

Meanwhile, when the fastening bolt 27 is rotated in the reverse direction, the long-side-direction pressing force F2 generated by the bolt-side tapered surface 27c and the spacer-side tapered surface 28d is reduced. Accordingly, since the intervals of the slits 24d and 25d are increased and the diameters of the post insertion holes 24c and 25c are increased, the battery terminal 1 can be removed from the battery post 51.

Next, the effect of the battery terminal 1 according to this embodiment will be described.

The battery terminal 1 of this embodiment includes: the annular portions 24a and 25a in which the post insertion holes 24c and 25c into which the battery post 51 is inserted and the slits 24d and 25d connected to the post insertion holes 24c and 25c are formed; the penetrating plate 26 that is disposed so as to penetrate from one end portions of the annular portions 24a and 25a to the other end portions of the annular portions 24a and 25a with the slits 24d and 25d interposed therebetween in the long-side direction, which is a direction crossing the axial direction of the battery post 51 and crossing the slits 24*d* and 25*d*; the retaining portion 26*a* that is provided at one end portion of the penetrating plate 26 and prevents the penetrating plate 26 from being detached from the annular portions 24*a* and 25*a*; the threaded hole 26*b* as a fastening member supporting portion that is provided at the other end portion of the penetrating plate 26; and the fastening bolt 27 as a fastening member that is rotatably supported in the axial direction by the threaded hole 26*b*. The threaded hole 26*b* also functions as a member to be fastened that is threadably engaged with the fastening bolt 27. The battery terminal 1 further includes the spacer 28 as a pressing force converting member that is disposed so as to come into contact with the edge portions 24*h* and 25*h* of the annular portions 24*a* and 25*a* from the end portion side of the penetrating plate 26 at which the threaded hole 26*b* is provided and converts an axial-direction fastening force F1, which is generated between the fastening bolt 27 and the threaded hole 26*b* with the rotation of the fastening bolt 27 about the axial direction, into the long-side-direction pressing force F2 that presses the annular portions 24*a* and 25*a* in a direction, in which the intervals of the slits 24*d* and 25*d* of the annular portions 24*a* and 25*a* are reduced, of the long-side direction (the width direction).

According to this structure, the axial-direction fastening force F1, which is generated with the rotation of the fastening bolt 27 about the axial direction, is converted into the long-side-direction pressing force F2, which reduces the intervals of the slits 24*d* and 25*d* of the annular portions 24*a* and 25*a*, by the action of the spacer 28 as the pressing force converting member. Accordingly, it is possible to fasten the annular portions 24*a* and 25*a* to the battery post 51. That is, it is possible to fasten the battery terminal 1 to the battery post 51 by rotating the fastening bolt 27 about the axial direction of the battery post 51, that is, about the vertical direction. Accordingly, since a work space required to set and rotate a tool, which is used to rotate the fastening bolt 27, from the lateral side of the battery post 51, that is, the lateral side of the battery 50 does not need to be secured unlike in the related art, it is possible to operate the fastening bolt 27 from, for example, the upper side, where a work space is relatively easily taken, of the battery 50 in the vertical direction. According to the battery terminal 1 of this embodiment, it is possible to reduce a work space present around the battery 50, which is required to fasten the battery terminal 1 to the battery post 51, as described above.

Further, according to the battery terminal 1 of this embodiment, the bolt-side tapered surface 27*c* is formed on the seat surface of the head portion 27*b* of the fastening bolt 27 that comes into contact with the spacer 28. The spacer 28 is disposed so as to be movable relative to the penetrating plate 26 in the long-side direction, one end face 28*b* of the spacer 28 in the long-side direction comes into contact with the edge portions 24*h* and 25*h* of the annular portions 24*a* and 25*a*, and the other end face 28*c* of the spacer 28 in the long-side direction comes into contact with the head portion 27*b* of the fastening bolt 27. The spacer-side tapered surface 28*d*, which comes into contact with the bolt-side tapered surface 27*c* of the fastening bolt 27, is formed on the other end face 28*c* of the spacer 28 that comes into contact with the fastening bolt 27. The bolt-side tapered surface 27*c* of the fastening bolt 27 and the spacer-side tapered surface 28*d* of the spacer 28 are inclined in a direction in which the axial-direction pressing force F1 of the fastening bolt 27 pressing the spacer 28 by a fastening force, which is generated between the fastening bolt 27 and the penetrating plate 26 when the fastening bolt 27 approaches the threaded hole 26*b* with the rotation of the fastening bolt 27 about the axial direction, is converted into the long-side-direction pressing force F2 of the spacer 28 pressing the annular portions 24*a* and 25*a* in a direction in which the intervals of the slits 24*d* and 25*d* of the annular portions 24*a* and 25*a* are reduced.

According to this structure, it is possible to efficiently convert an operation for tightening the fastening bolt 27 to the threaded hole 26*b*, that is, the rotation of the fastening bolt 27 about the axial direction into the long-side-direction pressing force F2 that reduces the intervals of the slits 24*d* and 25*d* of the annular portions 24*a* and 25*a* by the action of the bolt-side tapered surface 27*c* of the fastening bolt 27 and the action of the spacer-side tapered surface 28*d* of the spacer 28. Accordingly, since it is not necessary to set the axis of rotation of the fastening bolt 27 to the same direction as the fastening direction of the annular portions 24*a* and 25*a* and it is possible to set the axis of rotation of the fastening bolt 27 to the vertical direction in which an operation for tightening the fastening bolt 27 is easily performed, it is possible to improve workability during the fastening of the battery terminal 1 to the battery post 51.

In addition, according to the above-mentioned battery terminal 1, the fastening bolt 27 is supported at a position where at least a part of the fastening bolt 27 protrudes from the upper surface of the battery housing 152 in the axial direction in a state in which the battery post 51 is inserted into the post insertion holes 24*c* and 25*c* and the fastening bolt 27 is supported by the threaded hole 26*b* of the penetrating plate 26. Accordingly, in the battery terminal 1, work for tightening the fastening bolt 27 can be completed in a state in which at least a part of the fastening bolt 27 protrudes from the upper surface of the battery housing 152 in the axial direction. Therefore, since the interference between a tool or the like and other portions is suppressed, the tightening of the fastening bolt 27 using the tool or the like can be easily performed.

Meanwhile, a structure in which the fastening bolt 27 is provided with the bolt-side tapered surface 27*c*, the spacer 28 is provided with the spacer-side tapered surface 28*d*, and a pressing force is transmitted to the spacer 28 from the fastening bolt 27 through the bolt-side tapered surface 27*c* and the spacer-side tapered surface 28*d* has been exemplified in the above-mentioned embodiment. However, only one of the bolt-side tapered surface 27*c* and the spacer-side tapered surface 28*d* may be provided as long as a state in which the fastening bolt 27 and the spacer 28 come into contact with each other can be maintained.

Meanwhile, a structure in which the threaded hole 26*b* of the penetrating plate 26 is provided as the member to be fastened to be threadably engaged with the fastening bolt 27 and the axial-direction fastening force F1 is generated between the fastening bolt 27 and the penetrating plate 26 has been exemplified in the above-mentioned embodiment. However, a separate nut may be provided as the member to be fastened. That is, a simple hole without a threaded groove may be substituted for the threaded hole 26*b*, a nut to be threadably engaged with the fastening bolt 27 may be disposed on the side opposite to the fastening bolt 27 with the penetrating plate 26 interposed therebetween in the axial direction (on the lower side in the vertical direction), and an axial-direction fastening force F1 generated between the fastening bolt 27 and the nut may be converted into a long-side-direction pressing force F2.

Second Embodiment

Figure 7:
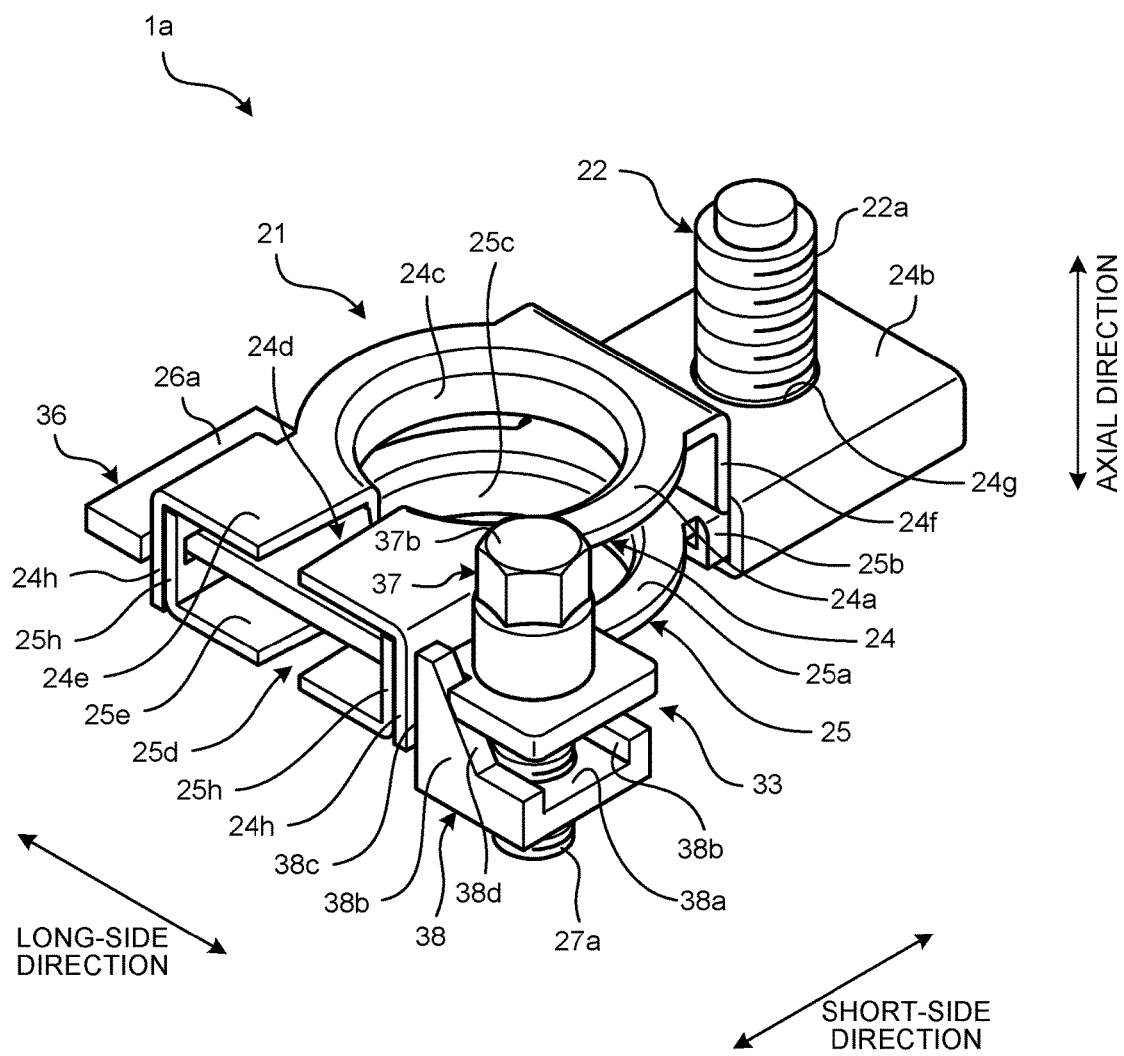
FIG. 7 is a perspective view illustrating a schematic structure of a battery terminal according to a second embodiment of the present invention.

A second embodiment will be described with reference to FIGS. 7 to 10. First, the structure of a battery terminal 1*a* according to the second embodiment will be described with reference to FIGS. 7 and 8. FIG. 7 is a perspective view illustrating the schematic structure of the battery terminal according to the second embodiment of the present invention, and FIG. 8 is an exploded perspective view of the battery terminal illustrated in FIG. 7.

As illustrated in FIGS. 7 and 8, the structure of a fastening section 33 of the battery terminal 1a of the second embodiment is different from that of the battery terminal 1 of the first embodiment.

The battery terminal 1a of this embodiment includes a main body 21, a stud bolt 22, and a fastening section 33. The fastening section 33 includes a penetrating plate 36, a fastening bolt 37 (a fastening member), and a tapered nut 38 (a member to be fastened, a pressing force converting member). The main body 21 and the stud bolt 22 are different from those of the battery terminal 1 of the first embodiment in that metal plates are folded downward to form the inner peripheral wall surfaces of the post insertion holes 24c and 25c as illustrated in FIGS. 7 and 8. Meanwhile, there is a case in which the tapered nut 38 is simply referred to as "a nut" below.

As in the case of the penetrating plate 26 of the first embodiment, the penetrating plate 36 includes a retaining portion 26a at one end portion thereof. On the other hand, the penetrating plate 36 includes an elongated hole 36b (a fastening member supporting portion), which does not include a threaded groove on the inner periphery thereof and is formed along the long-side direction as illustrated in FIG. 8, at the other end portion, which is opposite to one end portion of the penetrating plate 36 at which the retaining portion 26a is provided, instead of the threaded hole 26b of the first embodiment. In addition, engaging grooves 36c, which are engaged with upright portions 38b of the tapered nut 38 to be described below, are formed on both edge portions of the end portion, at which the hole 36b is provided, of the penetrating plate 36 in the short-side direction. The engaging grooves 36c are dug toward the middle of the penetrating plate 36 from end faces of the penetrating plate 36 in the short-side direction so as to be parallel to the end faces.

The fastening bolt 37 includes a shaft portion 27a as in the case of the fastening bolt 27 of the first embodiment, but does not include the bolt-side tapered surface 27c. Further, the axial dimension of a head portion 37b is larger than that of the head portion of the first embodiment.

The tapered nut 38 is disposed so as to face the fastening bolt 37 with the penetrating plate 36 interposed therebetween in the axial direction, and is threadably engaged with the fastening bolt 37. The tapered nut 38 includes a rectangular base portion 38a that includes a threaded hole threadably engaged with the shaft portion 27a of the fastening bolt 37, and a pair of upright portions 38b that extend vertically upward from two sides, which face each other, among four sides of the base portion 38a. A metal plate is formed in the planar shape of the pair of upright portions 38b and the base portion 38a and is bent from the base portion 38a in the same direction at substantially right angles, so that the pair of upright portions 38b and the base portion 38a can be formed. As illustrated in FIGS. 7 and 8, two sides, which include the upright portions 38b, of the base portion 38a extend in the long-side direction. One end face 38c of each of the upright portions 38b of the tapered nut 38 in the long-side direction comes into contact with the edge portion 24h of the annular portion 24a. Since one end face 38c of each of the pair of upright portions 38b comes into contact with the edge portion 24h of the annular portion 24a, the rotation of the tapered nut 38 about the axial direction is regulated. That is, in this embodiment, the tapered nut 38 functions as a member to be fastened that is threadably engaged with the fastening bolt 37 (the fastening member).

Further, a tapered surface 38d is formed on the side of each of the upright portions 38b of the tapered nut 38 opposite to the one end face 38c in the long-side direction. The tapered surfaces 38d are formed so as to maintain a state in which the tapered surfaces 38d come into contact with the engaging grooves 36c of the penetrating plate 36 while the tapered nut 38 and the fastening bolt 37 are threadably engaged with each other with the penetrating plate 36 interposed therebetween. In more detail, each of the tapered surfaces 38d comes into contact with an end face 36d (see FIG. 8), which is close to the end portion of the penetrating plate 36, of a pair of end faces, which face each other in the long-side direction, of the engaging groove 36c of the penetrating plate 36. Meanwhile, each end face 36d may be inclined in the same direction as the tapered surface 38d so that the contact area between the tapered surface 38d and the end face 36d is increased.

Here, the tapered surfaces 38d of the tapered nut 38 are formed so as to be inclined in a direction in which an axial-direction fastening force, which is generated between the fastening bolt 37 and the tapered nut 38 when the tapered nut 38 approaches the fastening bolt 37 in the axial direction with the rotation of the fastening bolt 37 about the axial direction, is converted into a long-side-direction pressing force of the tapered nut 38 pressing the edge portions 24h and 25h of the annular portions 24a and 25a in a direction in which the intervals of the slits 24d and 25d of the annular portions 24a and 25a are reduced. In this embodiment, the tapered surfaces 38d of the tapered nut 38 are inclined so that the width of each upright portion 38b in the long-side direction is gradually increased as it is separated from the head portion 37b of the fastening bolt 37 in the axial direction.

That is, the tapered nut 38 functions as a pressing force converting member that is disposed between the fastening bolt 37 and the edge portions 24h and 25h of the annular portions 24a and 25a so as to come into contact with both the fastening bolt 37 and the edge portions 24h and 25h and converts an axial-direction fastening force, which is generated with the rotation of the fastening bolt 37 about the axial direction, into a long-side-direction pressing force, which presses the edge portions 24h and 25h of the annular portions 24a and 25a in a direction in which the intervals of the slits 24d and 25d of the annular portions 24a and 25a are reduced, by the tapered surfaces 38d.

Next, the operation of the battery terminal 1a according to this embodiment will be described with reference to FIGS. 9 and 10. FIG. 9 is a schematic view illustrating a state in which the battery terminal according to the second embodiment of the present invention is not yet fastened to the battery post, and FIG. 10 is a schematic view illustrating a state in which the battery terminal according to the second embodiment of the present invention has been fastened to the battery post.

As illustrated in FIG. 9, the penetrating plate 36 of the battery terminal 1a is inserted into the holes 24i of the edge portions 24h of the plate-like protruding portion 24e and the holes 25i of the edge portions 25h of the plate-like protruding portion 25e so as to penetrate. Accordingly, the plate-like protruding portion 24e and the plate-like protruding portion 25e of the main body 21 are integrated with each other. In this state, when the pair of upright portions 38b are fitted to the pair of engaging grooves 36c, which are formed at the end portion of the penetrating plate 36 opposite to the retaining portion 26a, from below in the vertical direction, the tapered nut 38 is disposed below the penetrating plate 36, and the fastening bolt 37 is inserted into the hole 36b of the penetrating plate 36 from above in the vertical direction and is threadably engaged with the threaded hole of the base portion 38a of the tapered nut 38, the battery terminal 1a is integrally assembled. The state illustrated in FIG. 9 is a state in which the upper end portions of the tapered surfaces 38d of the tapered nut 38 come into contact with the end faces 36d of the engaging grooves 36c of the penetrating plate 36, and is a state in which the tapered nut 38 can be further moved up. Since the slits 24d and 25d of the annular portions 24a and 25a are spread to the maximum width at this time, the inner diameters of the post insertion holes 24c and 25c are larger than the outer diameter of the battery post 51. Further, the shaft portion 27a of the fastening bolt 37 is positioned on the side (the right side in FIG. 9), which is close to the end portion of the penetrating plate 36, in the elongated hole 36b of the penetrating plate 36. This state is a state in which the battery terminal 1a is not yet fastened to the battery post 51.

When the battery post 51 is inserted into the post insertion holes 24c and 25c in the state illustrated in FIG. 9, the battery terminal 1a is combined with the battery post 51. Then, when the fastening bolt 37 is tightened from above in the vertical direction (the axial direction) in a state in which the inner peripheral surfaces of the post insertion holes 24c and 25c come into contact with the outer peripheral surface of the battery post 51, both the annular portions 24a and 25a are tightened in a direction in which the annular portions 24a and 25a approach each other with the slits 24d and 25d interposed therebetween. Accordingly, the battery terminal 1a is fastened to the battery post 51.

In more detail, as illustrated in FIG. 10, when the head portion 37b of the fastening bolt 37 is rotated about the axial direction (the shaft portion 27a) by a tool or the like and the tapered nut 38 approaches the head portion 37b of the fastening bolt 37 in the axial direction while the position of the fastening bolt 37 in the axial direction is maintained, an axial-direction fastening force F1 is generated between the fastening bolt 37 and the tapered nut 38. The tapered nut 38 presses the end faces 36d of the engaging grooves 36c of the penetrating plate 36 in the axial direction through the tapered surfaces 38d by the axial-direction fastening force F1. Accordingly, the tapered nut 38 receives a reaction force to the axial-direction pressing force F1 (the fastening force F1) from the tapered surfaces 38d coming into contact with the end faces 36d. In more detail, the tapered surfaces 38d of the tapered nut 38 receive the pressing force F2, which is converted from the pressing force F1 in the long-side direction, from the end faces 36d of the penetrating plate 36. The tapered nut 38 presses the edge portions 24h and 25h of the annular portions 24a and 25a in a direction in which the intervals of the slits 24d and 25d of the annular portions 24a and 25a are reduced, by the long-side-direction pressing force F2 that is received from the end faces 36d of the penetrating plate 36. The tapered nut 38 and the fastening bolt 37, which is threadably engaged with the tapered nut 38, can be integrally moved toward the retaining portion 26a along the elongated hole 36b of the penetrating plate 36 according to the reduction of the intervals of the slits 24d and 25d. Accordingly, while the tapered nut 38 generates the fastening force F1 together with the fastening bolt 37, the tapered nut 38 and the fastening bolt 37 can maintain the contact between the tapered nut 38 and the edge portions 24h and 25h of the annular portions 24a and 25a and can continue to apply the pressing force F2. At this time, the separation of the annular portions 24a and 25a in the long-side direction, which is caused by the pressing force F2, is regulated by the retaining portion 26a of the penetrating plate 36 on a side opposite to a side on which the annular portions 24a and 25a receive the pressing force F2. As a result, since the plate-like protruding portion 24e of the annular portion 24a and the plate-like protruding portion 25e of the annular portion 25a are pressed toward the retaining portion 26a of the penetrating plate 36 by the pressing force F2 that is generated by the tapered nut 38, the intervals of the slits 24d and 25d are reduced in the battery terminal 1a.

Accordingly, since the intervals of the slits 24d and 25d are reduced with the rotation of the fastening bolt 37 by the long-side-direction pressing force F2 that is generated by the tapered surfaces 38d of the tapered nut 38, the diameters of the post insertion holes 24c and 25c are reduced in a state in which the inner peripheral surfaces of the post insertion holes 24c and 25c come into contact with the outer peripheral surface of the battery post 51. As a result, the battery terminal 1a is fastened to the battery post 51. Then, metal fittings or the like provided at the end of an electrical wire are electrically connected to the shaft portion 22a of the stud bolt 22 of the battery terminal 1a.

According to the battery terminal 1a of this embodiment, as described above, the elongated hole 36b, which is formed along the long-side direction, is provided at the other end portion of the penetrating plate 36 opposite to one end portion of the penetrating plate 36 at which the retaining portion 26a is provided, as the fastening member supporting portion. The fastening bolt 37 as the fastening member is supported by the hole 36b of the penetrating plate 36 so as to be rotatable about the axial direction. The tapered nut 38 as the member to be fastened faces the fastening bolt 37 with the penetrating plate 36 interposed therebetween in the axial direction and is threadably engaged with the fastening bolt 37. Further, the tapered nut 38 also functions as a pressing force converting member, the rotation of the tapered nut 38 about the axial direction is regulated, the tapered surfaces 38d, which come into contact with the penetrating plate 36, are formed on one end of the tapered nut 38 in the long-side direction, and one end faces 38c, which are formed on the other end of the tapered nut 38 in the long-side direction, come into contact with the annular portions 24a and 25a. The tapered surfaces 38d of the tapered nut 38 are inclined in a direction in which an axial-direction fastening force F1, which is generated between the fastening bolt 37 and the tapered nut 38 when the tapered nut 38 approaches the fastening bolt 37 in the axial direction with the rotation of the fastening bolt 37 about the axial direction, is converted into a long-side-direction pressing force F2 of the tapered nut 38 pressing the annular portions 24a and 25a in a direction in which the intervals of the slits 24d and 25d of the annular portions 24a and 25a are reduced.

According to this structure, the axial-direction fastening force F1, which is generated with the rotation of the fastening bolt 37 about the axial direction, is converted into the long-side-direction pressing force F2, which reduces the intervals of the slits 24d and 25d of the annular portions 24a and 25a, by the action of the tapered surfaces 38d of the tapered nut 38. Accordingly, it is possible to fasten the annular portions 24a and 25a to the battery post 51. Further, when the battery terminal 1a is fastened to the battery post 51, the tapered nut 38 approaches the fastening bolt 37 with the rotation of the fastening bolt 37 but the position of the fastening bolt 37 itself in the axial direction is fixed and is not changed. As a result, when the fastening bolt 37 is tightened after the battery terminal 1a is adapted so that the fastening bolt 37 is tightened from above in the axial direction, the relative position of the fastening bolt 37 in the axial direction cannot be changed. Accordingly, since the change of the tightening height of the fastening bolt 37 is suppressed even though the fastening bolt 37 is tightened from above in the axial direction to fasten the battery terminal 1a to the battery post 51, it is possible to maintain a positional relationship in which work for tightening the fastening bolt 37 is easily performed. Therefore, it is possible to improve workability during the fastening of the battery terminal to the battery post 51.

Meanwhile, a structure in which the tapered nut 38 including the tapered surfaces 38d is provided as the member to be fastened to be threadably engaged with the fastening bolt 37 and the axial-direction fastening force F1 is generated between the fastening bolt 37 and the tapered nut 38 has been exemplified in the above-mentioned embodiment. However, a separate nut may be provided as the member to be fastened. That is, a simple hole without a threaded groove may be substituted for the threaded hole of the base portion 38a of the tapered nut 38, a nut to be threadably engaged with the fastening bolt 37 may be disposed below the tapered nut 38 in the vertical direction, and an axial-direction fastening force F1 generated between the fastening bolt 37 and the nut may be converted into a long-side-direction pressing force F2.

Third Embodiment

Figure 11:
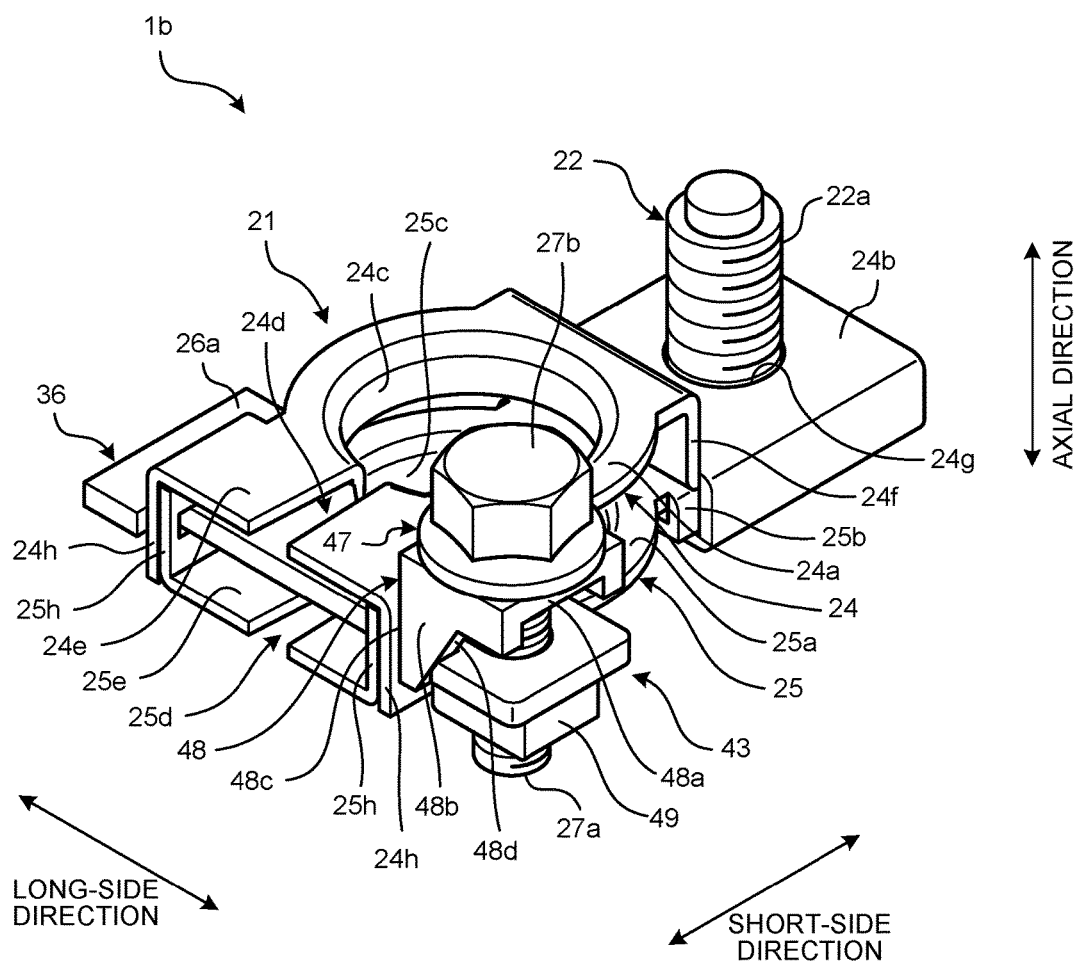
FIG. 11 is a perspective view illustrating a schematic structure of a battery terminal according to a third embodiment of the present invention.

A third embodiment will be described with reference to FIGS. 11 to 14. First, the structure of a battery terminal 1b according to the third embodiment will be described with reference to FIGS. 11 and 12. FIG. 11 is a perspective view illustrating the schematic structure of the battery terminal according to the third embodiment of the present invention, and FIG. 12 is an exploded perspective view of the battery terminal illustrated in FIG. 11.

Figure 12:
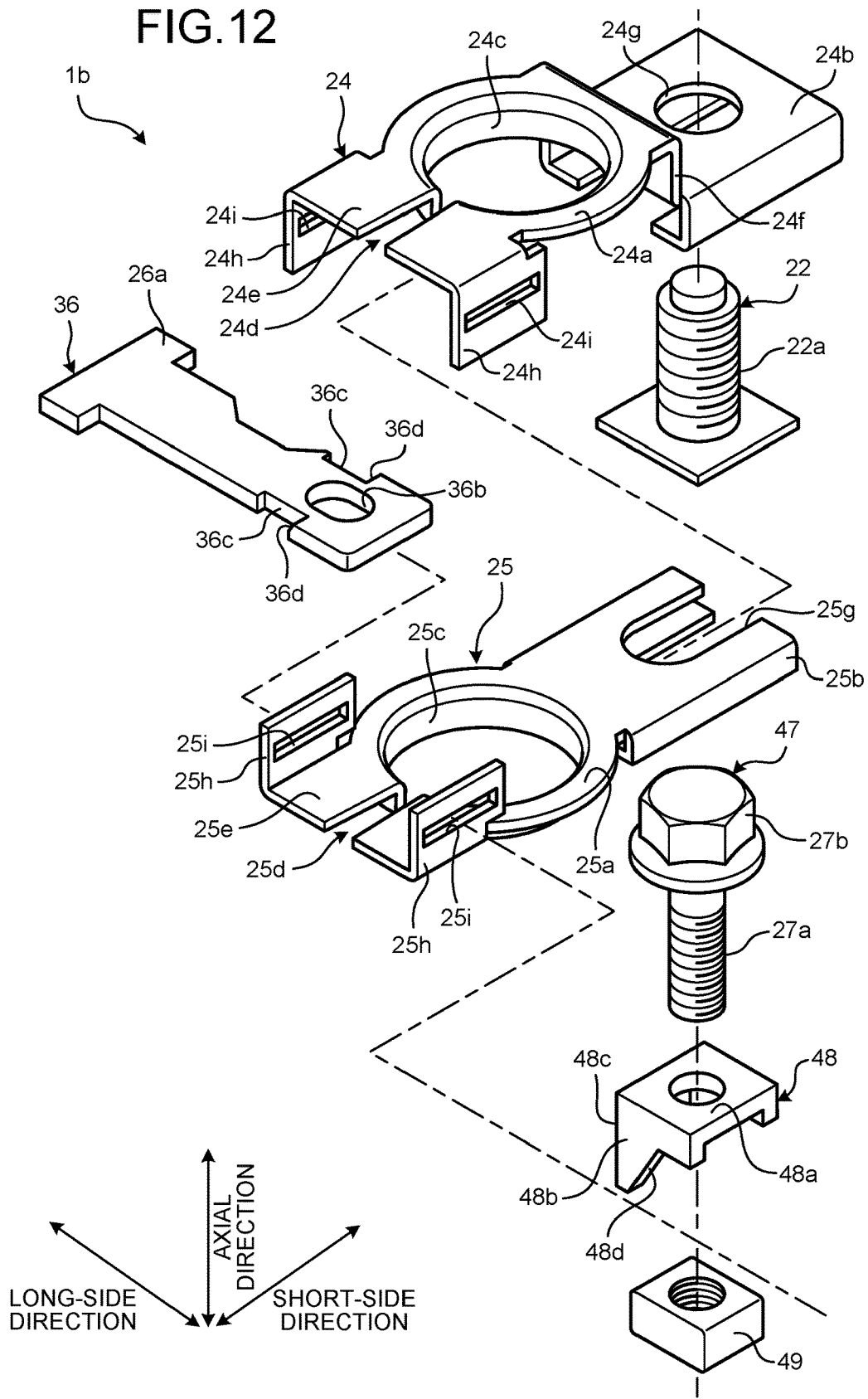
FIG. 12 is an exploded perspective view of the battery terminal illustrated in FIG. 11.

As illustrated in FIGS. 11 and 12, the structure of a fastening section 43 of the battery terminal 1b of the third embodiment is different from that of the battery terminal 1 of the first embodiment.

The battery terminal 1b of this embodiment includes a main body 21, a stud bolt 22, and a fastening section 43. The fastening section 43 includes a penetrating plate 36, a fastening bolt 47 (a fastening member), a spacer 48 (a pressing force converting member), and a nut 49 (a member to be fastened). Meanwhile, the main body 21 and the stud bolt 22 are different from those of the battery terminal 1 of the first embodiment in that metal plates are folded downward to form the inner peripheral wall surfaces of the post insertion holes 24c and 25c as illustrated in FIGS. 11 and 12. Further, the penetrating plate 36 has the same structure as the penetrating plate 36 of the second embodiment.

The fastening bolt 47 includes a shaft portion 27a and a head portion 27b as in the case of the fastening bolt 27 of the first embodiment, but does not include the bolt-side tapered surface 27c.

The nut 49 faces the fastening bolt 47 with the penetrating plate 36 interposed therebetween in the axial direction, and is threadably engaged with the fastening bolt 47. The rotation of the nut 49 about the axial direction is regulated.

The spacer 48 is disposed between the fastening bolt 47 and the penetrating plate 36 so that the fastening bolt 47 penetrates the spacer 48. The spacer 48 includes a rectangular base portion 48a that includes a hole where the shaft portion 27a of the fastening bolt 47 penetrates, and a pair of upright portions 48b that extend vertically downward from two sides, which face each other, among four sides of the base portion 48a. As illustrated in FIGS. 11 and 12, two sides, which include the upright portions 48b, of the base portion 48a extend in the long-side direction. One end face 48c of each of the upright portions 48b of the spacer 48 in the long-side direction comes into contact with the edge portion 24h of the annular portion 24a. Since one end face 48c of each of the pair of upright portions 48b comes into contact with the edge portion 24h of the annular portion 24a, the rotation of the spacer 48 about the axial direction is regulated.

Further, a tapered surface 48d is formed on the side of each of the upright portions 48b of the spacer 48 opposite to one end face 48c in the long-side direction. The tapered surfaces 48d are formed so as to maintain a state in which the tapered surfaces 48d come into contact with engaging grooves 36c of the penetrating plate 36 while the fastening bolt 47 penetrates the spacer 48 and the spacer 48 is disposed between the penetrating plate 36 and the fastening bolt 47. In more detail, each of the tapered surfaces 48d comes into contact with an end face 36d (see FIG. 12), which is close to an end portion of the penetrating plate 36, of a pair of end faces, which face each other in the long-side direction, of each of the engaging grooves 36c of the penetrating plate 36. Meanwhile, each end face 36d may be inclined in the same direction as the tapered surface 48d so that the contact area between the tapered surface 48d and the end face 36d is increased.

Here, the tapered surfaces 48d of the spacer 48 are formed so as to be inclined in a direction in which an axial-direction fastening force, which is generated between the fastening bolt 47 and the nut 49 when the spacer 48 approaches the nut 49 in the axial direction with the rotation of the fastening bolt 47 about the axial direction, is converted into a long-side-direction pressing force of the spacer 48 pressing the edge portions 24h and 25h of the annular portions 24a and 25a in a direction in which the intervals of the slits 24d and 25d of the annular portions 24a and 25a are reduced. In this embodiment, the tapered surfaces 48d of the spacer 48 are inclined so that the width of each upright portion 48b in the long-side direction is gradually reduced as it is separated from the head portion 27b of the fastening bolt 47 in the axial direction.

That is, the spacer 48 functions as the pressing force converting member that is disposed between the fastening bolt 47 and the edge portions 24h and 25h of the annular portions 24a and 25a so as to come into contact with both the fastening bolt 47 and the edge portions 24h and 25h and converts an axial-direction fastening force, which is generated with the rotation of the fastening bolt 47 about the axial direction, into a long-side-direction pressing force, which presses the edge portions 24h and 25h of the annular portions 24a and 25a in a direction in which the intervals of the slits 24d and 25d of the annular portions 24a and 25a are reduced, by the tapered surfaces 48d. Meanwhile, the spacer 48 of the third embodiment is equivalent to the tapered nut 38 of the second embodiment which is disposed so as to be inverted in the vertical direction and in which a threaded groove is removed from the threaded hole of the base portion 38a.

Next, the operation of the battery terminal 1b according to this embodiment will be described with reference to FIGS. 13 and 14. FIG. 13 is a schematic view illustrating a state in which the battery terminal according to the third embodiment of the present invention is not yet fastened to the battery post, and FIG. 14 is a schematic view illustrating a state in which the battery terminal according to the third embodiment of the present invention has been fastened to the battery post.

As illustrated in FIG. 13, the penetrating plate 36 of the battery terminal 1b is inserted into the holes 24i of the edge portions 24h of the plate-like protruding portion 24e and the holes 25i of the edge portions 25h of the plate-like protruding portion 25e so as to penetrate. Accordingly, the plate-like protruding portion 24e and the plate-like protruding portion 25e of the main body 21 are integrated with each other. In this state, the pair of upright portions 48b is fitted to the pair of engaging grooves 36c, which are formed at the end portion of the penetrating plate 36 opposite to the retaining portion 26a, from above in the vertical direction, and the spacer 48 is disposed above the penetrating plate 36. The fastening bolt 47 is inserted into the hole of the base portion 48a from above the spacer 48 in the vertical direction and is further inserted into the hole 36b of the penetrating plate 36 that is positioned below the spacer 48. Then, when the fastening bolt 47 is threadably engaged with the nut 49 that is disposed below the penetrating plate 36 in the vertical direction, the battery terminal 1b is integrally assembled. The state illustrated in FIG. 13 is a state in which the lower end portions of the tapered surfaces 48d of the spacer 48 come into contact with the end faces 36d of the engaging grooves 36c of the penetrating plate 36, and is a state in which the spacer 48 can be further moved down. Since the slits 24d and 25d of the annular portions 24a and 25a are spread to the maximum width at this time, the inner diameters of the post insertion holes 24c and 25c are larger than the outer diameter of the battery post 51. Further, the shaft portion 27a of the fastening bolt 47 is positioned on the side (the right side in FIG. 13), which is close to the end portion of the penetrating plate 36, in the elongated hole 36b of the penetrating plate 36. This state is a state in which the battery terminal 1b is not yet fastened to the battery post 51.

When the battery post 51 is inserted into the post insertion holes 24c and 25c in the state illustrated in FIG. 13, the battery terminal 1b is combined with the battery post 51. Then, when the fastening bolt 47 is tightened from above in the vertical direction (the axial direction) in a state in which the inner peripheral surfaces of the post insertion holes 24c and 25c come into contact with the outer peripheral surface of the battery post 51, both the annular portions 24a and 25a are tightened in a direction in which the annular portions 24a and 25a approach each other with the slits 24d and 25d interposed therebetween. Accordingly, the battery terminal 1b is fastened to the battery post 51.

In more detail, as illustrated in FIG. 14, when the head portion 27b of the fastening bolt 47 is rotated about the axial direction (the shaft portion 27a) by a tool or the like and the fastening bolt 47 approaches the nut 49 in the axial direction, an axial-direction fastening force F1 is generated between the fastening bolt 47 and the nut 49. The spacer 48 is pressed down in the vertical direction through the seat surface of the fastening bolt 47 by the axial-direction fastening force F1, and presses the end faces 36d of the engaging grooves 36c of the penetrating plate 36 in the axial direction through the tapered surfaces 48d. Accordingly, the spacer 48 receives a reaction force to the axial-direction pressing force (the fastening force F1) from the tapered surfaces 48d coming into contact with the end faces 36d. In more detail, the tapered surfaces 48d of the spacer 48 receive the pressing force F2, which is converted from the pressing force F1 in the long-side direction, from the end faces 36d of the penetrating plate 36. The spacer 48 presses the edge portions 24h and 25h of the annular portions 24a and 25a in a direction in which the intervals of the slits 24d and 25d of the annular portions 24a and 25a are reduced, by the long-side-direction pressing force F2 that is received from the end faces 36d of the penetrating plate 36. The spacer 48, the fastening bolt 47, which penetrates the spacer 48, and the nut 49, which is threadably engaged with the fastening bolt 47, can be integrally moved toward the retaining portion 26a along the elongated hole 36b of the penetrating plate 36 according to the reduction of the intervals of the slits 24d and 25d. Accordingly, while the fastening force F1 is generated between the fastening bolt 47 and the nut 49, the spacer 48, the fastening bolt 47, and the nut 49 can maintain the contact between the spacer 48 and the edge portions 24h and 25h of the annular portions 24a and 25a and can continue to apply the pressing force F2. At this time, the separation of the annular portions 24a and 25a in the long-side direction, which is caused by the pressing force F2, is regulated by the retaining portion 26a of the penetrating plate 36 on a side opposite to a side on which the annular portions 24a and 25a receive the pressing force F2. As a result, since the plate-like protruding portion 24e of the annular portion 24a and the plate-like protruding portion 25e of the annular portion 25a are pressed toward the retaining portion 26a of the penetrating plate 36 by the pressing force F2 that is generated by the spacer 48, the intervals of the slits 24d and 25d are reduced in the battery terminal 1b.

Accordingly, since the intervals of the slits 24d and 25d are reduced by the long-side-direction pressing force F2 that is generated with the rotation of the fastening bolt 47 by the tapered surfaces 48d of the spacer 48, the diameters of the post insertion holes 24c and 25c are reduced in a state in which the inner peripheral surfaces of the post insertion holes 24c and 25c come into contact with the outer peripheral surface of the battery post 51. As a result, the battery terminal 1b is fastened to the battery post 51. Then, metal fittings or the like provided at the end of an electrical wire are electrically connected to the shaft portion 22a of the stud bolt 22 of the battery terminal 1b.

According to the battery terminal 1b of this embodiment, as described above, the elongated hole 36b, which is formed along the long-side direction, is provided at the other end portion of the penetrating plate 36 opposite to one end portion of the penetrating plate 36 at which the retaining portion 26a is provided, as the fastening member supporting portion. The fastening bolt 47 as the fastening member is supported by the hole 36b of the penetrating plate 36 so as to be rotatable about the axial direction. The nut 49 as the member to be fastened faces the fastening bolt 47 with the penetrating plate 36 interposed therebetween in the axial direction and is threadably engaged with the fastening bolt 47. The spacer 48 as the pressing force converting member is disposed between the fastening bolt 47 and the penetrating plate 36 so that the fastening bolt 47 penetrates the spacer 48; the rotation of the spacer 48 about the axial direction is regulated; the tapered surfaces 48d, which come into contact with the penetrating plate 36, are formed at one end of the spacer 48 in the long-side direction; and one end faces 48c, which are formed at the other end of the spacer 48 in the long-side direction, come into contact with the annular portions 24a and 25a. The tapered surfaces 48d of the spacer 48 are inclined in a direction in which an axial-direction fastening force F1, which is generated between the fastening bolt 47 and the nut 49 when the fastening bolt 47 approaches the nut 49 in the axial direction with the rotation of the fastening bolt 47 about the axial direction, is converted into a long-side-direction pressing force F2 of the spacer 48 pressing the annular portions 24a and 25a in a direction in which the intervals of the slits 24d and 25d of the annular portions 24a and 25a are reduced.

According to this structure, the axial-direction fastening force F1, which is generated with the rotation of the fastening bolt 47 about the axial direction, is converted into the long-side-direction pressing force F2, which reduces the intervals of the slits 24d and 25d of the annular portions 24a and 25a, by the action of the tapered surfaces 48d of the spacer 48. Accordingly, it is possible to fasten the annular portions 24a and 25a to the battery post 51. Further, it is possible to efficiently convert an operation for tightening the fastening bolt 47 to the nut 49, that is, the rotation of the fastening bolt 47 about the axial direction into the long-side-direction pressing force F2 that reduces the intervals of the slits 24d and 25d of the annular portions 24a and 25a by the action of the tapered surfaces 48d. Accordingly, since it is not necessary to set the axis of rotation of the fastening bolt 47 to the same direction as the fastening direction of the annular portions 24a and 25a and it is possible to set the axis of rotation of the fastening bolt 47 to the vertical direction in which an operation for tightening the fastening bolt 47 is easily performed, it is possible to improve workability during the fastening of the battery terminal 1b to the battery post 51.

Fourth Embodiment

Figure 15:
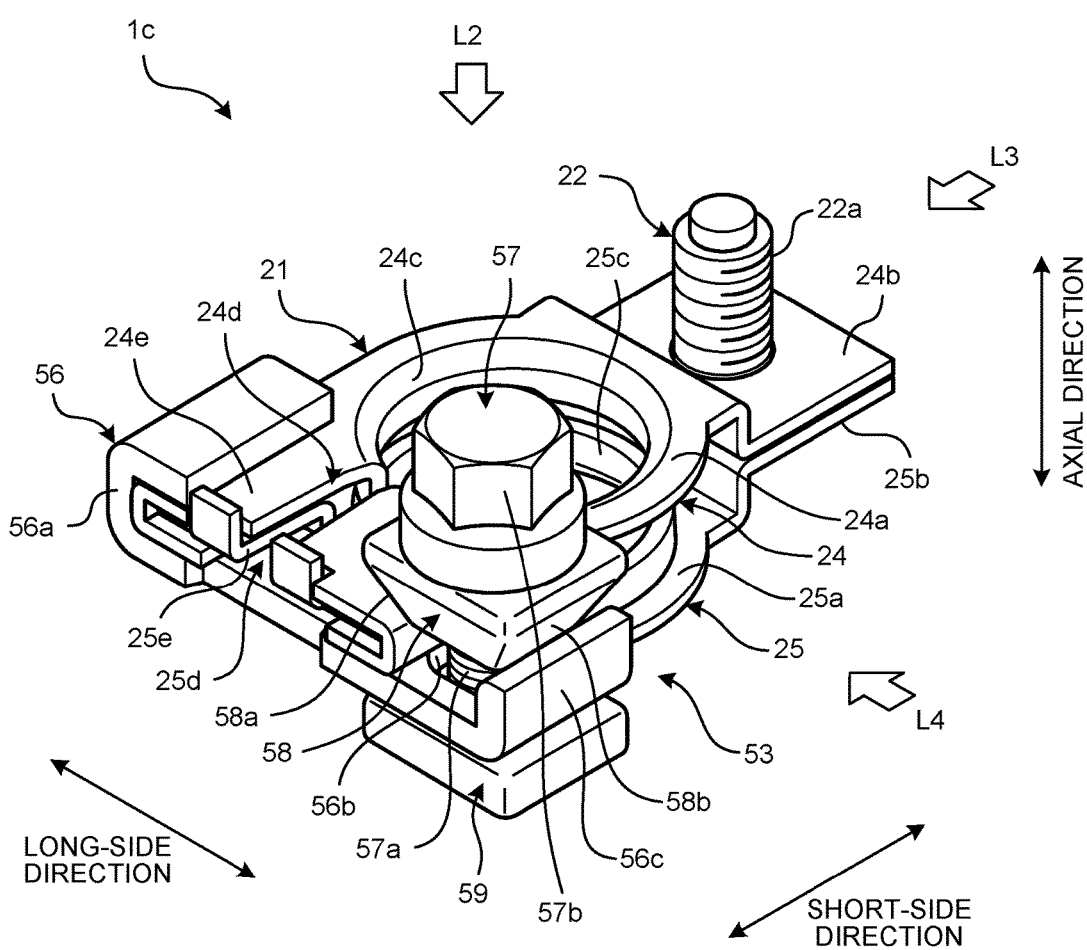
FIG. 15 is a perspective view illustrating a schematic structure of a battery terminal according to a fourth embodiment of the present invention.
Figure 16:
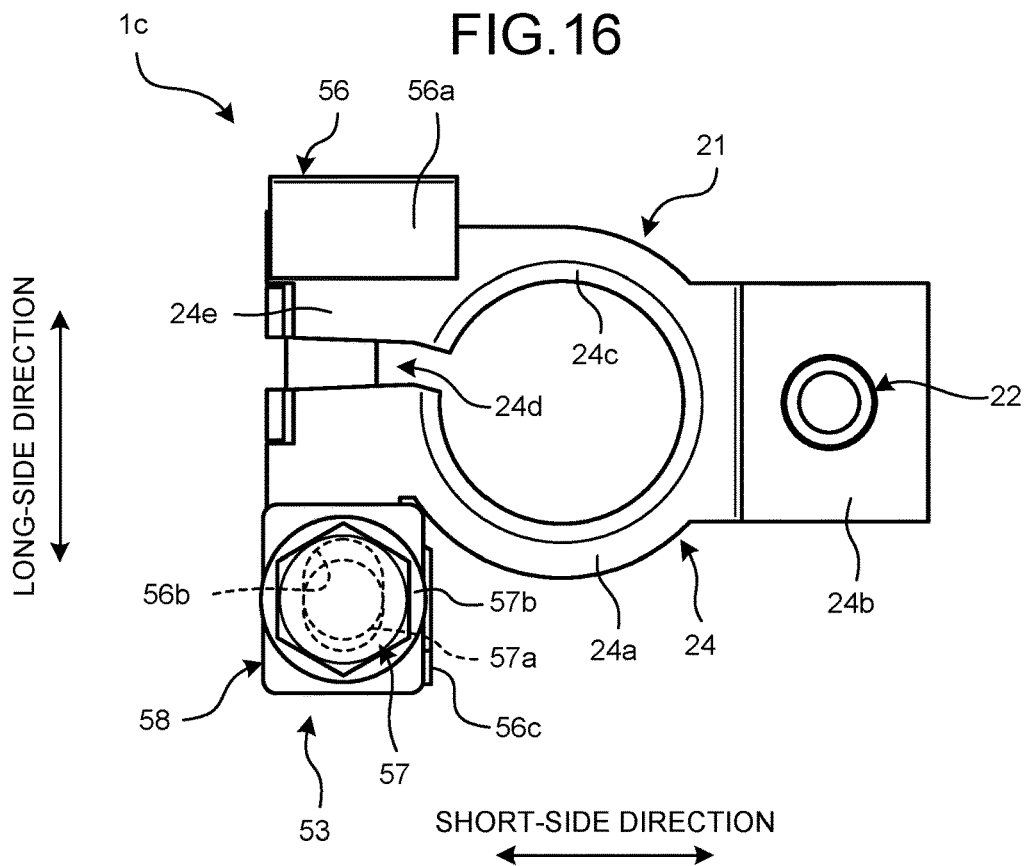
FIG. 16 is a view taken in the direction of an arrow L2 of FIG. 15.
Figure 17:
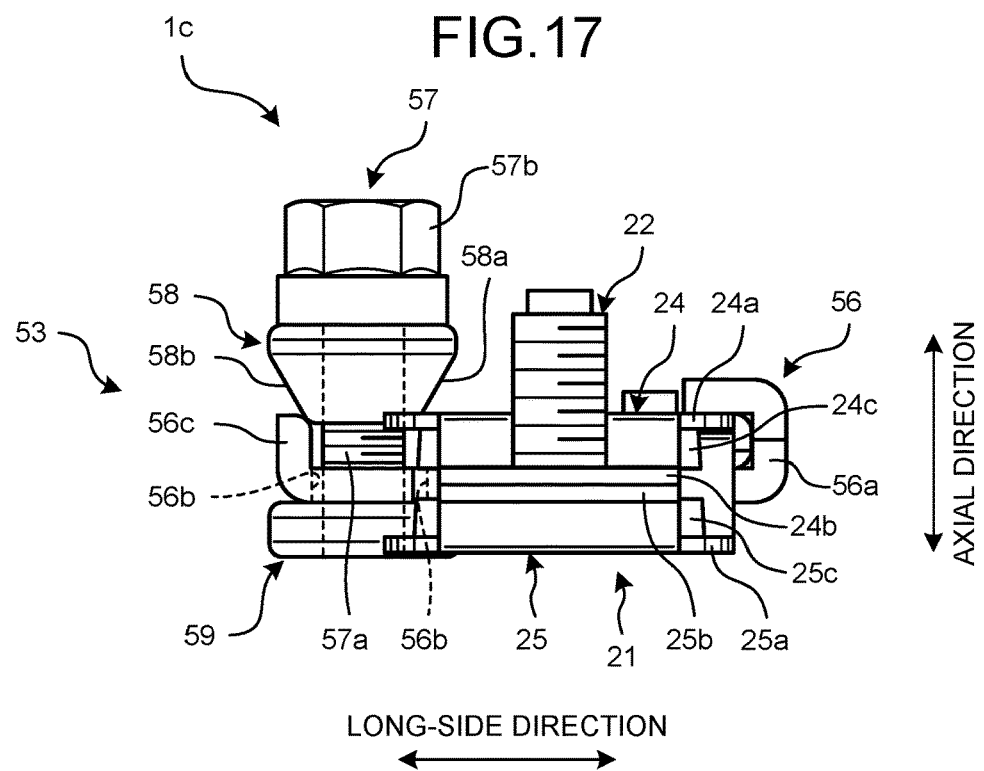
FIG. 17 is a view taken in the direction of an arrow L3 of FIG. 15.
Figure 18:
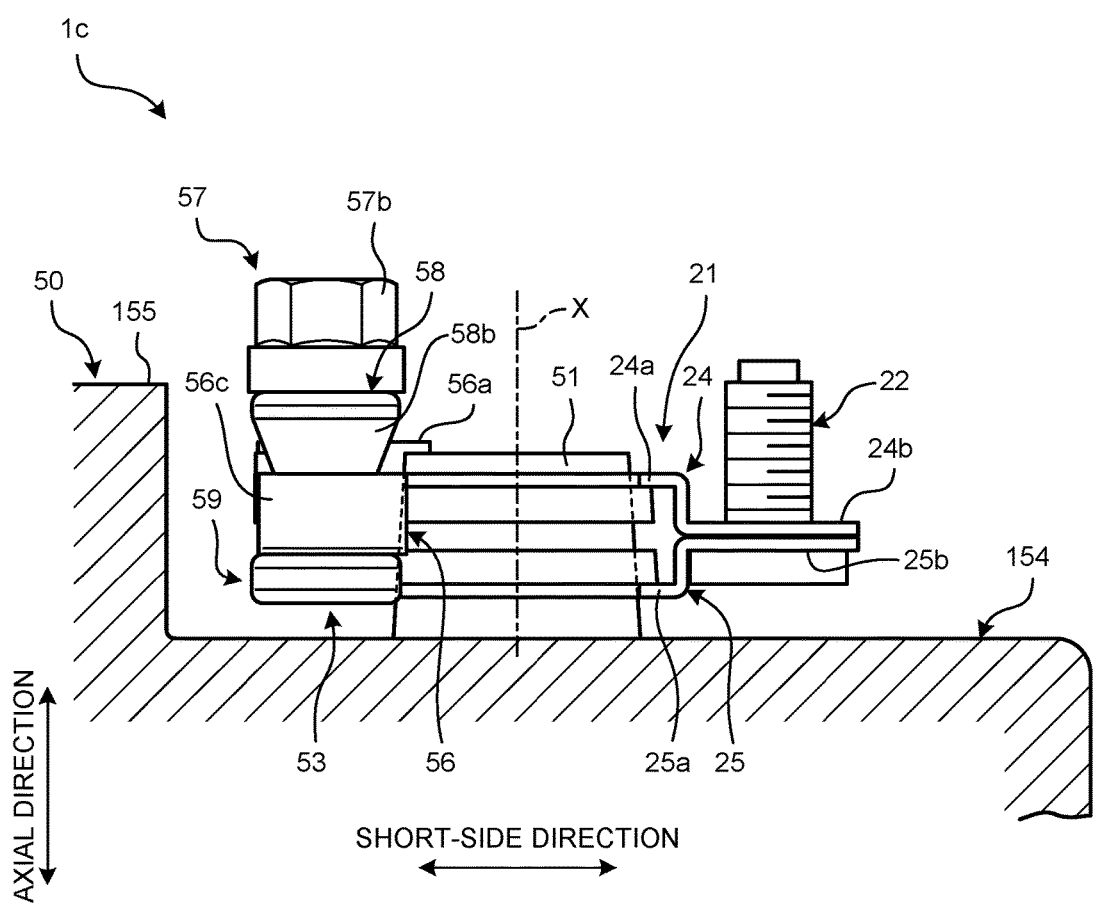
FIG. 18 is a view taken in the direction of an arrow L4 of FIG. 15 and is a side view illustrating a state in which the battery terminal according to the fourth embodiment illustrated in FIG. 15 is mounted on a battery.

A fourth embodiment will be described with reference to FIGS. 15 to 18. FIG. 15 is a perspective view illustrating the schematic structure of a battery terminal according to the fourth embodiment of the present invention. FIG. 16 is a view taken in the direction of an arrow L2 of FIG. 15. FIG. 17 is a view taken in the direction of an arrow L3 of FIG. 15. FIG. 18 is a view taken in the direction of an arrow L4 of FIG. 15 and is a side view illustrating a state in which the battery terminal according to the fourth embodiment illustrated in FIG. 15 is mounted on a battery.

As illustrated in FIGS. 15 to 18, the structure of a fastening section 53 of a battery terminal 1c of the fourth embodiment is different from those of the battery terminals 1, 1a, and 1b according to the first to third embodiments.

As illustrated in FIGS. 15 to 18, the battery terminal 1c of fourth embodiment includes a main body 21, a stud bolt 22, and a fastening section 53. The fastening section 53 includes a holding member 56, a fastening bolt 57 (a fastening member), a spacer 58 (a pressing force converting member), and a nut 59 (a member to be fastened). Meanwhile, since the main structures of the main body 21 and the stud bolt 22 have shapes slightly different from the shapes of the main structures of those of the battery terminals 1, 1a, and 1b of the first to third embodiments but have substantially the same functions as those of the battery terminals 1, 1a, and 1b, the description thereof will be omitted.

The holding member 56 is disposed so as to extend from one end portions of the annular portions 24a and 25a to the other end portions of the annular portions 24a and 25a with slits 24d and 25d interposed therebetween in the long-side direction. A main portion (a base portion) of the holding member 56 is a plate-like member extending in the long-side direction, and is positioned on a side of a plate-like protruding portion 25e opposite to a plate-like protruding portion 24e in the axial direction, that is, on the lower side in the vertical direction (the axial direction).

The holding member 56 includes an annular portion holding portion 56a at one end portion thereof. The annular portion holding portion 56a is a portion that is provided at one end portion of the holding member 56 and holds annular portions 24a and 25a. As illustrated in FIGS. 15 and 17, one end portion of the base portion of the holding member 56 disposed below the plate-like protruding portion 25e in the axial direction extends and is folded toward the plate-like protruding portion 24e, that is, folded upward in the vertical direction (the axial direction) in a U shape, so that the annular portion holding portion 56a is formed. The annular portion holding portion 56a integrally holds the annular portions 24a and 25a by pinching and holding the plate-like protruding portions 24e and 25e of the annular portions 24a and 25a in a U-shaped space thereof in the axial direction.

A hole 56b (a fastening member supporting portion) is provided at the other end portion of the holding member 56 opposite to one end portion of the holding member 56 at which the annular portion holding portion 56a is provided, so as to pass through the holding member 56 in the axial direction. As illustrated in FIGS. 16 and 17, the hole 56b does not include a threaded groove on the inner periphery thereof and is formed along the long-side direction in the shape of an elongated hole.

In addition, an edge protruding portion 56c is provided at an edge of the end portion of the holding member 56, at which the hole 56b is formed, so as to protrude in the axial direction. As illustrated in FIGS. 15, 17, and 18, the other end portion of the plate-like base portion of the holding member 56 extending in the long-side direction extends and is bent toward the side where the fastening bolt 57 is disposed in the axial direction, that is, bent upward in the vertical direction (the axial direction) in an L shape (for example, at a right angle), so that the edge protruding portion 56c is formed.

The fastening bolt 57 is supported by the hole 56b of the holding member 56 so as to be rotatable about the axial direction. The fastening bolt 57 includes a shaft portion 57a and a head portion 57b that have the same structure as the shaft portion 27a and the head portion 27b of the fastening bolt 27 of the first embodiment, but does not include an element corresponding to the bolt-side tapered surface 27c.

The nut 59 faces the fastening bolt 57 with the holding member 56 interposed therebetween in the axial direction, and is threadably engaged with the fastening bolt 57. The rotation of the nut 59 about the axial direction is regulated.

The spacer 58 is a member that is disposed between the fastening bolt 57 and the holding member 56 so that the fastening bolt 57 penetrates the spacer 58. The spacer 58 is formed in the shape of, for example, a rectangular tube. As illustrated in FIGS. 15 and 17, the spacer 58 is provided with a first tapered surface 58a coming into contact with the end portions of the annular portions 24a and 25a in the long-side direction, which are opposite to the end portions of the annular portions 24a and 25a held by the annular portion holding portion 56a of the holding member 56. That is, the first tapered surface 58a is formed on the surface of the spacer 58 facing the end portions, at which the hole 56b of the holding member 56, the fastening bolt 57, and the like are provided, of the annular portions 24a and 25a in the long-side direction. The first tapered surface 58a of this embodiment is formed at a position where the first tapered surface 58a can come into contact with a part of the annular portions 24a and 25a, here, the plate-like protruding portion 24e of the annular portion 24a.

Further, as illustrated in FIGS. 15, 17, and 18, the spacer 58 is provided with a second tapered surface 58b that is formed on the back side of the first tapered surface 58a in the long-side direction. The second tapered surface 58b is formed at a position where the second tapered surface 58b can come into contact with the edge protruding portion 56c of the holding member 56. Since the first tapered surface 58a and the second tapered surface 58b of the spacer 58, which are disposed so as to face each other in the long-side direction as described above, come into contact with the annular portions 24a and 25a and the edge protruding portion 56c, respectively, the rotation of the spacer 58 about the axial direction is regulated.

Furthermore, the first tapered surface 58a of the spacer 58 is inclined in a direction in which an axial-direction fastening force, which is generated between the fastening bolt 57 and the nut 59 when the fastening bolt 57 approaches the nut 59 in the axial direction with the rotation of the fastening bolt 57 about the axial direction, is converted into a long-side-direction pressing force of the spacer 58 pressing the annular portions 24a and 25a in a direction in which the intervals of the slits 24d and 25d of the annular portions 24a and 25a are reduced, that is, toward the annular portion holding portion 56a in the long-side direction. In this embodiment, the first tapered surface 58a is inclined so that the width of the spacer 58 in the long-side direction is gradually reduced as it is separated from the head portion 57b of the fastening bolt 57 in the axial direction.

Further, the second tapered surface 58b of the spacer 58 is inclined in a direction in which an axial-direction fastening force, which is generated between the fastening bolt 57 and the nut 59 when the fastening bolt 57 approaches the nut 59 in the axial direction with the rotation of the fastening bolt 57 about the axial direction, is converted into a pulling force for pulling the annular portion holding portion 56a of the holding member 56 toward the fastening member supporting portion (the hole 56b) in the long-side direction through the edge protruding portion 56c coming into contact with the second tapered surface 58b. In this embodiment, the second tapered surface 58b is inclined so that the width of the spacer 58 in the long-side direction is gradually reduced as it is separated from the head portion 57b of the fastening bolt 57 in the axial direction.

That is, as illustrated in FIGS. 15 and 17, when viewed in a direction orthogonal to the axial direction and the long-side direction, the spacer 58 of this embodiment is formed in a trapezoidal shape by the first tapered surface 58a and the second tapered surface 58b so that the width of the spacer 58 in the long-side direction is gradually reduced as it is separated from the head portion 57b of the fastening bolt 57 in the axial direction.

When the battery post 51 is inserted into the post insertion holes 24c and 25c in the state illustrated in FIG. 18, the battery terminal 1c of the fourth embodiment is combined with the battery post 51. Then, when the fastening bolt 57 is tightened from above in the vertical direction (the axial direction) in a state in which the inner peripheral surfaces of the post insertion holes 24c and 25c come into contact with the outer peripheral surface of the battery post 51, both the annular portions 24a and 25a are tightened in a direction in which the annular portions 24a and 25a approach each other with the slits 24d and 25d interposed therebetween. Accordingly, the battery terminal 1c is fastened to the battery post 51.

In more detail, when the head portion 57b of the fastening bolt 57 is rotated about the axial direction (the shaft portion 57a) by a tool or the like and the fastening bolt 57 approaches the nut 59 in the axial direction, an axial-direction fastening force is generated between the fastening bolt 57 and the nut 59. The spacer 58 is pressed down in the vertical direction through the seat surface of the fastening bolt 57 by the axial-direction fastening force. The axial-direction fastening force is converted into a pressing force for pressing the annular portions 24a and 25a in a direction, in which the intervals of the slits 24d and 25d of the annular portions 24a and 25a are reduced, by the first tapered surface 58a. At this time, the annular portion holding portion 56a functions as a reaction force member that receives a reaction force to the pressing force generated by the first tapered surface 58a. As a result, since the plate-like protruding portions 24e and 25e of the annular portions 24a and 25a are pressed toward the annular portion holding portion 56a by the pressing force that is generated by the first tapered surface 58a, the intervals of the slits 24d and 25d are reduced in the battery terminal 1c.

Further, at this time, the axial-direction fastening force generated between the fastening bolt 57 and the nut 59 is converted into a pulling force for pulling the annular portion holding portion 56a of the holding member 56 toward the fastening member supporting portion (the hole 56b) in the long-side direction through the edge protruding portion 56c of the holding member 56, which comes into contact with the second tapered surface 58b, by the second tapered surface 58b. Accordingly, in the battery terminal 1c, the annular portion holding portion 56a is pulled toward the annular portions 24a and 25a in the long-side direction by the pulling force that is generated by the second tapered surface 58b. The holding member 56 and the fastening bolt 57 are moved relative to each other in the long-side direction at this time, but the relative movement of the holding member 56 and the fastening bolt 57 in the long-side direction is not obstructed since the fastening bolt 57 is inserted into the elongated hole 56b formed at the holding member 56. As a result, in the battery terminal 1c, the intervals of the slits 24d and 25d formed at the plate-like protruding portions 24e and 25e of the annular portions 24a and 25a are also reduced by the pulling force that is generated by the second tapered surface 58b.

Accordingly, since the intervals of the slits 24d and 25d are reduced by the pressing force that is generated with the rotation of the fastening bolt 57 by the first tapered surface 58a and the pulling force that is generated by the second tapered surface 58b, the diameters of the post insertion holes 24c and 25c are reduced in a state in which the inner peripheral surfaces of the post insertion holes 24c and 25c come into contact with the outer peripheral surface of the battery post 51. As a result, the battery terminal 1c is fastened to the battery post 51. Then, metal fittings or the like provided at the end of an electrical wire are electrically connected to the shaft portion 22a of the stud bolt 22 of the battery terminal 1c.

According to the battery terminal 1c of the fourth embodiment, as described above, the axial-direction fastening force, which is generated with the rotation of the fastening bolt 57 about the axial direction, is converted into the long-side-direction pressing force, which reduces the intervals of the slits 24d and 25d of the annular portions 24a and 25a, by the action of the first tapered surface 58a of the spacer 58. Accordingly, it is possible to fasten the annular portions 24a and 25a to the battery post 51. Further, it is possible to efficiently convert an operation for tightening the fastening bolt 57 to the nut 59, that is, the rotation of the fastening bolt 57 about the axial direction into the long-side-direction pressing force that reduces the intervals of the slits 24d and 25d of the annular portions 24a and 25a by the action of the first tapered surface 58a of the spacer 58. Accordingly, since it is not necessary to set the axis of rotation of the fastening bolt 57 to the same direction as the fastening direction of the annular portions 24a and 25a and it is possible to set the axis of rotation of the fastening bolt 57 to the vertical direction in which an operation for tightening the fastening bolt 57 is easily performed, it is possible to improve workability during the fastening of the battery terminal 1c to the battery post 51.

Furthermore, according to the battery terminal 1c of the fourth embodiment, the axial-direction fastening force, which is generated with the rotation of the fastening bolt 57 about the axial direction, can be converted into a pulling force for pulling the annular portion holding portion 56a of the holding member 56 toward the fastening member supporting portion (the hole 56b) in the long-side direction by the action of the second tapered surface 58b of the spacer 58. Since the pulling force is applied in addition to the pressing force, the reduction of the intervals of the slits 24d and 25d formed at the plate-like protruding portions 24e and 25e of the annular portions 24a and 25a can be further facilitated. Accordingly, since it is possible to easily fasten the annular portions 24a and 25a to the battery post 51, it is possible to improve workability during the fastening of the battery terminal 1c to the battery post 51.

Fifth Embodiment

Figure 19:
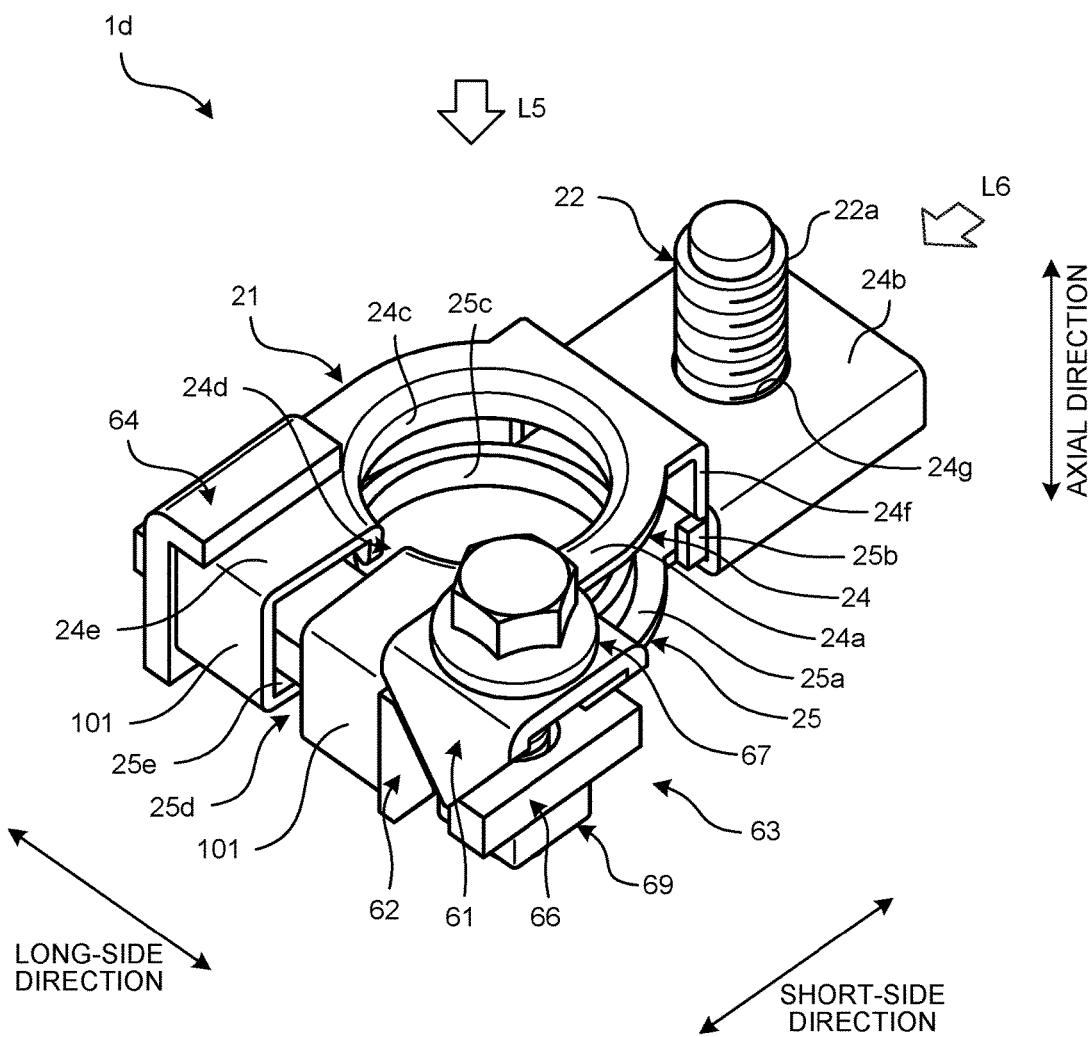
FIG. 19 is a perspective view illustrating a schematic structure of a battery terminal according to a fifth embodiment of the present invention.
Figure 20:
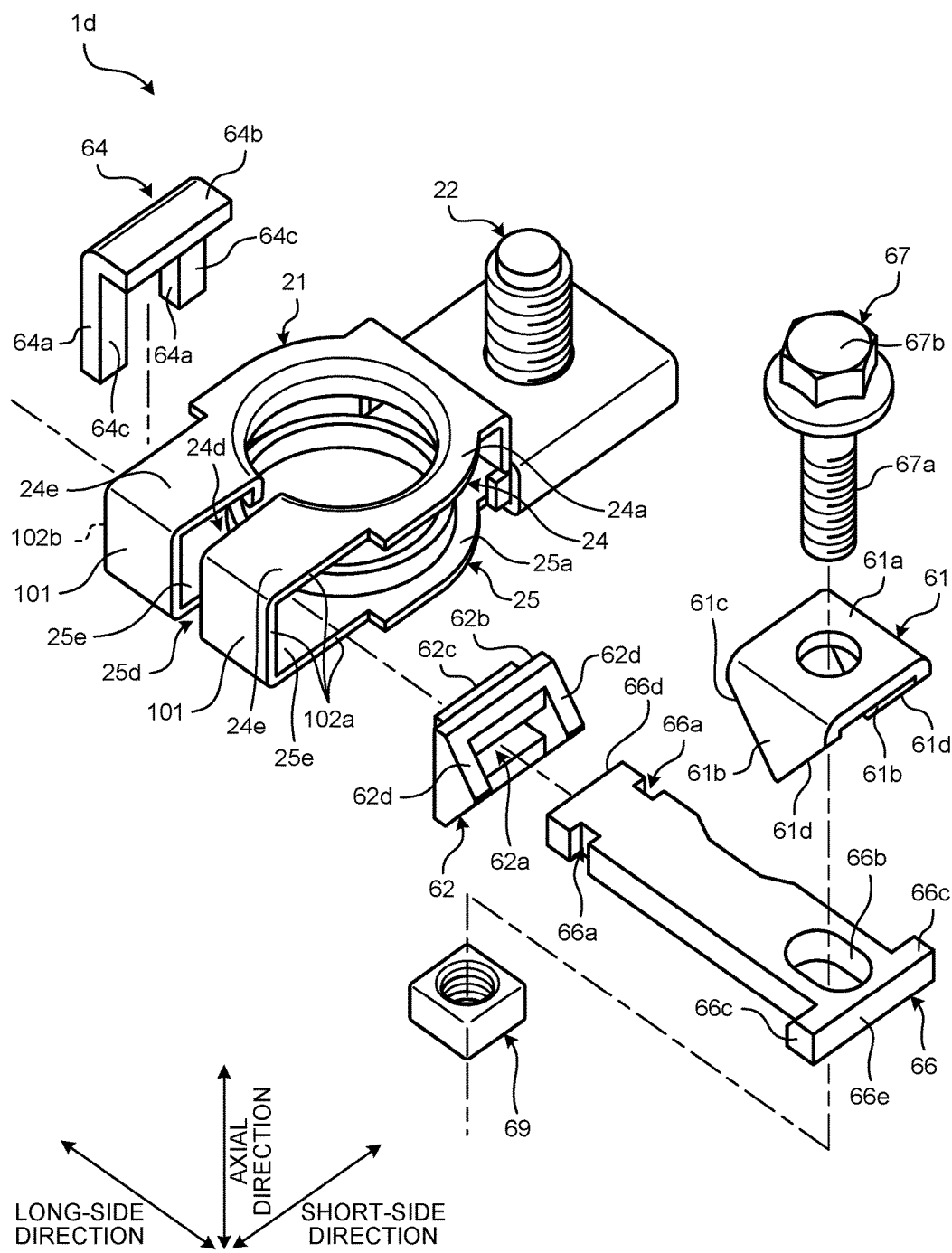
FIG. 20 is an exploded perspective view of the battery terminal illustrated in FIG. 19.
Figure 21:
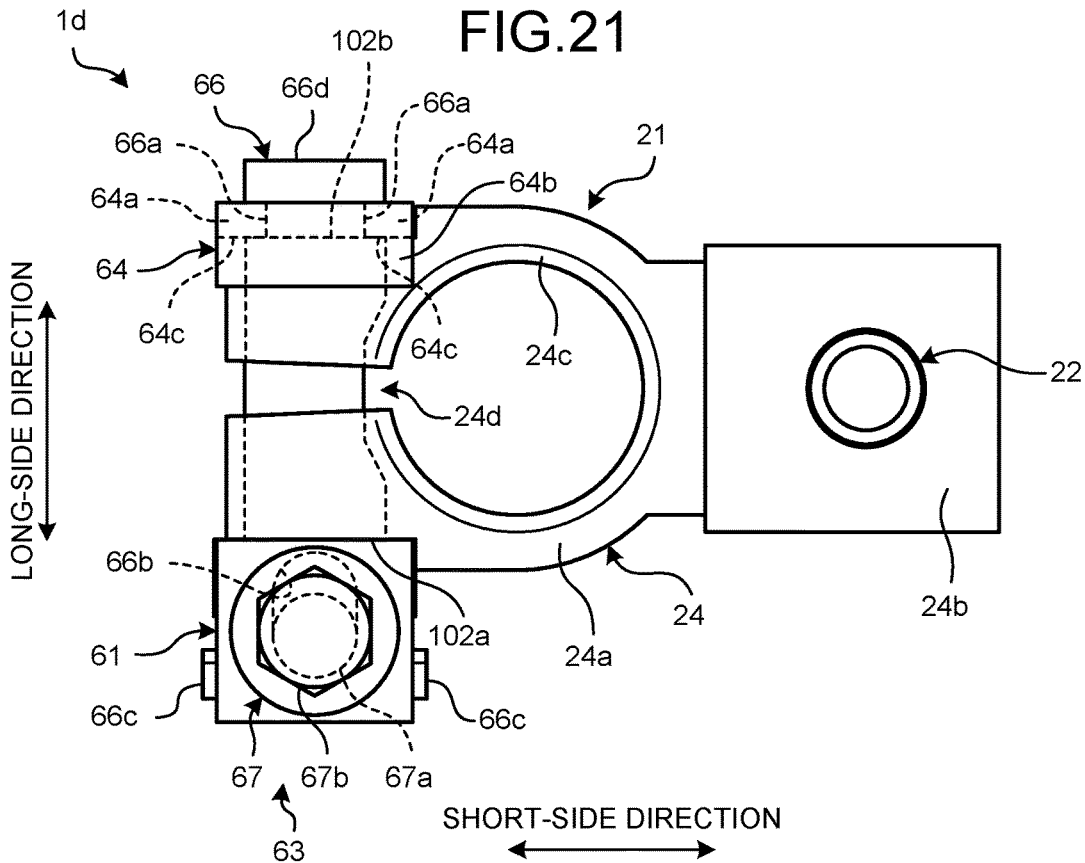
FIG. 21 is a view taken in the direction of an arrow L5 of FIG. 19.
Figure 22:
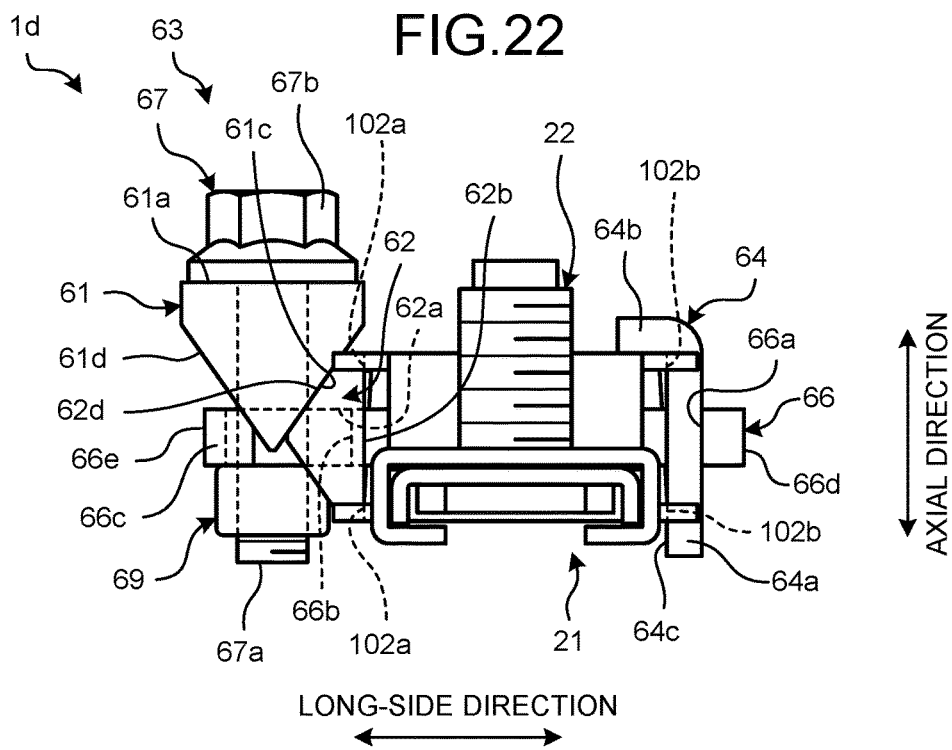
FIG. 22 is a view taken in the direction of an arrow L6 of FIG. 19.

A fifth embodiment will be described with reference to FIGS. 19 to 22. FIG. 19 is a perspective view illustrating the schematic structure of a battery terminal according to a fifth embodiment of the present invention. FIG. 20 is an exploded perspective view of the battery terminal illustrated in FIG. 19. FIG. 21 is a view taken in the direction of an arrow L5 of FIG. 19. FIG. 22 is a view taken in the direction of an arrow L6 of FIG. 19.

As illustrated in FIGS. 19 to 22, the structure of a fastening section 63 of a battery terminal 1d of the fifth embodiment is different from those of the battery terminals 1, 1a, 1b, and 1c of the first to fourth embodiments.

As illustrated in FIGS. 19 to 22, the battery terminal 1d of the fifth embodiment includes a main body 21, a stud bolt 22, and a fastening section 63. End portions of plate-like protruding portions 24e and 25e of upper and lower split bodies 24 and 25 of the main body 21 of this embodiment in the short-side direction are connected to each other by a bent connecting portion 101. The upper and lower split bodies 24 and 25 of the main body 21 are integrally formed through, for example, the bent connecting portion 101 and are bent, so that the main body 21 has the structure illustrated in FIGS. 19 and 20 and the like. Meanwhile, the main body 21 of this embodiment may have a split structure that includes upper and lower split bodies 24 and 25, as in the cases of the battery terminals 1, 1a, 1b, and 1c of the first to fourth embodiments.

Further, the main body 21 of this embodiment is not provided with the edge portions 24h and 25h of the first to third embodiments. That is, as illustrated in FIG. 20, both side surfaces of slits 24d and 25d in the long-side direction are notched toward the slits 24d and 25d in the long-side direction and are opened in a state in which the upper and lower split bodies 24 and 25 of the main body 21 are combined with each other. The plate-like protruding portions 24e and 25e and the end face of the bent connecting portion 101 form substantially U-shaped surfaces 102a and 102b to be pressed, which are orthogonal to the long-side direction, at a pair of openings formed on both sides in the long-side direction. The surfaces 102a and 102b to be pressed are portions that come into surface contact with a second spacer 62 and a retaining member 64 to be described below, and are portions that receive a pressing force, which reduce the slits 24d and 25d, from the second spacer 62 and the retaining member 64. In a state in which the battery terminal 1d illustrated in FIG. 19 is assembled, the surfaces 102a to be pressed are end faces at which a hole 66b (a fastening member supporting portion) of a penetrating plate 66 is positioned, and the surfaces 102b to be pressed are end faces at which notch portions 66a (retaining portions) of the penetrating plate 66 are positioned.

Meanwhile, since other main structures of the main body 21 and the stud bolt 22 have shapes slightly different from the shapes of the main structures of those of the battery terminals 1, 1a, and 1b of the first to third embodiments but have substantially the same functions as those of the battery terminals 1, 1a, and 1b, the description thereof will be omitted.

The fastening section 63 includes a penetrating plate 66, a fastening bolt 67 (a fastening member), a nut 69 (a member to be fastened), a first spacer 61 (a pressing force converting member), a second spacer 62 (a pressing force converting member), and a retaining member 64.

The penetrating plate 66 is a plate-like member that is disposed so as to penetrate the slits 24d and 25d and the plate-like protruding portions 24e and 25e in the long-side direction. The penetrating plate 66 penetrates the upper and lower split bodies from one end portions of the annular portions 24a and 25a to the other end portions of the annular portions 24a and 25a with the slits 24d and 25d interposed therebetween.

A pair of notch portions 66a with which the retaining member 64 is engaged are formed at edge portions, which are positioned on both sides of the penetrating plate 66 in the short-side direction, of one end portion 66d that is provided at one end of the penetrating plate 66 in the long-side direction. The notch portions 66a are dug toward the middle of the penetrating plate 66 from end faces of the penetrating plate 66 in the short-side direction so as to be parallel to the end faces. Further, the penetrating plate 66 includes an elongated hole 66b, which does not include a threaded groove on the inner periphery thereof and is formed along the long-side direction, at the other end portion 66e of the penetrating plate 66 that is opposite to end portion 66d at which the notch portions 66a are provided. Furthermore, protrusions 66c, which come into contact with the first spacer 61, protrude from both edge portions of the other end portion 66e, which is provided with the hole 66b, of the penetrating plate 66 in the short-side direction.

The fastening bolt 67 is supported by the hole 66b of the penetrating plate 66 so as to be rotatable about the axial direction. The fastening bolt 67 includes a shaft portion 67a and a head portion 67b that have the same structure as the shaft portion 27a and the head portion 27b of the fastening bolt 27 of the first embodiment, but does not include an element corresponding to the bolt-side tapered surface 27c.

The nut 69 faces the fastening bolt 67 with the penetrating plate 66 interposed therebetween in the axial direction, and is threadably engaged with the fastening bolt 67. The rotation of the nut 69 about the axial direction is regulated.

The first spacer 61 is disposed between the fastening bolt 67 and the penetrating plate 66 so that the fastening bolt 67 penetrates the first spacer 61. The first spacer 61 includes a rectangular base portion 61a that includes a hole where the shaft portion 67a of the fastening bolt 67 penetrates, and a pair of upright portions 61b that extend vertically downward from two sides, which face each other, among four sides of the base portion 61a. As illustrated in FIGS. 19, 20, and the like, two sides, which include the upright portions 61b, of the base portion 61a extend in the long-side direction. Since the pair of upright portions 61b of the first spacer 61 are disposed so that the penetrating plate 66 is interposed between the upright portions 61b in the short-side direction when being combined as illustrated in FIG. 19 and the like, the rotation of the first spacer 61 about the axial direction is regulated.

Tapered pressing surfaces 61c (first tapered surfaces) are formed on one ends of the pair of upright portions 61b of the first spacer 61 facing the plate-like protruding portions 24e and 25e in the long-side direction. The tapered pressing surfaces 61c are formed at positions where the tapered pressing surfaces 61c can come into contact with tapered surfaces 62d of the second spacer 62 to be described below. Further, the pair of upright portions 61b of the first spacer 61 is provided with tapered pulling surfaces 61d (third tapered surfaces) on the back sides of the tapered pressing surfaces 61c in the long-side direction. The tapered pulling surfaces 61d are formed at positions where the tapered pulling surfaces 61d can come into contact with the protrusions 66c of the penetrating plate 66.

The second spacer 62 is disposed so as to be movable relative to the penetrating plate 66 in the long-side direction, one end of the second spacer 62 in the long-side direction comes into contact with the annular portions 24a and 25a, and the other end of the of the second spacer 62 in the long-side direction comes into contact with the first spacer 61. The second spacer 62 is provided with a through hole 62a that passes through the second spacer 62 in the long-side direction, and the penetrating plate 66 is inserted into the through hole 62a. Accordingly, the second spacer 62 can be moved relative to the penetrating plate 66 in the long-side direction.

One end face 62b of the second spacer 62 in the long-side direction comes into contact with the surfaces 102a to be pressed of the annular portions 24a and 25a from the end portion (the other end portion) side of the penetrating plate 66 at which the hole 66b is provided. Further, a protruding portion 62c, which protrudes toward the annular portions 24a and 25a, is provided on a central portion of the end face 62b. Since the end face 62b of the second spacer 62 comes into contact with the surfaces 102a to be pressed and the protruding portion 62c is fitted to the opening that is formed closer to the center than the surfaces 102a to be pressed of the annular portions 24a and 25a, the movement of the second spacer 62 relative to the main body 21 in the short-side direction and the axial direction is regulated. Tapered surfaces 62d (second tapered surfaces), which come into contact with the tapered pressing surfaces 61c of the first spacer 61, are formed on the other end side of the second spacer 62 in the long-side direction.

The retaining member 64 is a plate-like member that is disposed at one end portion of the penetrating plate 66 so as to be orthogonal to the penetrating plate 66 by being fitted to the pair of notch portions 66a of the penetrating plate 66. The retaining member 64 includes a pair of flat plate portions 64a and a locking portion 64b. The pair of flat plate portions 64a is disposed in parallel in the short-side direction so as to be slidably fitted to the pair of notch portions 66a of the penetrating plate 66 by the movement of the retaining member 64 in the axial direction. Further, the pair of flat plate portions 64a include contact surfaces 64c that face the surfaces 102b to be pressed of the annular portions 24a and 25a so as to be capable of coming into contact with the surfaces 102b to be pressed when the pair of flat plate portions 64a are fitted to the pair of notch portions 66a. The locking portion 64b is connected to one end portions of the pair of flat plate portions 64a in the axial direction, and extends in the short-side direction. The locking portion 64b is bent from the pair of flat plate portions 64a toward the annular portions 24a and 25a substantially at a right angle.

Further, the tapered pressing surfaces 61c of the first spacer 61 and the tapered surfaces 62d of the second spacer 62 are inclined in a direction in which an axial-direction fastening force, which is generated between the fastening bolt 67 and the nut 69 when the fastening bolt 67 approaches the nut 69 in the axial direction with the rotation of the fastening bolt 67 about the axial direction, is converted into a long-side-direction pressing force of the second spacer 62 pressing the annular portions 24a and 25a in a direction in which the intervals of the slits 24d and 25d of the annular portions 24a and 25a are reduced, that is, toward the notch portions 66a of the penetrating plate 66 in the long-side direction. In this embodiment, the tapered pressing surfaces 61c of the first spacer 61 are inclined so that the width of each upright portion 61b of the first spacer 61 in the long-side direction is gradually reduced as it is separated from the head portion 67b of the fastening bolt 67 in the axial direction. Meanwhile, the tapered surfaces 62d of the second spacer 62 are inclined so that the width of the second spacer 62 in the long-side direction is gradually increased as it is separated from the head portion 67b of the fastening bolt 67 in the axial direction. Furthermore, the tapered pressing surfaces 61c of the first spacer 61 and the tapered surfaces 62d of the second spacer 62 are disposed so as to face each other.

Moreover, the tapered pulling surfaces 61d of the first spacer 61 are inclined in a direction in which an axial-direction fastening force, which is generated between the fastening bolt 67 and the nut 69 when the fastening bolt 67 approaches the nut 69 in the axial direction with the rotation of the fastening bolt 67 about the axial direction, is converted into a pulling force for pulling the retaining member 64, which is fitted to the notch portions 66a, toward the hole 66b in the long-side direction by the protrusions 66c of the penetrating plate 66 coming into contact with the tapered pulling surfaces 61d. In this embodiment, the tapered pulling surfaces 61d are inclined so that the width of each upright portion 61b of the first spacer 61 in the long-side direction is gradually reduced as it is separated from the head portion 67b of the fastening bolt 67 in the axial direction.

That is, when viewed in the short-side direction, the upright portions 61b of the first spacer 61 of this embodiment are formed in the shape of an inverted triangle by the tapered pressing surfaces 61c and the tapered pulling surfaces 61d so that the width of each upright portion 61b in the long-side direction is gradually reduced as it is separated from the head portion 67b of the fastening bolt 67 in the axial direction.

Meanwhile, a portion, which comes into contact with the tapered pulling surface 61d of the first spacer 61, of each protrusion 66c of the penetrating plate 66 may be inclined in the same direction as the tapered pulling surface 61d so that the contact area between the tapered pulling surface 61d and the protrusion 66c is increased.

In this embodiment, when the fastening section 63 is combined with the main body 21, first of all, the second spacer 62 is fitted to the main body 21 so that the end face 62b of the second spacer 62 comes into contact with the surfaces 102a to be pressed of the main body 21. Next, when one end portion 66d of the penetrating plate 66 is inserted into the through hole 62a of the second spacer 62 and penetrates the plate-like protruding portions 24e and 25e so as to cross the slits 24d and 25d of the main body 21, the notch portions 66a of the end portion 66d are moved to the outside of the surfaces 102b to be pressed of the main body 21 in the long-side direction. The retaining member 64 is fitted to the notch portions 66a from above in the axial direction. Accordingly, the penetrating plate 66 is prevented from being detached toward the surfaces 102a to be pressed of the main body 21. That is, in this embodiment, the notch portions 66a of the penetrating plate 66 and the retaining member 64 fitted to the notch portions 66a have the same function as the retaining portion 26a of the first embodiment.

After that, the first spacer 61 is combined with the second spacer 62 and the penetrating plate 66 so that the tapered pressing surfaces 61c of the first spacer 61 come into contact with the tapered surfaces 62d of the second spacer 62 and the hole of the first spacer 61 overlaps the hole 66b of the penetrating plate 66 in the axial direction. The nut 69 is disposed below the hole 66b of the penetrating plate 66 in the axial direction, and the fastening bolt 67 is inserted into the hole of the first spacer 61 and the hole 66b of the penetrating plate 66 and threadably engaged with the nut 69. The fastening section 63 is combined with the main body 21 in this way.

When the battery post 51 is inserted into the post insertion holes 24c and 25c in the state illustrated in FIG. 22, the battery terminal 1d of the fifth embodiment is combined with the battery post 51. Then, when the fastening bolt 67 is tightened from above in the vertical direction (the axial direction) in a state in which the inner peripheral surfaces of the post insertion holes 24c and 25c come into contact with the outer peripheral surface of the battery post 51, both the annular portions 24a and 25a are tightened in a direction in which the annular portions 24a and 25a approach each other with the slits 24d and 25d interposed therebetween. Accordingly, the battery terminal 1d is fastened to the battery post 51.

In more detail, when the head portion 67b of the fastening bolt 67 is rotated about the axial direction (the shaft portion 67a) by a tool or the like and the fastening bolt 67 approaches the nut 69 in the axial direction, an axial-direction fastening force is generated between the fastening bolt 67 and the nut 69. The first spacer 61 is pressed down in the vertical direction through the seat surface of the fastening bolt 67 by the axial-direction fastening force. The axial-direction fastening force is converted into a pressing force for pressing the annular portions 24a and 25a in a direction, in which the intervals of the slits 24d and 25d of the annular portions 24a and 25a are reduced, by the tapered pressing surfaces 61c of the first spacer 61 and the tapered surfaces 62d of the second spacer 62 coming into contact with the tapered pressing surfaces 61c. The end faces 62b of the second spacer 62 press the surfaces 102a to be pressed of the annular portions 24a and 25a by the pressing force. At this time, the retaining member 64, which is fitted to the notch portions 66a of the penetrating plate 66, functions as a reaction force member that receives a reaction force to the pressing force applied to the annular portions 24a and 25a by the second spacer 62. As a result, since the plate-like protruding portions 24e and 25e of the annular portions 24a and 25a are pressed toward the retaining member 64 by the pressing force that is generated by the second spacer 62, the intervals of the slits 24d and 25d are reduced in the battery terminal 1d.

Further, at this time, the axial-direction fastening force generated between the fastening bolt 67 and the nut 69 is converted into a pulling force for pulling the retaining member 64, which is mounted on one end portion 66d of the penetrating plate 66 opposite to the protrusions 66c, toward the hole 66b in the long-side direction through the protrusions 66c of the penetrating plate 66, which come into contact with the tapered pulling surfaces 61d, by the tapered pulling surface 61d of the first spacer 61. The contact surfaces 64c of the retaining member 64 are pulled toward the surfaces 102b to be pressed of the annular portions 24a and 25a by the pulling force. The penetrating plate 66 and the fastening bolt 67 are moved relative to each other in the long-side direction at this time, but the relative movement of the penetrating plate 66 and the fastening bolt 67 in the long-side direction is not obstructed since the fastening bolt 67 is inserted into the elongated hole 66b formed at the penetrating plate 66. As a result, in the battery terminal 1d, the intervals of the slits 24d and 25d formed at the plate-like protruding portions 24e and 25e of the annular portions 24a and 25a are also reduced by the pulling force that is generated by the tapered pulling surfaces 61d of the first spacer 61.

Accordingly, since the intervals of the slits 24d and 25d are reduced by the pressing force that is generated with the rotation of the fastening bolt 67 by the tapered pressing surfaces 61c of the first spacer 61 and the tapered surfaces 62d of the second spacer 62 and the pulling force that is generated by the tapered pulling surfaces 61d of the first spacer 61, the diameters of the post insertion holes 24c and 25c are reduced in a state in which the inner peripheral surfaces of the post insertion holes 24c and 25c come into contact with the outer peripheral surface of the battery post 51. As a result, the battery terminal 1d is fastened to the battery post 51. Then, metal fittings or the like provided at the end of an electrical wire are electrically connected to the shaft portion 22a of the stud bolt 22 of the battery terminal 1d.

According to the battery terminal 1d of the fifth embodiment, as described above, the axial-direction fastening force, which is generated with the rotation of the fastening bolt 67 about the axial direction, is converted into the long-side-direction pressing force, which reduces the intervals of the slits 24d and 25d of the annular portions 24a and 25a, by the action of the tapered pressing surfaces 61c of the first spacer 61 and the action of the tapered surfaces 62d of the second spacer 62. Accordingly, it is possible to fasten the annular portions 24a and 25a to the battery post 51. Further, it is possible to efficiently convert an operation for tightening the fastening bolt 67 to the nut 69, that is, the rotation of the fastening bolt 67 about the axial direction into the long-side-direction pressing force that reduces the intervals of the slits 24d and 25d of the annular portions 24a and 25a by the action of the tapered pressing surfaces 61c of the first spacer 61 and the action of the tapered surfaces 62d of the second spacer 62. Accordingly, since it is not necessary to set the axis of rotation of the fastening bolt 67 to the same direction as the fastening direction of the annular portions 24a and 25a and it is possible to set the axis of rotation of the fastening bolt 67 to the vertical direction in which an operation for tightening the fastening bolt 67 is easily performed, it is possible to improve workability during the fastening of the battery terminal 1d to the battery post 51.

Furthermore, according to the battery terminal 1d of the fifth embodiment, the axial-direction fastening force, which is generated with the rotation of the fastening bolt 67 about the axial direction, can be converted into a pulling force for pulling the retaining member 64, which is mounted on the penetrating plate 66, toward the fastening member supporting portion (the hole 66b) in the long-side direction by the action of the tapered pulling surfaces 61d of the first spacer 61. Since the pulling force is applied in addition to the pressing force, the reduction of the intervals of the slits 24d and 25d formed at the plate-like protruding portions 24e and 25e of the annular portions 24a and 25a can be further facilitated. Accordingly, since it is possible to easily fasten the annular portions 24a and 25a to the battery post 51, it is possible to improve workability during the fastening of the battery terminal 1d to the battery post 51.

Therefore, the same effects as the battery terminals 1, 1a, 1b, and 1c of the first to fourth embodiments can be obtained from the battery terminal 1d of the fifth embodiment. Further, in the battery terminal 1d of the fifth embodiment, the end face 62b of the second spacer 62 and the contact surfaces 64c of the retaining member 64 come into surface contact with both the surfaces 102a and 102b to be pressed of the plate-like protruding portions 24e and 25e of the annular portions 24a and 25a in the long-side direction. Accordingly, since the pressing force and the pulling force, which are generated with the rotation of the fastening bolt 67, can be efficiently applied to the annular portions 24a and 25a in the long-side direction that is a direction in which the intervals of the slits 24d and 25d are reduced, the battery terminal 1d can be quickly fastened to the battery post 51.

Sixth Embodiment

Figure 23:
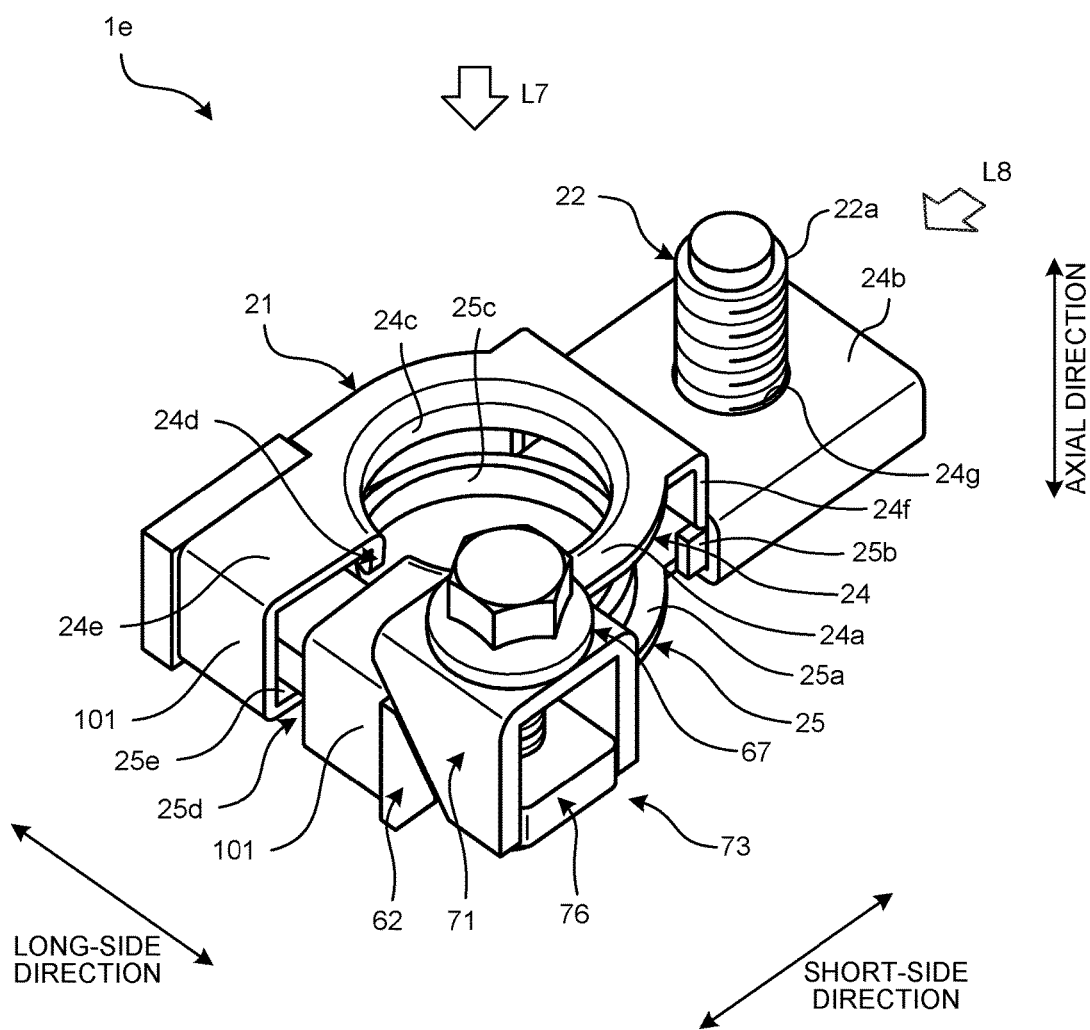
FIG. 23 is a perspective view illustrating a schematic structure of a battery terminal according to a sixth embodiment of the present invention.
Figure 24:
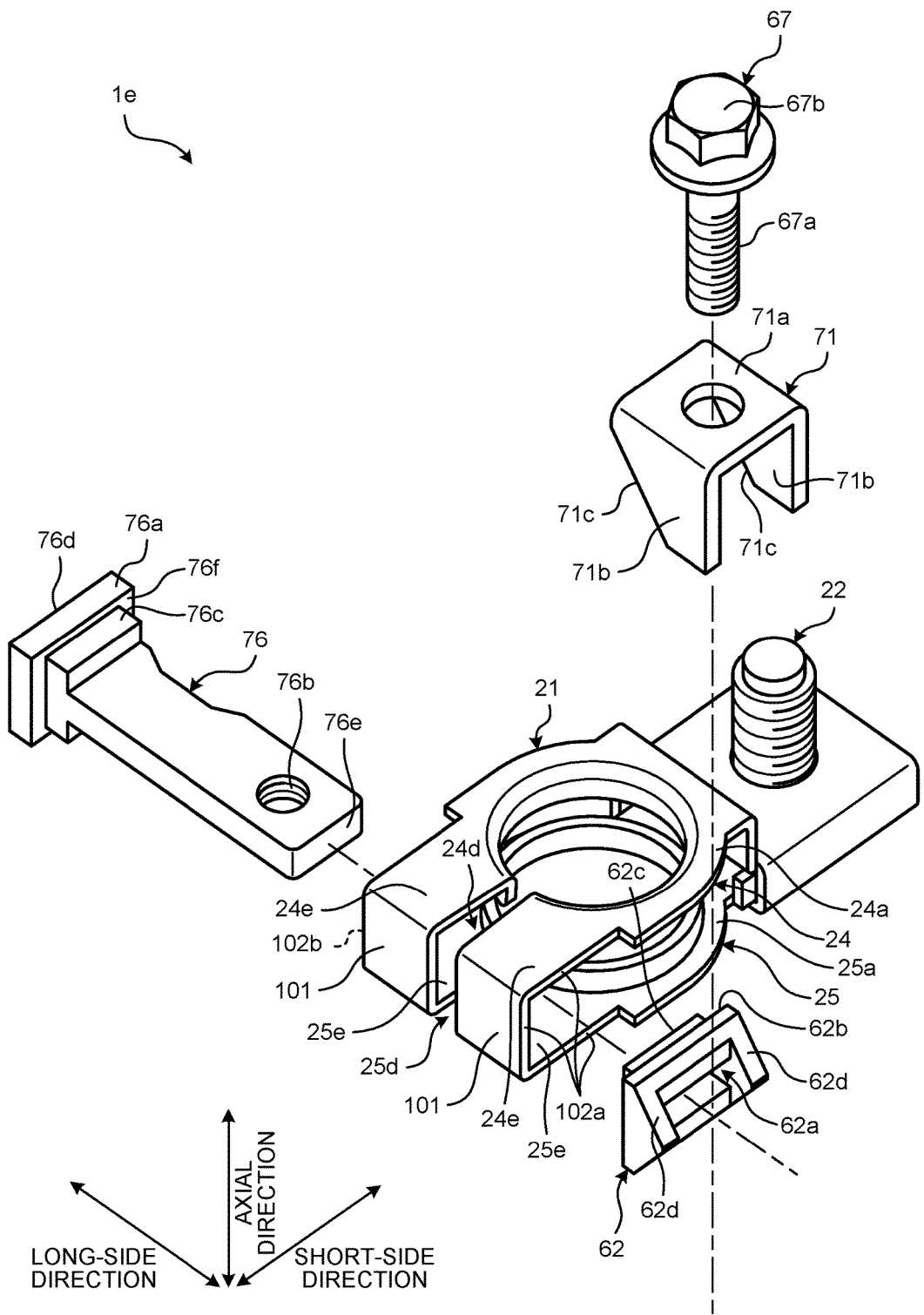
FIG. 24 is an exploded perspective view of the battery terminal illustrated in FIG. 23.
Figure 25:
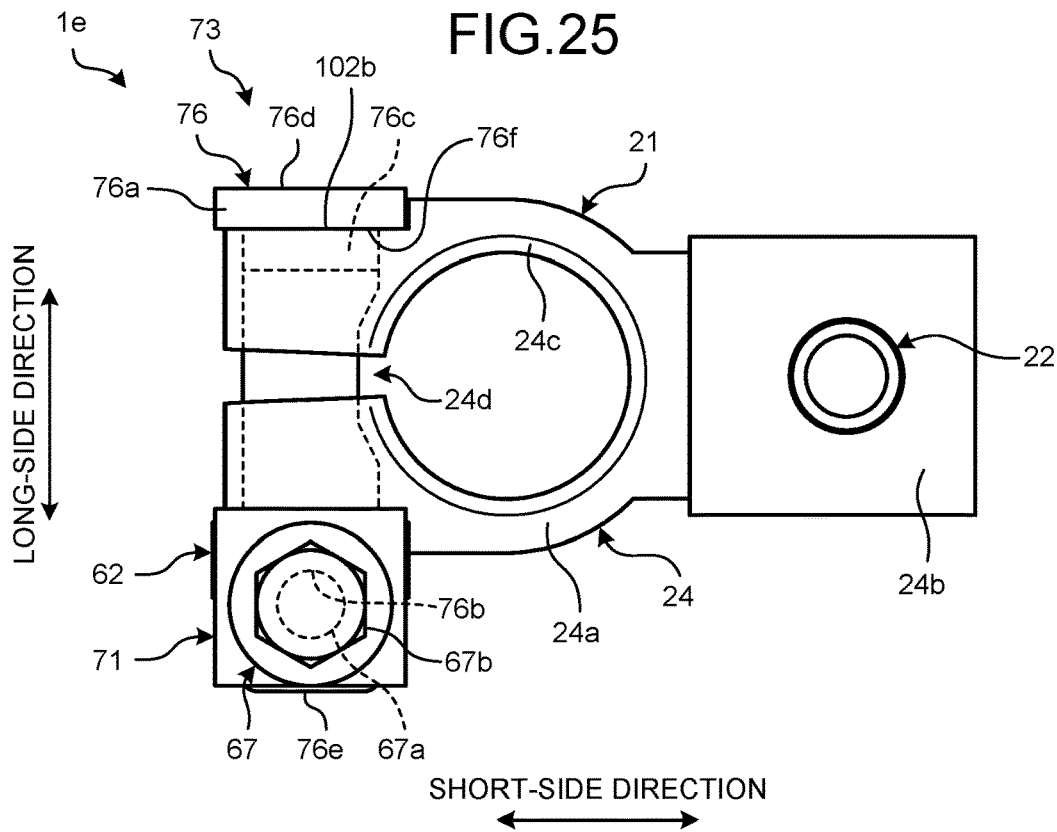
FIG. 25 is a view taken in the direction of an arrow L7 of FIG. 23.
Figure 26:
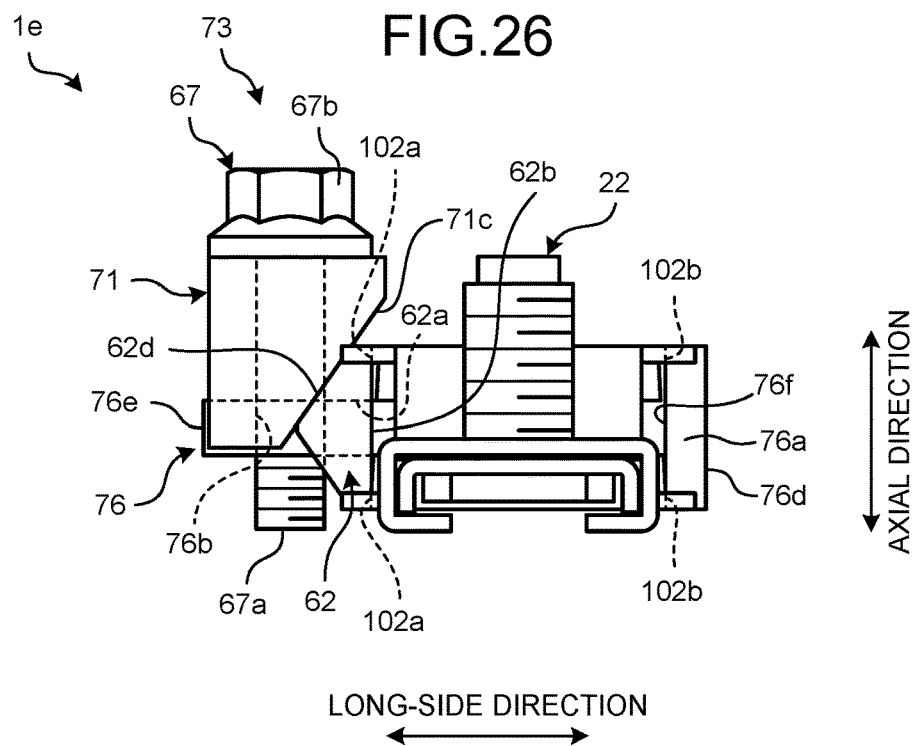
FIG. 26 is a view taken in the direction of an arrow L8 of FIG. 23.

A sixth embodiment will be described with reference to FIGS. 23 to 26. FIG. 23 is a perspective view illustrating the schematic structure of a battery terminal according to a sixth embodiment of the present invention. FIG. 24 is an exploded perspective view of the battery terminal illustrated in FIG. 23. FIG. 25 is a view taken in the direction of an arrow L7 of FIG. 23. FIG. 26 is a view taken in the direction of an arrow L8 of FIG. 23.

As illustrated in FIGS. 23 to 26, the structure of a fastening section 73 of a battery terminal 1e of the sixth embodiment is different from that of the battery terminal 1d of the fifth embodiment.

The battery terminal 1e of the sixth embodiment includes a main body 21, a stud bolt 22, and a fastening section 73. The fastening section 73 includes a penetrating plate 76, a fastening bolt 67 (a fastening member), a first spacer 71 (a pressing force converting member), and a second spacer 62 (a pressing force converting member). Meanwhile, since the structures of the main body 21 and the stud bolt 22 are the same as the structures of those of the battery terminal 1d of the fifth embodiment, the description thereof will be omitted.

The penetrating plate 76 includes a retaining portion 76a (a plate-like member, an annular portion holding portion) at one end portion 76d thereof in the long-side direction. As in the case of the retaining portion 26a of the first embodiment, the retaining portion 76a prevents the penetrating plate 76 from being detached from the main body 21 toward the other end portion 76e, which is opposite to one end portion 76d at which the retaining portion 76a is provided, in a state in which the penetrating plate 76 penetrates both ends of the annular portions 24a and 25a. Specifically, the retaining portion 76a is formed at one end portion 76d of the penetrating plate 76 in the long-side direction so as to protrude to both sides in the short-side direction and both sides in the axial direction. That is, the retaining portion 76a is formed at one end portion 76d of the penetrating plate 76 so as to be integrated with the penetrating plate 76. As illustrated in FIG. 24, the retaining portion 76a includes a contact surface 76f that faces the surfaces 102b to be pressed of the annular portions 24a and 25a so as to be capable of coming into contact with the surfaces 102b to be pressed. Further, the penetrating plate 76 is provided with a protruding portion 76c that is adjacent to the retaining portion 76a and protrudes from the contact surface 76f toward the other end portion 76e. Since the contact surface 76f of the retaining portion 76a comes into contact with the surfaces 102b to be pressed of the annular portions 24a and 25a and the protruding portion 76c is fitted to an opening that is formed closer to the center than the surfaces 102b to be pressed, the penetrating plate 76 is prevented from being detached toward the surfaces 102a to be pressed of the main body 21.

Furthermore, a threaded hole 76b (a fastening member supporting portion, a member to be fastened) is provided at the other end portion 76e of the penetrating plate 76, which is opposite to one end portion 76d at which the retaining portion 76a is provided, so as to pass through the penetrating plate 76 in the axial direction. The threaded hole 76b also has a function to support the fastening bolt 67 at a predetermined position in the axial direction.

The first spacer 71 is disposed between the fastening bolt 67 and the penetrating plate 76 so that the fastening bolt 67 penetrates the first spacer 71. The first spacer 71 includes a rectangular base portion 71a that includes a hole where the shaft portion 67a of the fastening bolt 67 penetrates, and a pair of upright portions 71b that extend vertically downward from two sides, which face each other, among four sides of the base portion 71a. As illustrated in FIGS. 23, 24, and the like, two sides, which include the upright portions 71b, of the base portion 71a extend in the long-side direction. Since the pair of upright portions 71b of the first spacer 71 are disposed so that the penetrating plate 76 is interposed between the upright portions 71b in the short-side direction when being combined as illustrated in FIG. 24 and the like, the rotation of the first spacer 71 about the axial direction is regulated.

Tapered surfaces 71c (first tapered surfaces) are formed on one ends of the pair of upright portions 71b of the first spacer 71 facing the plate-like protruding portions 24e and 25e in the long-side direction. The tapered surfaces 71c are formed at positions where the tapered surfaces 71c can come into contact with tapered surfaces 62d (second tapered surfaces) of the second spacer 62. Meanwhile, since the structures of the second spacer 62 and the fastening bolt 67 are the same as the structures of those of the fifth embodiment, the description thereof will be omitted.

The tapered surfaces 71c of the first spacer 71 and the tapered surfaces 62d of the second spacer 62 are inclined in a direction in which an axial-direction fastening force, which is generated between the fastening bolt 67 and the threaded hole 76b when the fastening bolt 67 approaches the threaded hole 76b in the axial direction with the rotation of the fastening bolt 67 about the axial direction, is converted into a long-side-direction pressing force of the second spacer 62 pressing the annular portions 24a and 25a in a direction in which the intervals of the slits 24d and 25d of the annular portions 24a and 25a are reduced, that is, toward the retaining portion 76a of the penetrating plate 76 in the long-side direction. In this embodiment, the tapered surfaces 71c of the first spacer 71 are inclined so that the width of each upright portion 71b of the first spacer 71 in the long-side direction is gradually reduced as it is separated from the head portion 67b of the fastening bolt 67 in the axial direction. The tapered surfaces 71c of the first spacer 71 and the tapered surfaces 62d of the second spacer 62 are disposed so as to face each other.

In this embodiment, when the fastening section 73 is combined with the main body 21, first of all, the second spacer 62 is fitted to the main body 21 so that the end face 62b of the second spacer 62 comes into contact with the surfaces 102a to be pressed of the main body 21. After that, the other end portion 76e of the penetrating plate 76 is inserted into an opening of the main body 21 corresponding to the surfaces 102b to be pressed. The penetrating plate 76 is inserted until the contact surface 76f of the retaining portion 76a comes into contact with the surfaces 102b to be pressed of the main body 21. Accordingly, the penetrating plate 76 penetrates the plate-like protruding portions 24e and 25e so as to cross the slits 24d and 25d of the main body 21, and the other end portion 76e of the penetrating plate 76 is moved to the outside from the through hole 62a of the second spacer 62 in the long-side direction.

After that, the first spacer 71 is combined with the second spacer 62 and the penetrating plate 76 so that the tapered surfaces 71c of the first spacer 71 come into contact with the tapered surfaces 62d of the second spacer 62 and the hole of the first spacer 71 overlaps the threaded hole 76b of the penetrating plate 76 in the axial direction. The fastening bolt 67 is inserted into the hole of the first spacer 71 from above in the axial direction, and is threadably engaged with the threaded hole 76b of the penetrating plate 76. The fastening section 73 is combined with the main body 21 in this way.

When the battery post 51 is inserted into the post insertion holes 24c and 25c in the state illustrated in FIG. 26, the battery terminal 1e of the sixth embodiment is combined with the battery post 51. Then, when the fastening bolt 67 is tightened from above in the vertical direction (the axial direction) in a state in which the inner peripheral surfaces of the post insertion holes 24c and 25c come into contact with the outer peripheral surface of the battery post 51, both the annular portions 24a and 25a are tightened in a direction in which the annular portions 24a and 25a approach each other with the slits 24d and 25d interposed therebetween. Accordingly, the battery terminal 1e is fastened to the battery post 51.

In more detail, when the head portion 67b of the fastening bolt 67 is rotated about the axial direction (the shaft portion 67a) by a tool or the like and the fastening bolt 67 approaches the threaded hole 76b of the penetrating plate 76 in the axial direction, an axial-direction fastening force is generated between the fastening bolt 67 and the threaded hole 76b. The first spacer 71 is pressed down in the vertical direction through the seat surface of the fastening bolt 67 by the axial-direction fastening force. The axial-direction fastening force is converted into a pressing force for pressing the annular portions 24a and 25a in a direction, in which the intervals of the slits 24d and 25d of the annular portions 24a and 25a are reduced, by the tapered surfaces 71c of the first spacer 71 and the tapered surfaces 62d of the second spacer 62 coming into contact with the tapered surfaces 71c. The end faces 62b of the second spacer 62 press the surfaces 102a to be pressed of the annular portions 24a and 25a by the pressing force. At this time, the retaining portion 76a, which is provided at one end portion 76d of the penetrating plate 76, functions as a reaction force member that receives a reaction force to the pressing force applied to the annular portions 24a and 25a by the second spacer 62. As a result, since the plate-like protruding portions 24e and 25e of the annular portions 24a and 25a are pressed toward the retaining portion 76a by the pressing force that is generated by the second spacer 62, the intervals of the slits 24d and 25d are reduced in the battery terminal 1e.

Accordingly, since the intervals of the slits 24d and 25d are reduced by the pressing force that is generated with the rotation of the fastening bolt 67 by the tapered surfaces 71c of the first spacer 71 and the tapered surfaces 62d of the second spacer 62, the diameters of the post insertion holes 24c and 25c are reduced in a state in which the inner peripheral surfaces of the post insertion holes 24c and 25c come into contact with the outer peripheral surface of the battery post 51. As a result, the battery terminal 1e is fastened to the battery post 51.

According to the battery terminal 1e of the sixth embodiment, as described above, the axial-direction fastening force, which is generated with the rotation of the fastening bolt 67 about the axial direction, is converted into the long-side-direction pressing force, which reduces the intervals of the slits 24d and 25d of the annular portions 24a and 25a, by the action of the tapered surfaces 71c of the first spacer 71 and the action of the tapered surfaces 62d of the second spacer 62. Accordingly, it is possible to fasten the annular portions 24a and 25a to the battery post 51. Therefore, the same effects as the battery terminals 1, 1a, 1b, 1c, and 1d of the first to fifth embodiments can be obtained from the battery terminal 1e of the sixth embodiment.

Meanwhile, a structure in which the threaded hole 76b of the penetrating plate 76 is provided as the member to be fastened to be threadably engaged with the fastening bolt 67 and the axial-direction fastening force is generated between the fastening bolt 67 and the penetrating plate 76 has been exemplified in the sixth embodiment. However, a separate nut may be provided as the member to be fastened.

Seventh Embodiment

Figure 27:
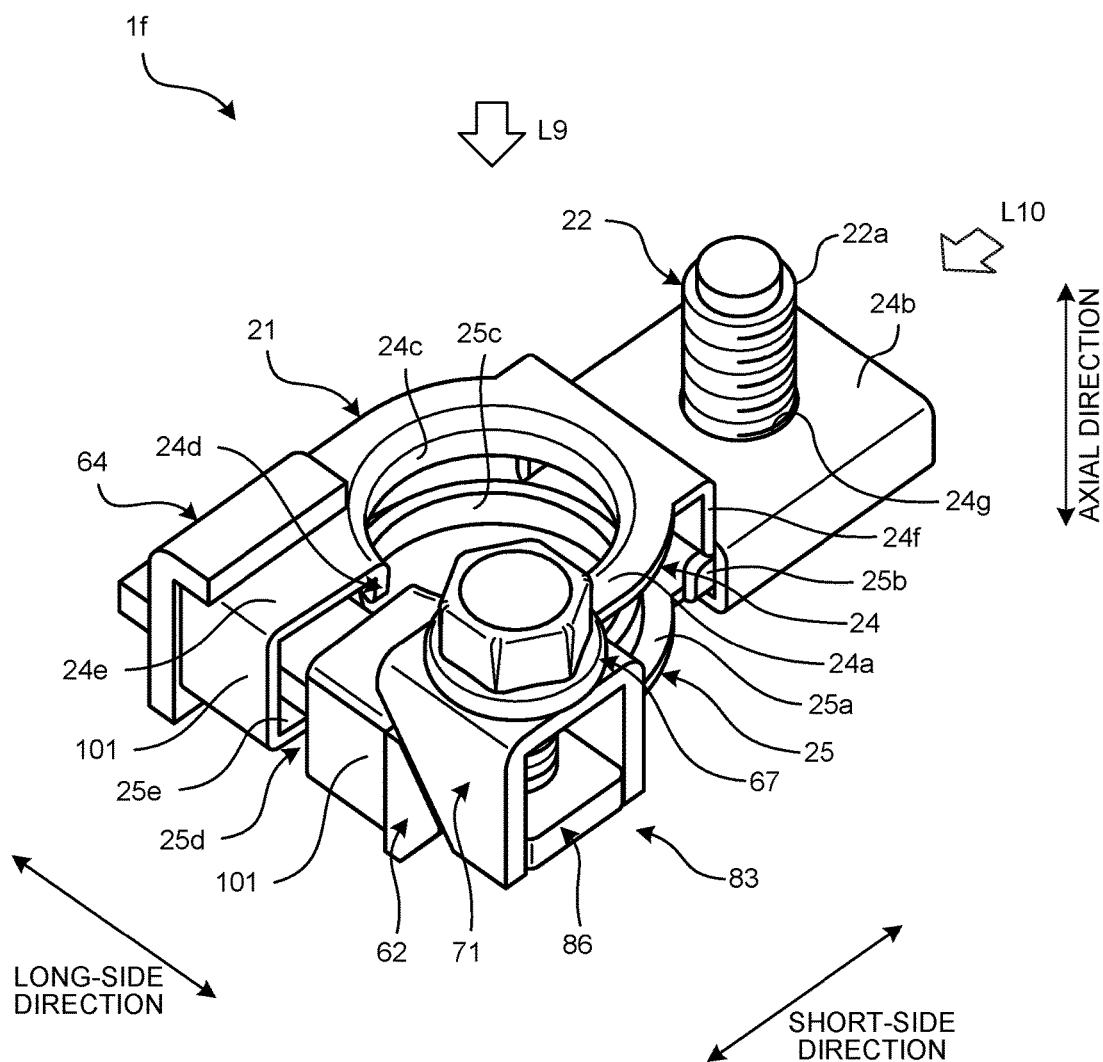
FIG. 27 is a perspective view illustrating a schematic structure of a battery terminal according to a seventh embodiment of the present invention.
Figure 28:
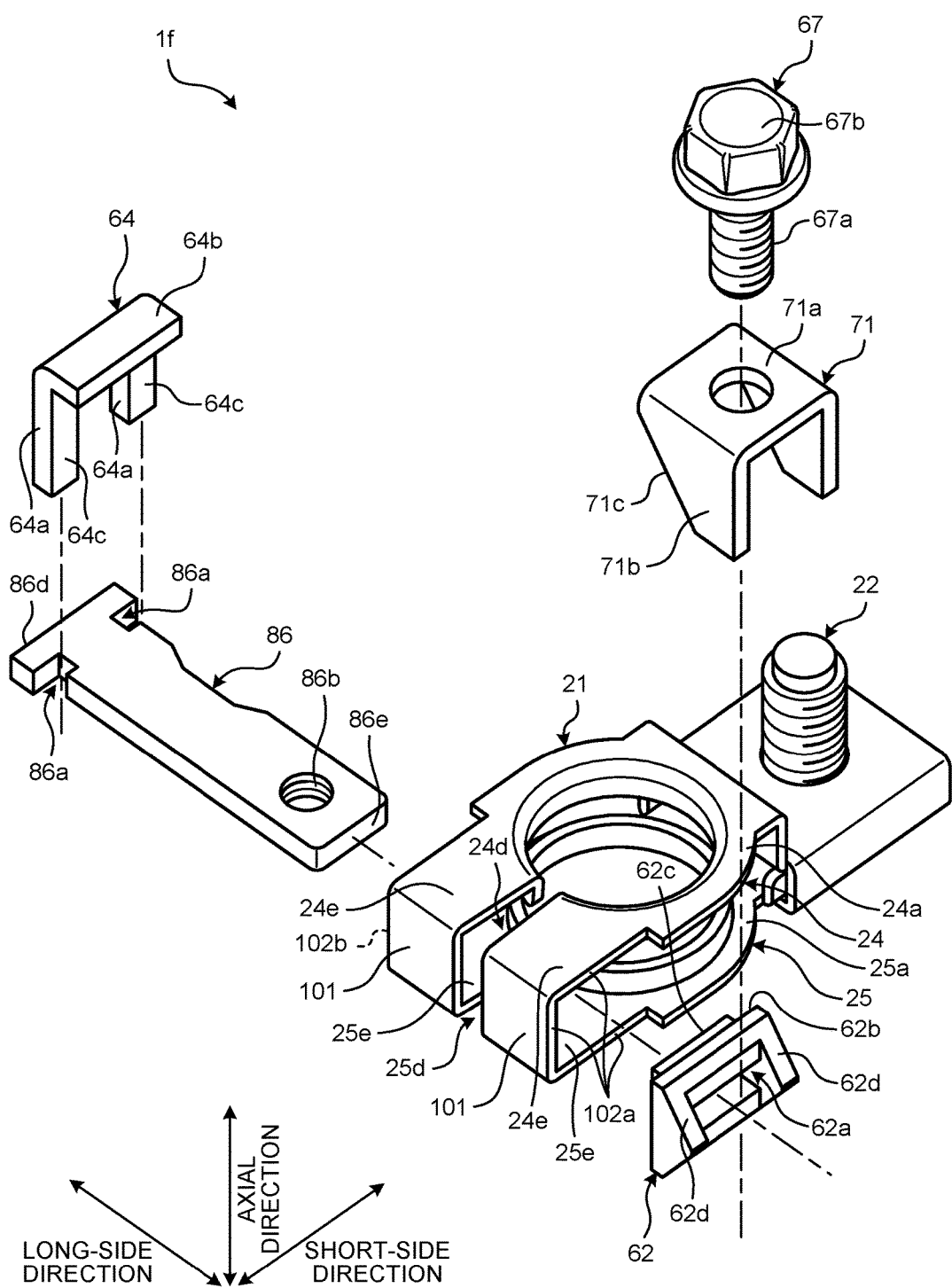
FIG. 28 is an exploded perspective view of the battery terminal illustrated in FIG. 27.
Figure 29:
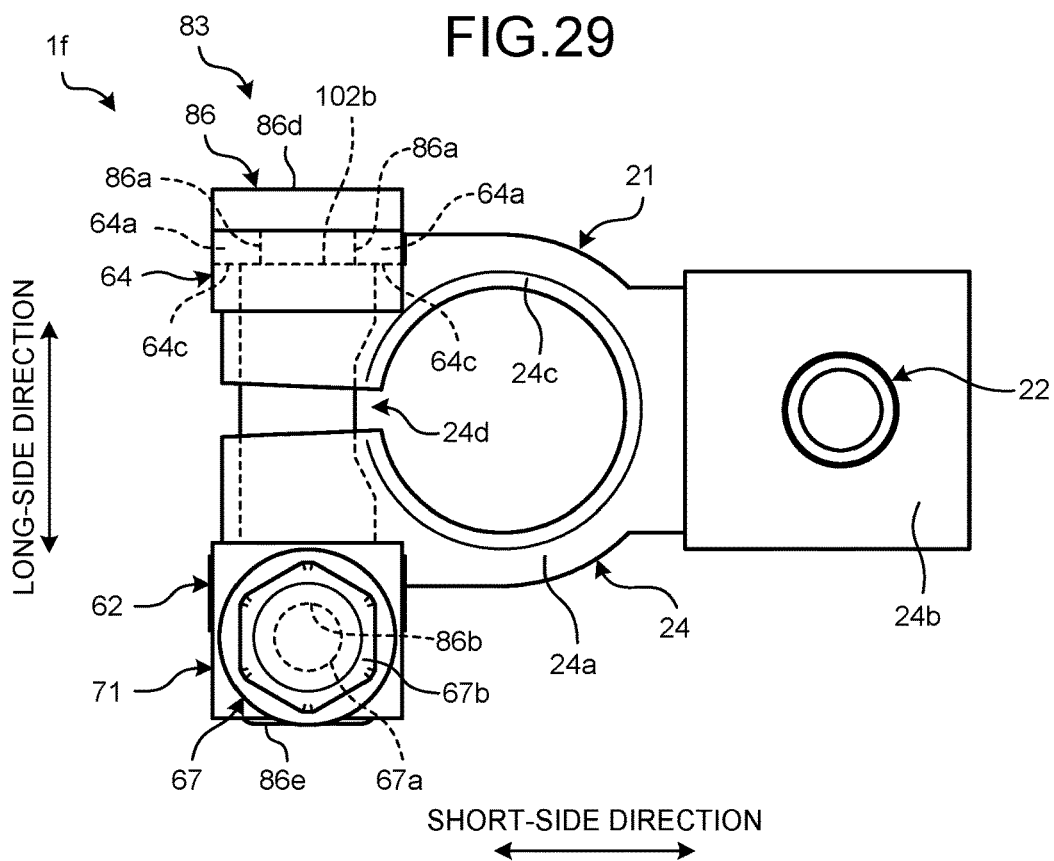
FIG. 29 is a view taken in the direction of an arrow L9 of FIG. 27.
Figure 30:
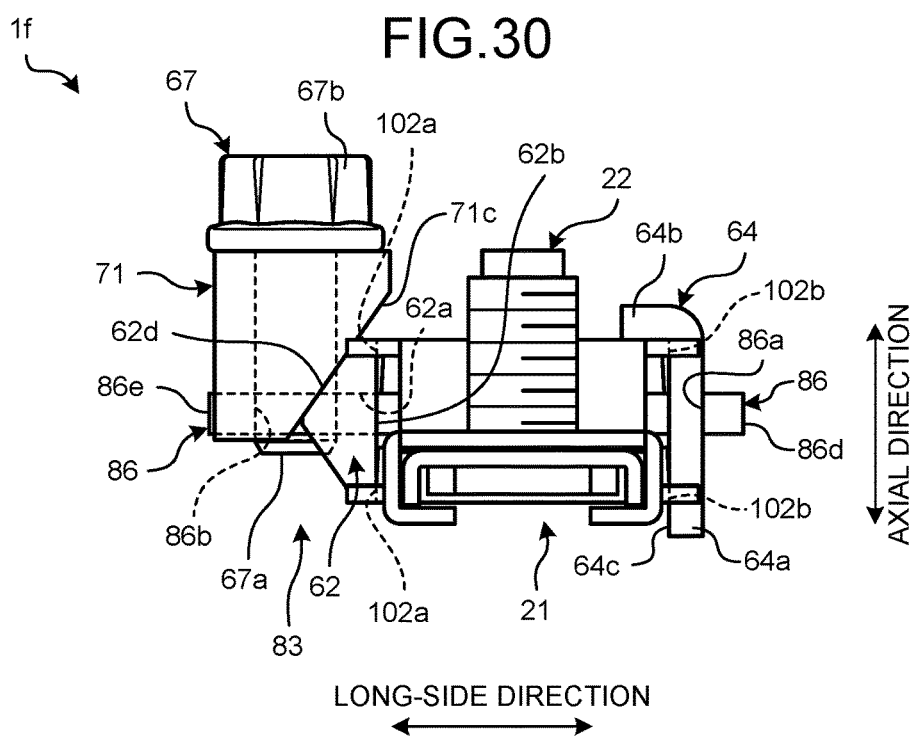
FIG. 30 is a view taken in the direction of an arrow L10 of FIG. 27.

A seventh embodiment will be described with reference to FIGS. 27 to 30. FIG. 27 is a perspective view illustrating the schematic structure of a battery terminal according to the seventh embodiment of the present invention. FIG. 28 is an exploded perspective view of the battery terminal illustrated in FIG. 27. FIG. 29 is a view taken in the direction of an arrow L9 of FIG. 27. FIG. 30 is a view taken in the direction of an arrow L10 of FIG. 27.

As illustrated in FIGS. 27 to 30, a portion, which relates to a function to retain a penetrating plate 86, of the structure of a fastening section 83 of a battery terminal 1f of the seventh embodiment is different from that of the battery terminal 1e of the sixth embodiment. Specifically, the retaining member 64 of the fifth embodiment is applied to the battery terminal 1f of the seventh embodiment instead of the retaining portion 76a, which is integrally provided at one end portion 76d of the penetrating plate 76, of the battery terminal 1e of the sixth embodiment.

The battery terminal 1f of the seventh embodiment includes a main body 21, a stud bolt 22, and a fastening section 83. The fastening section 83 includes a penetrating plate 86, a fastening bolt 67 (a fastening member), a first spacer 71 (a pressing force converting member), a second spacer 62 (a pressing force converting member), and a retaining member 64. Meanwhile, since the structures of the main body 21, the stud bolt 22, the fastening bolt 67, the first spacer 71, and the second spacer 62 are the same as the structures of those of the battery terminal 1e of the sixth embodiment and the retaining member 64 is the same as the retaining member of the battery terminal 1d of the fifth embodiment, the detailed description thereof will be omitted.

As illustrated in FIG. 28, a pair of notch portions 86a with which the retaining member 64 is engaged are formed at edge portions, which are positioned on both sides of the penetrating plate 86 in the short-side direction, of one end portion 86d that is provided at one end of the penetrating plate 86 in the long-side direction. The notch portion 86a has the same shape as the notch portion 66a of the fifth embodiment. That is, in this embodiment, the notch portions 86a of the penetrating plate 86 and the retaining member 64 fitted to the notch portions 86a have the same function as the retaining portion 26a of the first embodiment. Further, the penetrating plate 86 includes a threaded hole 86b, which has the same structure as the threaded hole 76b of the sixth embodiment, at the other end portion 86e of the penetrating plate 86 that is opposite to one end portion 86d of the penetrating plate 86 where the notch portions 86a are provided. A portion, which are closer to an edge portion than the notch portions 86a, of one end portion 86d of the penetrating plate 86 is formed so as to protrude to both sides in the short-side direction, and is formed so as to have the same length as the length of the retaining member 64 in the short-side direction when the retaining member 64 is fitted to the notch portions 86a.

In this embodiment, when the fastening section 83 is combined with the main body 21, first of all, the second spacer 62 is fitted to the main body 21 so that the end face 62b of the second spacer 62 comes into contact with the surfaces 102a to be pressed of the main body 21. After that, the retaining member 64 is fitted to the notch portions 86a of the penetrating plate 86 from above in the axial direction and the other end portion 86e of the penetrating plate 86 is inserted into an opening of the main body 21 corresponding to the surfaces 102b to be pressed. The penetrating plate 86 is inserted until the contact surfaces 64c of the retaining member 64 come into contact with the surfaces 102b to be pressed of the main body 21. Accordingly, the penetrating plate 86 penetrates the plate-like protruding portions 24e and 25e so as to cross the slits 24d and 25d of the main body 21, and the other end portion 86e of the penetrating plate 86 is moved to the outside from the through hole 62a of the second spacer 62 in the long-side direction. Since the above-mentioned steps are same as those of the sixth embodiment, the description thereof will be omitted.

Since the battery terminal 1f of the seventh embodiment includes the tapered surfaces 71c of the first spacer 71 and the tapered surfaces 62d of the second spacer 62 as in the case of the battery terminal 1e of the sixth embodiment, the same effects as the battery terminal 1e of the sixth embodiment can be obtained by the action of the tapered surfaces 71c and the action of the tapered surfaces 62d.

Eighth Embodiment

Figure 31:
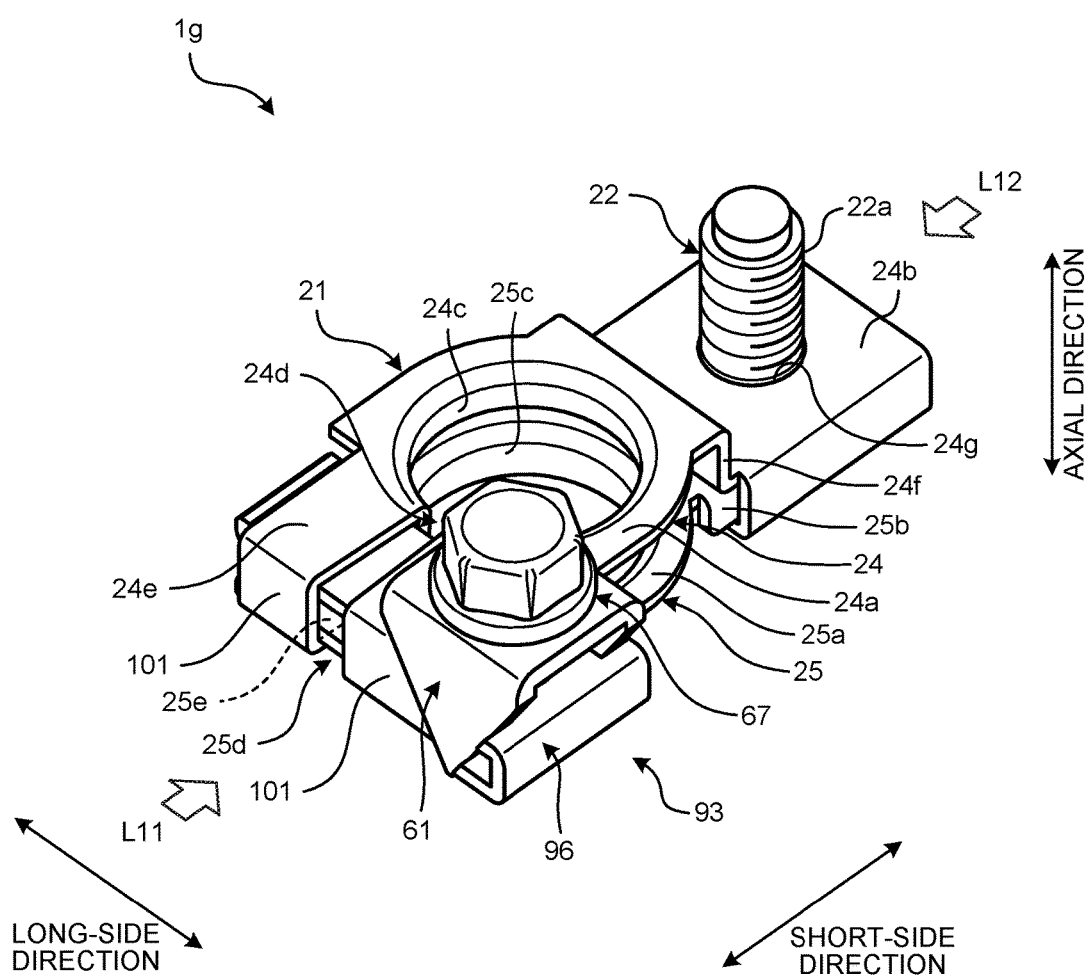
FIG. 31 is a perspective view illustrating a schematic structure of a battery terminal according to an eighth embodiment of the present invention.
Figure 32:
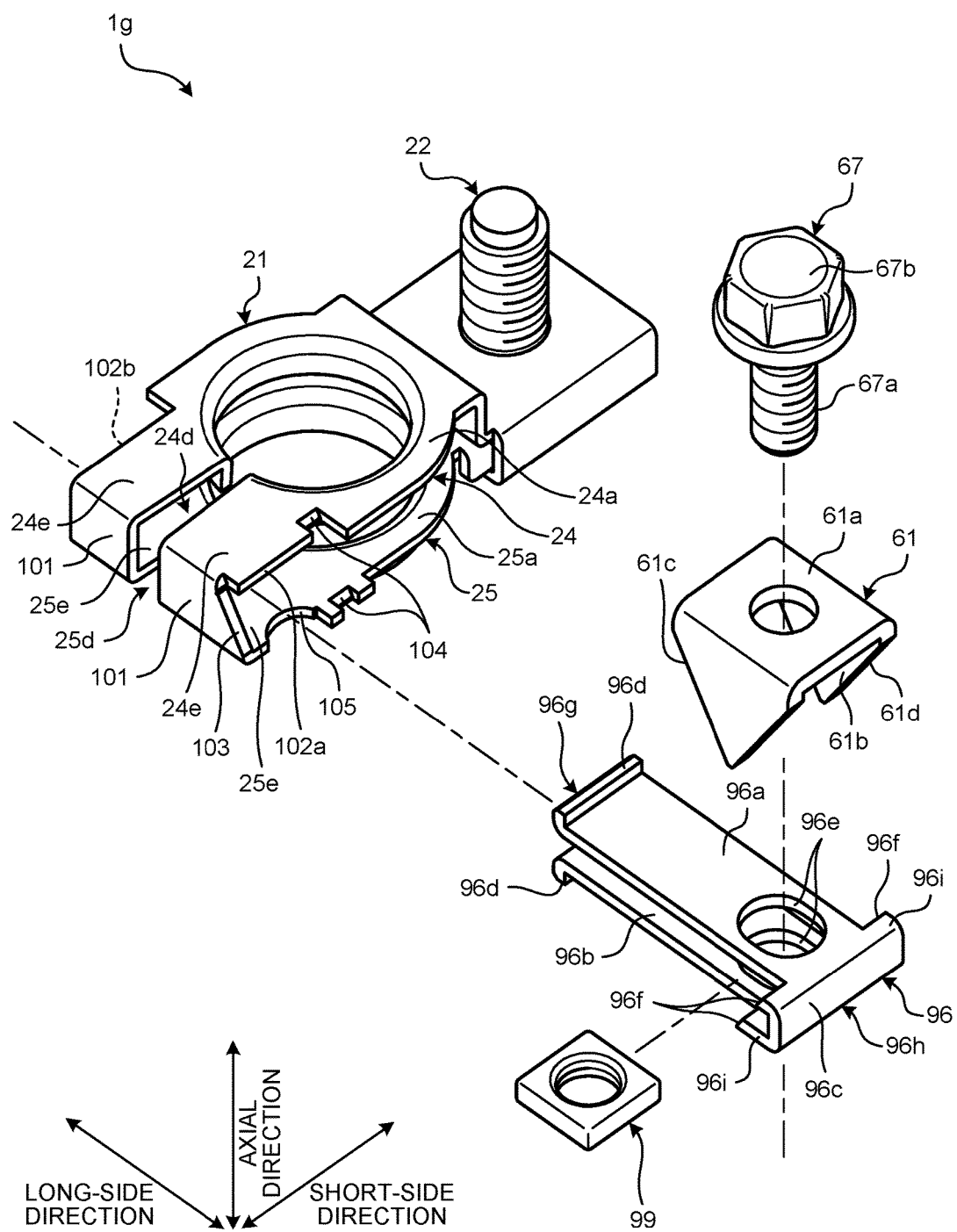
FIG. 32 is an exploded perspective view of the battery terminal illustrated in FIG. 31.
Figure 33:
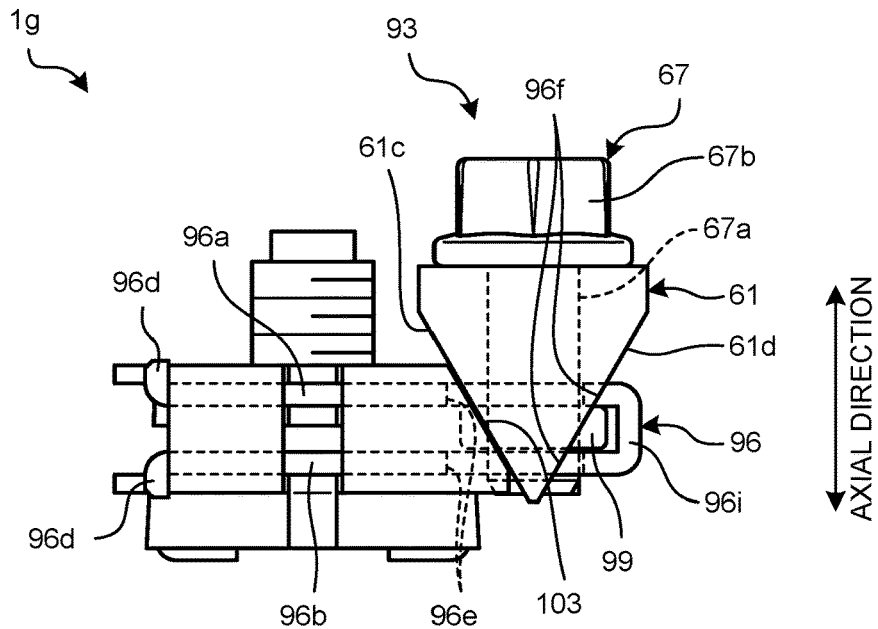
FIG. 33 is a view taken in the direction of an arrow L11 of FIG. 31.
Figure 34:
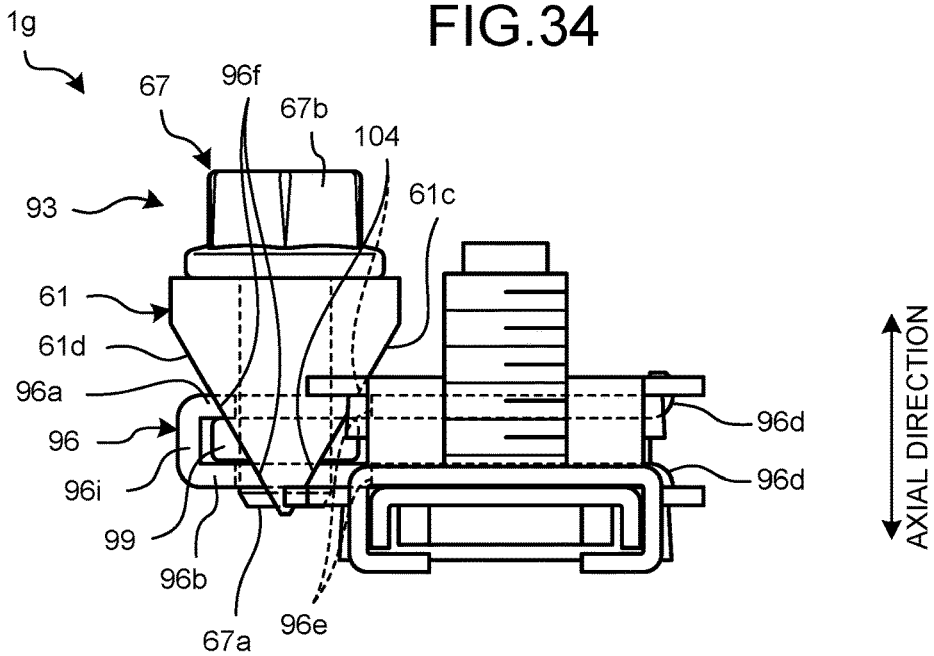
FIG. 34 is a view taken in the direction of an arrow L12 of FIG. 31.

An eighth embodiment will be described with reference to FIGS. 31 to 34. FIG. 31 is a perspective view illustrating the schematic structure of a battery terminal according to the eighth embodiment of the present invention. FIG. 32 is an exploded perspective view of the battery terminal illustrated in FIG. 31. FIG. 33 is a view taken in the direction of an arrow L11 of FIG. 31. FIG. 34 is a view taken in the direction of an arrow L12 of FIG. 31.

As illustrated in FIGS. 31 to 34, the structure of a fastening section 93 of a battery terminal 1g of the eighth embodiment is different from that of the battery terminal 1d of the fifth embodiment. The number of components of the structure of the fastening section 93 of this embodiment is reduced as compared to that of the fastening section 63 of the battery terminal 1d of the fifth embodiment and the same effects as the fifth embodiment are obtained from this embodiment.

The battery terminal 1g of the eighth embodiment includes a main body 21, a stud bolt 22, and a fastening section 93. The fastening section 93 includes a penetrating plate 96, a fastening bolt 67 (a fastening member), a nut 99 (a member to be fastened), and a first spacer 61 (a spacer, a pressing force converting member). The fastening section 93 of this embodiment is different from the fastening section 63 of the fifth embodiment in that the fastening section 93 does not includes the second spacer 62. Meanwhile, since the structures of the stud bolt 22 and the fastening bolt 67 are the same as the structures of those of the battery terminal 1d of the fifth embodiment, the description thereof will be omitted.

The penetrating plate 96 includes two flat plate portions 96a and 96b that are disposed so as to face each other with a predetermined gap interposed therebetween in the axial direction, and a connecting portion 96c that connects the flat plate portion 96a to the flat plate portion 96b. As in the case of the penetrating plate 66 of the fifth embodiment, the flat plate portions 96a and 96b are plate-like members that extend in the long-side direction. One flat plate portion 96a is disposed above the other flat plate portion 96b in the vertical direction (the axial direction). One end portion 96h of the connecting portion 96c in the long-side direction connects the flat plate portion 96a to the flat plate portion 96b. That is, the penetrating plate 96 is formed so as to have a horizontal U shape when viewed in the short-side direction.

The penetrating plate 96 includes elongated holes 96e, which are formed along the long-side direction, at one end portion 96h at which the connecting portion 96c is provided. The holes 96e are formed on both the two flat plate portions 96a and 96b, and are provided so as to overlap each other in the axial direction.

The penetrating plate 96 includes retaining portions 96d at the other end portion 96g thereof that is opposite to the connecting portion 96c in the long-side direction. The retaining portions 96d are provided at free ends of the two flat plate portions 96a and 96b, respectively. The other end portion 96g in the long-side direction is bent upward in the vertical direction in an L shape (for example, at a right angle), so that the retaining portion 96d of the flat plate portion 96a positioned on the upper side in the vertical direction is formed. On the other hand, the other end portion 96g in the long-side direction is bent downward in the vertical direction in an L shape (for example, at a right angle), so that the retaining portion 96d of the flat plate portion 96b positioned on the lower side in the vertical direction is formed. That is, the retaining portions 96d are formed at the other end portion 96g in the long-side direction so as to protrude from the two flat plate portions 96a and 96b to both sides in the axial direction.

As described above, the penetrating plate 96 is formed so as to have a horizontal U shape when viewed in the short-side direction, and the retaining portions 96d are provided at the free ends of the two flat plate portions 96a and 96b that are disposed in parallel along the long-side direction. Accordingly, when the flat plate portions 96a and 96b of the penetrating plate 96 are pressed from above and below in the vertical direction (the axial direction), portions of the flat plate portions 96a and 96b corresponding to the other end portion 96g are elastically deformed so as to approach each other and the axial dimensions of the retaining portions 96d can be reduced.

In addition, protrusions 96i, which come into contact with tapered pulling surfaces 61d (second tapered surfaces) of the first spacer 61, protrude from both edge portions of one end portion 96h of the penetrating plate 96 in the short-side direction. Further, tapered surfaces 96f are formed on the protrusions 96i so as to face the tapered pulling surfaces 61d.

The basic function of the nut 99 is the same as that of the nut 69 of the fifth embodiment. However, the nut 99 is disposed between the two flat plate portions 96a and 96b of the penetrating plate 96, and is adapted to be threadably engaged with the fastening bolt 67 through the hole 96e of the flat plate portion 96a that is positioned on the upper side in the vertical direction. That is, the height of the nut 99 is set to be smaller than the gap between the two flat plate portions 96a and 96b.

The structure of the first spacer 61 is the same as that of the first spacer 61 of the fifth embodiment. However, since the second spacer 62 is not included as a component in this embodiment, tapered pressing surfaces 61c (first tapered surfaces) are formed at positions where the tapered pressing surfaces 61c can come into contact with the annular portions 24a and 25a. Meanwhile, the tapered pulling surfaces 61d of the first spacer 61 are formed at positions where the tapered pulling surfaces 61d can come into contact with the protrusions 96i of the penetrating plate 96, as in the case of the fifth embodiment.

Further, in this embodiment, tapered surfaces 103 and 104 (third tapered surfaces), which come into contact with the tapered pressing surfaces 61c of the first spacer 61, are formed at end portions, which come into contact with the first spacer 61, among end portions of the annular portions 24a and 25a of the main body 21 in the long-side direction, that is, end portions of the plate-like protruding portions 24e and 25e corresponding to the surfaces 102a to be pressed. The tapered surface 103 is formed on the end face of the bent connecting portion 101, and the tapered surfaces 104 are formed so as to be positioned on the same virtual plane as the tapered surface 103 with a predetermined distance between the tapered surface 103 and themselves in the short-side direction (a distance between the pair of upright portions 61b of the first spacer 61). That is, the tapered pressing surfaces 61c, which are provided on the pair of upright portions 61b of the first spacer 61, are disposed so as to face the tapered surfaces 103 and 104.

Further, a notch portion 105 is formed along the shape of the hole 96e at a portion, which overlaps the hole 96e of the penetrating plate 96 in the axial direction, of the end portion of the plate-like protruding portions 24e and 25e corresponding to the surfaces 102a to be pressed.

In this embodiment, when the fastening section 93 is combined with the main body 21, first of all, the nut 99 is inserted between the two flat plate portions 96a and 96b of the penetrating plate 96 at the position of the hole 96e. After that, the other end portion 96g of the fastening section 93 is pressed from both sides in the axial direction, the flat plate portions 96a and 96b are elastically deformed, and the axial dimensions of the retaining portions 96d are reduced. In this state, when the other end portion 96g of the penetrating plate 96 is inserted into an opening of the main body 21 corresponding to the surfaces 102a to be pressed and the penetrating plate 96 penetrates the plate-like protruding portions 24e and 25e so as to cross the slits 24d and 25d of the main body 21, the retaining portions 96d of the other end portion 96g are moved to the outside of the surfaces 102b to be pressed of the main body 21 in the long-side direction. At this time, the other end portion 96g of the elastically deformed penetrating plate 96 is elastically restored so that the axial dimensions of the retaining portions 96d are increased. Accordingly, since the retaining portions 96d are locked to the surfaces 102b to be pressed of the main body 21, the penetrating plate 96 is prevented from being detached toward the surfaces 102a to be pressed of the main body 21.

After that, the first spacer 61 is combined with the annular portions 24a and 25a and the penetrating plate 96 so that the tapered pressing surfaces 61c of the first spacer 61 come into contact with the tapered surfaces 103 and 104 of the annular portions 24a and 25a of the main body 21 and the tapered pulling surfaces 61d of the first spacer 61 come into contact with the tapered surfaces 96f of the protrusions 96i of the penetrating plate 96. The fastening bolt 67 is inserted into the hole of the first spacer 61 and the hole 96e of the upper flat plate portion 96a of the penetrating plate 96 from above in the axial direction, and is threadably engaged with the nut 99 that is disposed between the two flat plate portions 96a and 96b of the penetrating plate 96. The fastening section 93 is combined with the main body 21 in this way.

According to the battery terminal 1g of the eighth embodiment, the axial-direction fastening force, which is generated with the rotation of the fastening bolt 67 about the axial direction, is converted into the long-side-direction pressing force, which reduces the intervals of the slits 24d and 25d of the annular portions 24a and 25a, by the action of the tapered pressing surfaces 61c of the first spacer 61 and the action of the tapered surfaces 103 and 104 of the annular portions 24a and 25a of the main body 21. Accordingly, it is possible to fasten the annular portions 24a and 25a to the battery post 51. Further, the axial-direction fastening force, which is generated with the rotation of the fastening bolt 67 about the axial direction, can be converted into a pulling force for pulling the retaining portions 96d of the penetrating plate 96 toward the hole 96e in the long-side direction by the action of the tapered pulling surfaces 61d of the first spacer 61. That is, since the battery terminal 1g of the eighth embodiment can generate the long-side-direction pressing force and the pulling force that reduce the intervals of the slits 24d and 25d of the annular portions 24a and 25a as in the case of the battery terminal 1d of the fifth embodiment, the same effects as the battery terminal 1d of the fifth embodiment can be obtained.

Ninth Embodiment

Figure 35:
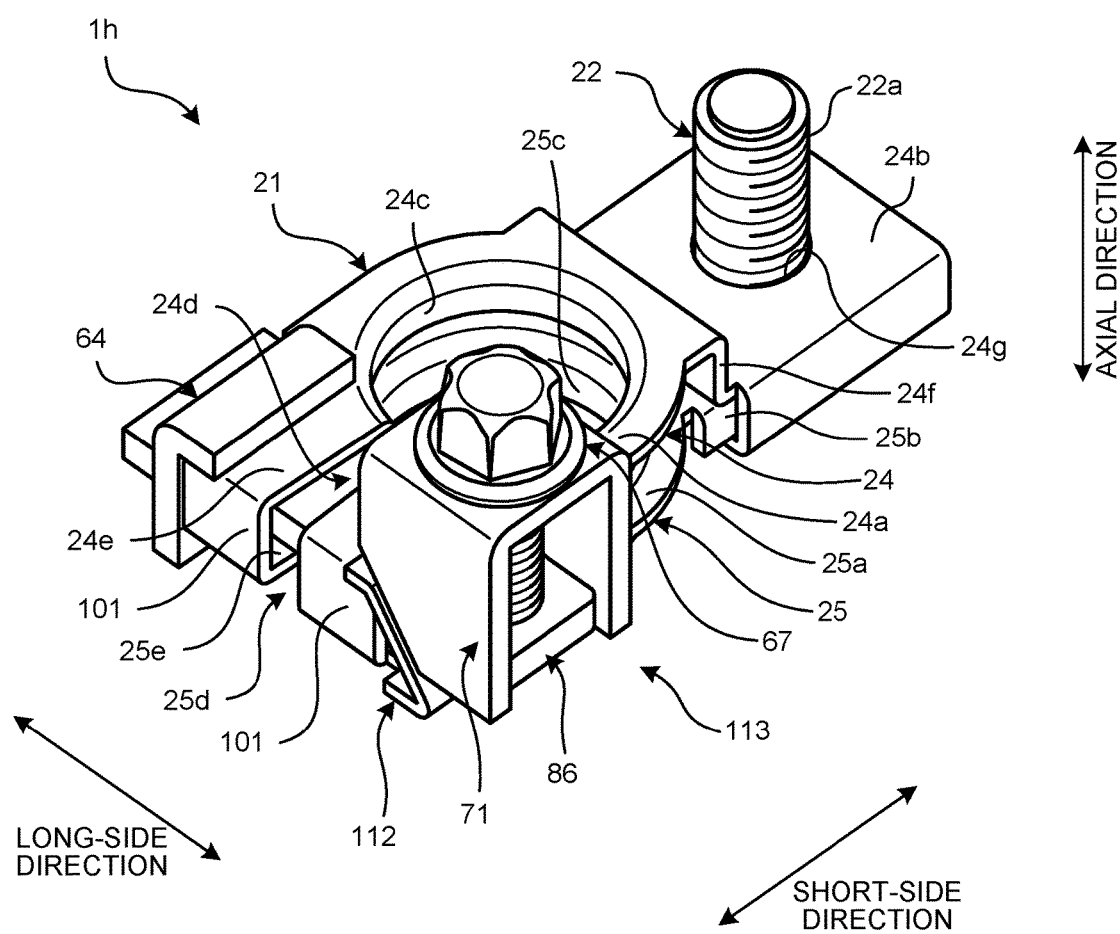
FIG. 35 is a perspective view illustrating a schematic structure of a battery terminal according to a ninth embodiment of the present invention.
Figure 36:
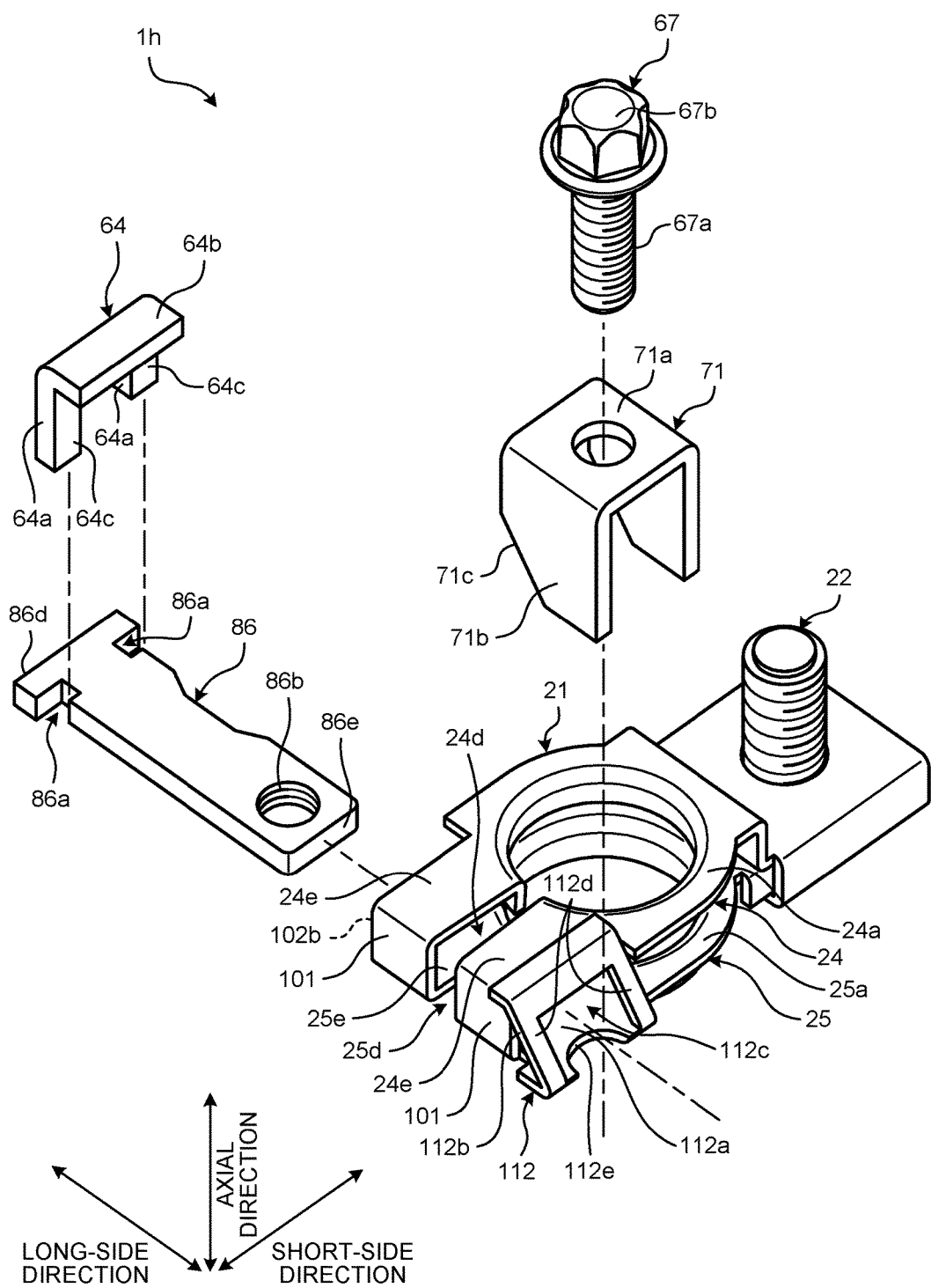
FIG. 36 is an exploded perspective view of the battery terminal illustrated in FIG. 35.

A ninth embodiment will be described with reference to FIGS. 35 and 36. FIG. 35 is a perspective view illustrating the schematic structure of a battery terminal according to the ninth embodiment of the present invention. FIG. 36 is an exploded perspective view of the battery terminal illustrated in FIG. 35.

As illustrated in FIGS. 35 and 36, a portion, which relates to a pressing force converting member, of the structure of a fastening section 113 of a battery terminal 1h of the ninth embodiment is different from that of the battery terminal 1f of the seventh embodiment. The number of components of the structure of the fastening section 113 of this embodiment is reduced as compared to that of the fastening section 83 of the battery terminal 1f of the seventh embodiment and the same effects as the seventh embodiment are obtained from this embodiment.

The battery terminal 1h of the ninth embodiment includes a main body 21, a stud bolt 22, and a fastening section 113. The fastening section 113 includes a penetrating plate 86, a fastening bolt 67 (a fastening member), a first spacer 71 (a spacer, a pressing force converting member), a tapered portion 112 (a pressing force converting member), and a retaining member 64. Meanwhile, since the structures of the main body 21, the stud bolt 22, the penetrating plate 86, the fastening bolt 67, the first spacer 71, and the retaining member 64 are the same as the structures of those of the battery terminal 1f of the seventh embodiment, the detailed description thereof will be omitted. That is, the fastening section 113 of this embodiment is different from the fastening section 83 of the seventh embodiment in that the fastening section 113 includes the tapered portion 112 instead of the second spacer 62.

As illustrated in FIGS. 35 and 36, the tapered portion 112 is formed at end portions, on which the first spacer 71 is mounted, (end portions of the plate-like protruding portions 24e and 25e opposite to the surfaces 102b to be pressed) of the annular portions 24a and 25a of the main body 21 in the long-side direction so as to be integrated with annular portions 24a and 25a. The tapered portion 112 is the same member as the plate-like protruding portion 25e, and protrudes from the plate-like protruding portion 25e toward an end portion of the plate-like protruding portion 25e in the long-side direction. The tapered portion 112 includes a bottom plate portion 112a that is disposed on the same plane as the plate-like protruding portion 25e, and a plate-like bent plate portion 112b that is bent from the bottom plate portion 112a toward the plate-like protruding portion 24e. A base end portion of the bent plate portion 112b is connected to the bottom plate portion 112a, the bent plate portion 112b is bent relative to the bottom plate portion 112a around an axis along the short-side direction, and a tip portion of the bent plate portion 112b comes into contact with the plate-like protruding portion 24e. An angle between the bottom plate portion 112a and the bent plate portion 112b is an acute angle. The external shape of the tapered portion 112 is a substantially triangular shape when viewed in the short-side direction.

The tapered portion 112 is provided so as to be movable relative to the penetrating plate 86 in the long-side direction, and comes into contact with the first spacer 71. An opening 112c is formed at the central portion of the bent plate portion 112b of the tapered portion 112. The shape of the opening 112c is formed so that the penetrating plate 86 can be inserted into the opening 112c in the long-side direction. Accordingly, since the penetrating plate 86 is inserted into the opening 112c, the tapered portion 112 and the main body 21 are adapted to be movable relative to the penetrating plate 86 in the long-side direction. Tapered surfaces 112d (second tapered surfaces), which come into contact with the tapered surfaces 71c (first tapered surfaces) of the first spacer 71 (the spacer), are formed on the outer surface of the bent plate portion 112b of the tapered portion 112 (the surface of the bent plate portion 112b opposite to the contact surface of the bent plate portion 112b coming into contact with the plate-like protruding portion 24e). The tapered surface 112d is inclined so that a gap between the main body 21 and the tapered surface 112d in the long-side direction is small on the tip side of the bent plate portion 112b (the plate-like protruding portion 24e side in the axial direction) and is gradually increased toward the base end side of the bent plate portion 112b (the plate-like protruding portion 25e side in the axial direction).

Further, the opening 112c reaches a boundary between the bottom plate portion 112a and itself on the base end side of the bent plate portion 112b, and an end portion of the bottom plate portion 112a, which is not connected to the bent plate portion 112b, is exposed to the outside here. A notch portion 112e is formed along the shape of the threaded hole 86b at a portion, which overlaps the threaded hole 86b of the penetrating plate 86 in the axial direction, of the end portion of the bottom plate portion 112a.

The tapered surfaces 71c of the first spacer 71 and the tapered surfaces 112d of the tapered portion 112 are inclined in a direction in which an axial-direction fastening force, which is generated between the fastening bolt 67 and the threaded hole 86b when the fastening bolt 67 approaches the threaded hole 86b in the axial direction with the rotation of the fastening bolt 67 about the axial direction, is converted into a long-side-direction pressing force of the first spacer 71 pressing the tapered portion 112 in a direction in which the intervals of the slits 24d and 25d of the annular portions 24a and 25a are reduced, that is, toward the retaining portion (the retaining member 64 fitted to the notch portions 86a) of the penetrating plate 86 in the long-side direction. In this embodiment, the tapered surfaces 71c of the first spacer 71 are inclined so that the width of each upright portion 71b of the first spacer 71 in the long-side direction is gradually reduced as it is separated from the head portion 67b of the fastening bolt 67 in the axial direction. The tapered surfaces 71c of the first spacer 71 and the tapered surfaces 112d of the tapered portion 112 are disposed so as to face each other.

In this embodiment, when the fastening section 113 is combined with the main body 21, first of all, the retaining member 64 is fitted to the notch portions 86a of the penetrating plate 86 from above in the axial direction and the other end portion 86e of the penetrating plate 86 is inserted into an opening of the main body 21 corresponding to the surfaces 102b to be pressed. The penetrating plate 86 is inserted until the contact surfaces 64c of the retaining member 64 come into contact with the surfaces 102b to be pressed of the main body 21. Accordingly, the penetrating plate 86 penetrates the plate-like protruding portions 24e and 25e so as to cross the slits 24d and 25d of the main body 21, and the other end portion 86e of the penetrating plate 86 is moved to the outside from the opening 112c of the tapered portion 112 in the long-side direction.

After that, the first spacer 71 is combined with the tapered portion 112 and the penetrating plate 86 so that the tapered surfaces 71c of the first spacer 71 come into contact with the tapered surfaces 112d of the tapered portion 112 and the hole of the first spacer 71 overlaps the threaded hole 86b of the penetrating plate 86 in the axial direction. The fastening bolt 67 is inserted into the hole of the first spacer 71 from above in the axial direction, and is threadably engaged with the threaded hole 86b of the penetrating plate 86. The fastening section 113 is combined with the main body 21 in this way.

In the battery terminal 1h of the ninth embodiment, the tapered surfaces 112d of the tapered portion 112 are used instead of the tapered surfaces 62d of the second spacer 62 of the battery terminal 1f of the seventh embodiment. Accordingly, the function of the tapered surfaces 112d is the same as the function of the tapered surfaces 62d. Therefore, since the battery terminal 1h of the ninth embodiment includes the tapered surfaces 71c of the first spacer 71 and the tapered surfaces 112d of the tapered portion 112, the same effects as the battery terminal 1f of the seventh embodiment can be obtained by the action of the tapered surfaces 71c and the action of the tapered surfaces 112d.

In a battery terminal according to the present invention, an axial-direction fastening force, which is generated with the rotation of the fastening member about the axial direction, is converted into a width-direction pressing force, which reduces an interval of the slit of the annular portion, by the action of the pressing force converting member. Accordingly, the annular portion can be fastened to the battery post. That is, unlike in the related art, a work space in which a tool for rotating the fastening member is set and operated does not need to be secured on the lateral side of the battery post, that is, on the lateral side of the battery. For example, it is possible to operate a tool from the upper side, which is relatively easily secured, of the battery in the vertical direction. According to the battery terminal of the present invention, an effect of reducing a work space, which is present around the battery and is required to fasten the battery terminal to the battery post, can be obtained as described above.

Although the present invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A battery terminal comprising:
an annular portion in which a post insertion hole into which a battery post is inserted and a slit connected to the post insertion hole are formed;
a holding member that is disposed so as to extend from one end portion of the annular portion to the other end portion of the annular portion with the slit interposed therebetween in a width direction that is a direction crossing an axial direction of the battery post and crossing the slit;
an annular portion holding portion that is provided at one end portion of the holding member and holds the annular portion;
a fastening member supporting portion that is provided at the other end portion of the holding member;
a fastening member that is supported by the fastening member supporting portion, so as to be rotatable in the axial direction of the battery post;
a member to be fastened that is threadably engaged with the fastening member; and
a pressing force converting member that is disposed so as to come into contact with the annular portion from the other end portion side of the holding member and converts an axial-direction fastening force, which is generated between the fastening member and the member to be fastened with the rotation of the fastening member about the axial direction, into a width-direction pressing force that presses the annular portion in a direction, in which an interval of the slit of the annular portion is reduced, of the width direction.

2. The battery terminal according to claim 1, wherein
the holding member is a penetrating plate that is disposed so as to penetrate the annular portion from one end portion of the annular portion to the other end portion of the annular portion with the slit interposed therebetween in the width direction that is the direction crossing the axial direction of the battery post and crossing the slit, and
the annular portion holding portion is a retaining portion that is provided at one end portion of the penetrating plate and prevents the penetrating plate from being detached from the annular portion.

3. The battery terminal according to claim 2, wherein
the member to be fastened includes a threaded hole that is provided at the other end portion of the penetrating plate so as to pass through the penetrating plate in the axial direction,
the fastening member is a bolt that is threadably engaged with the threaded hole so as to be rotatable about the axial direction,
the fastening member supporting portion includes the threaded hole,
the pressing force converting member is a spacer which is disposed so as to be movable relative to the penetrating plate in the width direction and of which one end in the width direction comes into contact with a head portion of the bolt and the other end in the width direction comes into contact with the annular portion,
a tapered surface is formed on at least one of the head portion of the bolt that comes into contact with the spacer, and the other end of the spacer that comes into contact with the bolt, and
the tapered surface is inclined in a direction in which an axial-direction pressing force of the bolt pressing the spacer by a fastening force, which is generated between the bolt and the penetrating plate when the bolt approaches the threaded hole with the rotation of the bolt about the axial direction, is converted into a width-direction pressing force of the spacer pressing the annular portion in a direction in which an interval of the slit of the annular portion is reduced.

4. The battery terminal according to claim 2, wherein
the fastening member supporting portion includes an elongated hole that is provided at the other end portion of the penetrating plate so as to pass through the penetrating plate in the axial direction and is formed along the width direction,
the fastening member is a bolt that is supported by the hole of the penetrating plate so as to be rotatable about the axial direction,
the member to be fastened is a nut that faces the bolt with the penetrating plate interposed therebetween in the axial direction, is threadably engaged with the bolt, and includes a tapered surface formed on one end of the nut in the width direction and coming into contact with the penetrating plate, the rotation of the nut about the axial direction being regulated and the other end of the nut in the width direction coming into contact with the annular portion,
the pressing force converting member is the nut, and
the tapered surface formed on the nut is inclined in a direction in which an axial-direction fastening force, which is generated between the bolt and the nut when the nut approaches the bolt in the axial direction with the rotation of the bolt about the axial direction, is converted into a width-direction pressing force of the nut pressing the annular portion in a direction in which an interval of the slit of the annular portion is reduced.

5. The battery terminal according to claim 2, wherein
the fastening member supporting portion includes an elongated hole that is provided at the other end portion of the penetrating plate so as to pass through the penetrating plate in the axial direction and is formed along the width direction,
the fastening member is a bolt that is supported by the hole of the penetrating plate so as to be rotatable about the axial direction,
the member to be fastened is a nut that faces the bolt with the penetrating plate interposed therebetween in the axial direction and is threadably engaged with the bolt,
the pressing force converting member is a spacer that is disposed between the bolt and the penetrating plate so as to allow the bolt to penetrate the spacer and includes a tapered surface formed on one end of the spacer in the width direction and coming into contact with the penetrating plate, the rotation of the spacer about the axial direction being regulated and the other end of the spacer in the width direction coming into contact with the annular portion, and
the tapered surface formed on the spacer is inclined in a direction in which an axial-direction fastening force, which is generated between the bolt and the nut when the bolt approaches the nut in the axial direction with the rotation of the bolt about the axial direction, is converted into a width-direction pressing force of the spacer pressing the annular portion in a direction in which an interval of the slit of the annular portion is reduced.

6. The battery terminal according to claim 2, wherein
the fastening member supporting portion includes a hole that is provided at the other end portion of the penetrating plate so as to pass through the penetrating plate in the axial direction,
the fastening member is a bolt that is supported by the hole of the penetrating plate so as to be rotatable about the axial direction,
the member to be fastened is a nut that faces the bolt with the penetrating plate interposed therebetween in the axial direction and is threadably engaged with the bolt,
the pressing force converting member includes a first spacer which is disposed between the bolt and the penetrating plate so as to allow the bolt to penetrate the first spacer and of which the rotation about axial direction is regulated, and a second spacer which is disposed so as to be movable relative to the penetrating plate in the width direction and of which one end in the width direction comes into contact with the annular portion and the other end in the width direction comes into contact with the first spacer,
a first tapered surface, which comes into contact with the second spacer, is formed on one end of the first spacer in the width direction,
a second tapered surface, which comes into contact with the first tapered surface, is formed on the other end of the second spacer in the width direction, and
the first tapered surface formed on the first spacer and the second tapered surface formed on the second spacer are inclined in a direction in which an axial-direction fastening force, which is generated between the bolt and the nut when the bolt approaches the nut in the axial direction with the rotation of the bolt about the axial direction, is converted into a width-direction pressing force of the second spacer pressing the annular portion in a direction in which an interval of the slit of the annular portion is reduced.

7. The battery terminal according to claim 6, wherein
the hole has the shape of an elongated hole along the width direction,
a third tapered surface, which is provided on a back side of the first tapered surface in the width direction and comes into contact with the penetrating plate, is formed on the first spacer, and
the third tapered surface formed on the first spacer is inclined in a direction in which an axial-direction fastening force, which is generated between the bolt and the nut when the bolt approaches the nut in the axial direction with the rotation of the bolt about the axial direction, is converted into a pulling force for pulling the retaining portion toward the hole in the width direction through the penetrating plate coming into contact with the third tapered surface.

8. The battery terminal according to claim 2, wherein
the member to be fastened includes a threaded hole that is provided at the other end portion of the penetrating plate so as to pass through the penetrating plate in the axial direction,
the fastening member is a bolt that is supported by the threaded hole so as to be rotatable about the axial direction, the fastening member supporting portion includes the threaded hole,
the pressing force converting member includes a first spacer which is disposed between the bolt and the penetrating plate so as to allow the bolt to penetrate the first spacer and of which the rotation about axial direction is regulated, and a second spacer which is disposed so as to be movable relative to the penetrating plate in the width direction and of which one end in the width direction comes into contact with the annular portion and the other end in the width direction comes into contact with the first spacer,
a first tapered surface, which comes into contact with the second spacer, is formed on one end of the first spacer in the width direction,
a second tapered surface, which comes into contact with the first tapered surface, is formed on the other end of the second spacer in the width direction, and
the first tapered surface formed on the first spacer and the second tapered surface formed on the second spacer are inclined in a direction in which an axial-direction fastening force, which is generated between the bolt and the threaded hole when the bolt approaches the threaded hole in the axial direction with the rotation of the bolt about the axial direction, is converted into a width-direction pressing force of the second spacer pressing the annular portion in a direction in which an interval of the slit of the annular portion is reduced.

9. The battery terminal according to claim 8, wherein
the retaining portion is a plate-like member that is disposed at the one end portion of the penetrating plate so as to be orthogonal to the penetrating plate and is formed integrally with the penetrating plate.

10. The battery terminal according to claim 8, wherein
the retaining portion includes a notch portion that is provided at the one end portion of the penetrating plate, and a plate-like member that is fitted to the notch portion and is disposed so as to be orthogonal to the penetrating plate.

11. The battery terminal according to claim 2, wherein
the fastening member supporting portion includes a hole that is provided at the other end portion of the penetrating plate so as to pass through the penetrating plate in the axial direction,
the fastening member is a bolt that is supported by the hole of the penetrating plate so as to be rotatable about the axial direction,
the penetrating plate includes two flat plate portions that are disposed so as to face each other with a predetermined gap interposed therebetween in the axial direction, and a connecting portion that connects the two flat plate portions at an edge portion of the other end portion,
the member to be fastened is a nut that is disposed between the two flat plate portions of the penetrating plate and is threadably engaged with the bolt through the hole,
the pressing force converting member is a spacer which is disposed between the bolt and the penetrating plate so as to allow the bolt to penetrate the spacer and of which the rotation about axial direction is regulated,
the spacer is provided with a first tapered surface coming into contact with an end portion of the annular portion in the width direction, which is opposite to the end portion of the annular portion held by the retaining portion, and the first tapered surface formed on the spacer is inclined in a direction in which an axial-direction fastening force, which is generated between the bolt and the nut when the bolt approaches the nut in the axial direction with the rotation of the bolt about the axial direction, is converted into a width-direction pressing force of the spacer pressing the annular portion in a direction in which an interval of the slit of the annular portion is reduced.

12. The battery terminal according to claim 11, wherein the hole has the shape of an elongated hole along the width direction,
a second tapered surface, which is provided on a back side of the first tapered surface in the width direction and comes into contact with the penetrating plate, is formed on the spacer,
the second tapered surface formed on the spacer is inclined in a direction in which an axial-direction fastening force, which is generated between the bolt and the nut when the bolt approaches the nut in the axial direction with the rotation of the bolt about the axial direction, is converted into a pulling force for pulling the retaining portion toward the hole in the width direction through the penetrating plate coming into contact with the second tapered surface.

13. The battery terminal according to claim 11, wherein a third tapered surface, which comes into contact with the first tapered surface of the spacer, is formed on an end portion of the annular portion in the width direction that comes into contact with the spacer.

14. The battery terminal according to claim 12, wherein a third tapered surface, which comes into contact with the first tapered surface of the spacer, is formed on an end portion of the annular portion in the width direction that comes into contact with the spacer.

15. The battery terminal according to claim 1, wherein the fastening member supporting portion includes a hole that is provided at the other end portion of the holding member so as to pass through the holding member in the axial direction,
the fastening member is a bolt that is supported by the hole of the holding member so as to be rotatable about the axial direction,
the member to be fastened is a nut that faces the bolt with the holding member interposed therebetween in the axial direction and is threadably engaged with the bolt,
the pressing force converting member is a spacer which is disposed between the bolt and the holding member so as to allow the bolt to penetrate the spacer and of which the rotation about axial direction is regulated,
the spacer is provided with a first tapered surface coming into contact with an end portion of the annular portion in the width direction, which is opposite to the end portion of the annular portion held by the annular portion holding portion, and
the first tapered surface formed on the spacer is inclined in a direction in which an axial-direction fastening force, which is generated between the bolt and the nut when the bolt approaches the nut in the axial direction with the rotation of the bolt about the axial direction, is converted into a width-direction pressing force of the spacer pressing the annular portion in a direction in which an interval of the slit of the annular portion is reduced.

16. The battery terminal according to claim 15, further comprising:

an edge protruding portion that is provided at an edge portion of the other end portion of the holding member and protrudes toward a side where the bolt is disposed in the axial direction, wherein
the hole has the shape of an elongated hole along the width direction,
a second tapered surface, which is provided on a back side of the first tapered surface in the width direction and comes into contact with the edge protruding portion of the holding member, is formed on the spacer, and
the second tapered surface formed on the spacer is inclined in a direction in which an axial-direction fastening force, which is generated between the bolt and the nut when the bolt approaches the nut in the axial direction with the rotation of the bolt about the axial direction, is converted into a pulling force for pulling the annular portion holding portion of the holding member toward the fastening member supporting portion in the width direction through the edge protruding portion coming into contact with the second tapered surface.

17. The battery terminal according to claim 1, wherein the battery post stands on a bottom of a recess formed on an upper surface of a battery housing, and
the fastening member is supported at a position where at least a part of the fastening member protrudes from the upper surface in the axial direction in a state in which the battery post is inserted into the post insertion hole and the fastening member is supported by the fastening member supporting portion.

18. The battery terminal according to claim 2, wherein the battery post stands on a bottom of a recess formed on an upper surface of a battery housing, and
the fastening member is supported at a position where at least a part of the fastening member protrudes from the upper surface in the axial direction in a state in which the battery post is inserted into the post insertion hole and the fastening member is supported by the fastening member supporting portion.

19. The battery terminal according to claim 2, wherein the member to be fastened includes a threaded hole that is provided at the other end portion of the penetrating plate so as to pass through the penetrating plate in the axial direction,
the fastening member is a bolt that is supported by the threaded hole so as to be rotatable about the axial direction,
the fastening member supporting portion includes the threaded hole,
the pressing force converting member includes a spacer which is disposed between the bolt and the penetrating plate so as to allow the bolt to penetrate the spacer and of which the rotation about axial direction is regulated, and a tapered portion that is formed at an end portion of the annular portion in the width direction so as to be integrated with the annular portion, is provided so as to be movable relative to the penetrating plate in the width direction, and comes into contact with the spacer,
a first tapered surface, which comes into contact with the tapered portion, is formed on the spacer,
a second tapered surface, which comes into contact with the first tapered surface, is formed on the tapered portion, and
the first tapered surface formed on the spacer and the second tapered surface formed on the tapered portion are inclined in a direction in which an axial-direction fastening force, which is generated between the bolt and the threaded hole when the bolt approaches the threaded hole in the axial direction with the rotation of the bolt about the axial direction, is converted into a width-direction pressing force of the spacer pressing the tapered portion in a direction in which an interval of the slit of the annular portion is reduced.

20. The battery terminal according to claim 19, wherein the retaining portion includes a notch portion that is provided at the one end portion of the penetrating plate, and a plate-like member that is fitted to the notch portion and is disposed so as to be orthogonal to the penetrating plate.

21. A battery terminal comprising:
an annular portion in which a post insertion hole into which a battery post is inserted and a slit connected to the post insertion hole are formed;
a holding member that is disposed so as to extend from one end portion of the annular portion to the other end portion of the annular portion with the slit interposed therebetween in a width direction that is a direction crossing an axial direction of the battery post and crossing the slit;
an annular portion holding portion that is provided at one end portion of the holding member and holds the annular portion;
a fastening member supporting portion that is provided at the other end portion of the holding member;
a fastening member that is supported by the fastening member supporting portion so as to be rotatable about the axial direction;
a member to be fastened that is threadably engaged with the fastening member; and
a pressing force converting member that is disposed so as to come into contact with the annular portion from the other end portion side of the holding member and converts an axial-direction fastening force, which is generated between the fastening member and the member to be fastened with the rotation of the fastening member about the axial direction, into a width-direction pressing force that presses the annular portion in a direction, in which an interval of the slit of the annular portion is reduced, of the width direction, wherein
the holding member is a penetrating plate that is disposed so as to penetrate the annular portion from one end portion of the annular portion to the other end portion of the annular portion with the slit interposed therebetween in the width direction that is the direction crossing the axial direction of the battery post and crossing the slit, and
the annular portion holding portion is a retaining portion that is provided at one end portion of the penetrating plate and prevents the penetrating plate from being detached from the annular portion.

22. A battery terminal comprising:
an annular portion in which a post insertion hole into which a battery post is inserted and a slit connected to the post insertion hole are formed;
a holding member that is disposed so as to extend from one end portion of the annular portion to the other end portion of the annular portion with the slit interposed therebetween in a width direction that is a direction crossing an axial direction of the battery post and crossing the slit;
an annular portion holding portion that is provided at one end portion of the holding member and holds the annular portion;
a fastening member supporting portion that is provided at the other end portion of the holding member;
a fastening member that is supported by the fastening member supporting portion so as to be rotatable about the axial direction;
a member to be fastened that is threadably engaged with the fastening member; and
a pressing force converting member that is disposed so as to come into contact with the annular portion from the other end portion side of the holding member and converts an axial-direction fastening force, which is generated between the fastening member and the member to be fastened with the rotation of the fastening member about the axial direction, into a width-direction pressing force that presses the annular portion in a direction, in which an interval of the slit of the annular portion is reduced, of the width direction, wherein
the member to be fastened includes a threaded hole that is provided at the other end portion of the penetrating plate so as to pass through the penetrating plate in the axial direction,
the fastening member is a bolt that is threadably engaged with the threaded hole so as to be rotatable about the axial direction,
the fastening member supporting portion includes the threaded hole,
the pressing force converting member is a spacer which is disposed so as to be movable relative to the penetrating plate in the width direction and of which one end in the width direction comes into contact with a head portion of the bolt and the other end in the width direction comes into contact with the annular portion,
a tapered surface is formed on at least one of the head portion of the bolt that comes into contact with the spacer, and the other end of the spacer that comes into contact with the bolt, and
the tapered surface is inclined in a direction in which an axial-direction pressing force of the bolt pressing the spacer by a fastening force, which is generated between the bolt and the penetrating plate when the bolt approaches the threaded hole with the rotation of the bolt about the axial direction, is converted into a width-direction pressing force of the spacer pressing the annular portion in a direction in which an interval of the slit of the annular portion is reduced.

* * * * *